US010569372B2

(12) United States Patent
Barone et al.

(10) Patent No.: US 10,569,372 B2
(45) Date of Patent: Feb. 25, 2020

(54) AUTOMATIC PACKAGING LINE TO PACK PROFILES AND ROTOR

(71) Applicant: The Bradbury Company, Inc., Moundridge, KS (US)

(72) Inventors: Mario Ricardo Barone, Buenos Aires (AR); Francisco Ansoain, Buenos Aires (AR); Andrés Alberto Novillo, Buenos Aires (AR)

(73) Assignee: The Bradbury Company, Inc., Moundridge, KS (US)

( * ) Notice: Subject to any disclaimer, the term of this patent is extended or adjusted under 35 U.S.C. 154(b) by 150 days.

(21) Appl. No.: 15/827,804

(22) Filed: Nov. 30, 2017

(65) Prior Publication Data

US 2018/0085868 A1   Mar. 29, 2018

Related U.S. Application Data

(63) Continuation of application No. 14/566,426, filed on Dec. 10, 2014, now Pat. No. 9,844,844.

(30) Foreign Application Priority Data

Dec. 27, 2013  (AR) ................................ P130105065

(51) Int. Cl.
*B65G 57/16* (2006.01)
*B23P 19/04* (2006.01)
(Continued)

(52) U.S. Cl.
CPC ............. *B23P 19/04* (2013.01); *B23P 19/007* (2013.01); *B65B 27/10* (2013.01); *B65B 35/58* (2013.01);
(Continued)

(58) Field of Classification Search
CPC ...... B23P 19/04; B23P 19/007; B65B 65/006; B65B 65/003; B65B 35/58; B65B 27/10;
(Continued)

(56) References Cited

U.S. PATENT DOCUMENTS 2,585,697 A   2/1952  Sommer et al.
3,157,071 A   11/1964  Pachell
(Continued)

FOREIGN PATENT DOCUMENTS

CN   101249901   8/2008
DE    1193883    5/1965
(Continued)

OTHER PUBLICATIONS

English translation of DE102008027943 (Year: 2008).*
(Continued)

*Primary Examiner* — Jun S Yoo
(74) *Attorney, Agent, or Firm* — Hanley, Flight & Zimmermna, LLC

(57) ABSTRACT

A packaging line to pack profiles and a rotor are described herein. An example method includes transferring a first profile to a movable head carrying a rotor, coupling the first profile to the rotor, along a first side wall of the first profile, with a concave section of the first profile facing upwards, rotating, via the rotor, the first profile such that the concave section of the first profile is facing downwards, transferring a second profile to the movable head with a concave section of the second profile facing upwards, and releasing the first profile over the second profile to insert a side wall of the first profile into the concave section of the second profile and a side wall of the second profile into the concave section of the first profile.

19 Claims, 41 Drawing Sheets

(51) Int. Cl.
*B23P 19/00* (2006.01)
*H01F 7/02* (2006.01)
*B65B 27/10* (2006.01)
*B65B 35/58* (2006.01)
*B65B 65/00* (2006.01)

(52) U.S. Cl.
CPC .......... *B65B 65/003* (2013.01); *B65B 65/006* (2013.01); *H01F 7/02* (2013.01); *Y10T 29/49623* (2015.01); *Y10T 29/53539* (2015.01)

(58) Field of Classification Search
CPC .......... B65B 35/38; B65B 35/50; B65B 35/52; H01F 7/02; Y10T 29/49623; Y10T 29/53539
See application file for complete search history.

(56) References Cited

U.S. PATENT DOCUMENTS

| | | | |
|---|---|---|---|
| 3,308,969 | A | 3/1967 | Orms et al. |
| 3,347,397 | A | 10/1967 | Hein |
| 3,880,070 | A | 4/1975 | Kaplan |
| 3,880,273 | A | 4/1975 | Kaplan |
| 3,880,296 | A | 4/1975 | Kaplan |
| 3,920,132 | A | 11/1975 | Cleland |
| 3,985,241 | A * | 10/1976 | Goldie ................. B21B 39/002 414/793.2 |
| 4,105,108 | A | 8/1978 | Lauer |
| 4,165,006 | A | 8/1979 | Brusa |
| 4,394,899 | A | 7/1983 | Fluck |
| 4,648,770 | A | 3/1987 | Berz et al. |
| 5,027,700 | A | 7/1991 | Tschesche |
| 5,141,388 | A | 8/1992 | Georgitsis et al. |
| 5,340,270 | A * | 8/1994 | Castellani ............ B65G 57/081 414/793.2 |
| 5,456,572 | A | 10/1995 | Overington |
| 5,570,995 | A | 11/1996 | Offoiach |
| 5,944,478 | A | 8/1999 | Colombo et al. |
| 6,109,862 | A | 8/2000 | Overington |
| 6,446,785 | B1 * | 9/2002 | Tremblay ............. B65G 47/248 198/404 |
| 6,488,465 | B1 | 12/2002 | Overington |
| 7,153,086 | B2 * | 12/2006 | Kauppila ............... B65G 47/24 414/758 |
| 7,695,240 | B2 | 4/2010 | Ghosh |
| 9,511,887 | B2 | 12/2016 | Barone |
| 2003/0218291 | A1 | 11/2003 | Caunter et al. |
| 2008/0199296 | A1 | 8/2008 | Ghosh et al. |
| 2009/0263231 | A1 | 10/2009 | Ghosh et al. |
| 2013/0115039 | A1 | 5/2013 | Cianci |

FOREIGN PATENT DOCUMENTS

| | | |
|---|---|---|
| DE | 2731551 | 1/1973 |
| DE | 02520592 | 11/1976 |
| DE | 3611156 | 12/1986 |
| DE | 4132231 | 4/1993 |
| DE | 29604813 | 2/1997 |
| DE | 102008027943 | 12/2008 |
| EP | 0196685 | 10/1986 |
| EP | 0372314 | 6/1990 |
| EP | 0819631 | 1/1998 |
| EP | 1961682 | 8/2008 |
| ES | 8400982 | 2/1984 |
| ES | 1003449 | 7/1988 |
| ES | 2005394 | 3/1989 |
| ES | 1037868 | 4/1998 |
| ES | 2232256 | 5/2005 |
| FR | 2866639 | 8/2005 |
| JP | S5772518 | 10/1980 |
| JP | 361178324 | 8/1986 |
| RU | 2061639 | 6/1996 |
| WO | 2008037723 | 4/2008 |

OTHER PUBLICATIONS

Mexican Industrial Property Institute, "Office Action," issued in connection with Mexican Patent Application No. MX/a/2015/002579, dated Jan. 31, 2018, 5 pages.

United States Patent and Trademark Office, "Non-Final Office Action," issued in connection with U.S. Appl. No. 15/348,584, dated Dec. 29, 2017, 11 pages.

Mexican Industrial Property Institute, "Office Action," issued in connection with Mexican Patent Application No. MX/a/2015/002579, dated Oct. 23 2017, 5 pages.

Argentinian Patent Office, "Examination Report," issued in connection with Argentinian Patent Application No. P13010565, dated Apr. 12, 2017, 11 pages.

Argentinian Patent Office, "Office action," issued in connection with Argentinian Patent Application No. P140102089, dated Jun. 14, 2017, 7 pages.

Canadian Intellectual Property Office, "Notice of Allowance," issued in connection with Canadian Patent Application No. 2,874,915, dated Jun. 20, 2017, 1 page.

Canadian Intellectual Property Office, "Office Action," issued in connection with Canadian Patent Application No. 2,874,915, dated Feb. 16, 2016, 4 pages.

Canadian Intellectual Property Office, "Office Action," issued in connection with Canadian Patent Application No. 2,874,915, dated Dec. 12, 2016, 4 pages.

Canadian Intellectual Property Office, "Notice of Acceptance," issued in connection with Canadian Patent Application No. 2,882,065, dated Jul. 21, 2016, 1 pages.

European Patent Office, "Extended European Search Report," issued in connection with European patent Application No. 14199357, dated Apr. 24, 2015, 7 pages.

European Patent Office, "Extended European Search Report," issued in connection with European patent Application No. 15152692, dated Oct. 9, 2015, 9 pages.

European Patent Office, "Decision to Grant," issued in connection with European patent Application No. 15152692.8, dated Apr. 21, 2017, 2 pages.

European Patent Office, "Decision to Grant," issued in connection with European patent Application No. 14199357.6, dated Aug. 25, 2016, 2 pages.

European Patent Office, "Partial European Search Report," issued in connection with European patent Application No. 14199357, dated Apr. 24, 2015, 4 pages.

Federal Service for Intellectual Property, "Office Action," issued in connection with Russian Application No. 2014151754/(082871), dated Mar. 1, 2016, 10 pages.

Federal Service for Intellectual Property, "Decision of Grant," issued in connection with Russian Application No. 2015110998, dated May 4, 2016, 20 pages.

Federal Service for Intellectual Property, "Decision of Grant," issued in connection with Russian Application No. 2014151754, dated Jun. 28, 2016, 17 pages.

IP Australia, "Examination Report No. 1," issued in connection with Australian patent Application No. 2014277755, dated Sep. 11, 2015, 5 pages.

IP Australia, "Examination Report No. 1," issued in connection with Australian patent Application No. 2015200118, dated Sep. 11, 2015, 5 pages.

IP Australia, "Examination Report No. 1," issued in connection with Australian patent Application No. 2016203019, dated Jun. 2, 2017, 2 pages.

IP Australia, "Examination Report No. 1," issued in connection with Australian patent Application No. 2016203020, dated Jun. 2, 2017, 2 pages.

IP Australia, "Notice of Acceptance," issued in connection with Australian patent Application No. 2016203020, dated Jul. 6, 2017, 3 pages.

IP Australia, "Notice of Acceptance," issued in connection with Australian patent Application No. 2016203019, dated Jul. 6, 2017, 3 pages.

(56) References Cited

OTHER PUBLICATIONS

IP Australia, "Notice of Acceptance," issued in connection with Australian patent Application No. 2014277755, dated Jun. 29, 2016, 3 pages.
IP Australia, "Examination Report No. 2," issued in connection with Australian patent Application No. 2014277755, dated Feb. 10, 2016, 3 pages.
Mexican Industrial Property Institute, "First Examination Report," issued in connection with Mexican Patent Application No. MX/a/2014/016066, dated Jun. 20, 2017, 6 pages.
Mexican Industrial Property Institute, "Notice of Allowance," issued in connection with Mexican Patent Application No. MX/a/2017/060699, dated Aug. 28, 2017, 4 pages.
State Intellectual Property Office of the P.R. China, "Notification of the First Office Action," issued in connection with Chinese Patent Application No. 201410836751.7, dated Mar. 31, 2016, 17 pages.
State Intellectual Property Office of the P.R. China, "Second Office Action," issued in connection with Chinese Patent Application No. 201410836751.7, dated Oct. 31, 2016, 8 pages.
United States Patent and Trademark Office, "Notice of Allowance," issued in connection with U.S. Appl. No. 14/591,619, dated Jul. 29, 2016, 6 pages.
United States Patent and Trademark Office, "Office Action," issued in connection with U.S. Appl. No. 14/591,619, dated Mar. 30, 2016, 9 pages.
United States Patent and Trademark Office, "Restriction and/or Election Requirement," issued in connection with U.S. Appl. No. 14/591,619, dated Mar. 4, 2016, 8 pages.
United States Patent and Trademark Office, "Notice of Allowance," issued in connection with U.S. Appl. No. 14/566,426, dated Aug. 4, 2017, 5 pages.
United States Patent and Trademark Office, "Notice of Allowability," issued in connection with U.S. Appl. No. 14/566,426, dated Aug. 21, 2017, 2 pages.
United States Patent and Trademark Office, "Notice of Allowability" issued in connection with U.S. Appl. No. 14/566,426, dated Nov. 22, 2017, 2 pages.
United States Patent and Trademark Office, "Non-Final Rejection," issued in connection with U.S. Appl. No. 14/566,426, dated Jun. 20, 2017, 8 pages.
United States Patent and Trademark Office, "Office Action," issued in connection with U.S. Appl. No. 14/566,426, dated Feb. 28, 2017, 6 pages.
National Institute of Industrial Property, "Search Report and Opinion," issued in connection with Brazilian Patent Application No. BR102014032437-2, dated Nov. 7, 2019, machine translation included, 8 pages.

\* cited by examiner

AUTOMATIC PACKAGING LINE TO PACK PROFILES AND ROTOR

RELATED APPLICATIONS

This patent arises from a continuation of U.S. application Ser. No. 14/566,426, filed Dec. 10, 2014, and titled "AUTOMATIC PACKAGING LINE TO PACK PROFILES AND ROTOR," which claims priority to Argentine Patent Application No. P13 01 05065, filed Dec. 27, 2013, and titled "LÍNEA AUTOMÁTICA DE EMPAQUE PARA EMBALAR PERFILES Y ROTOR," both of which hereby incorporated by reference in their entireties.

TECHNICAL FIELD

The present disclosure relates generally to a packaging line and, more particularly, to an automatic packaging line to pack profiles and a rotor.

BACKGROUND

Opened structural profiles or molds, such as those having a U-shaped or C-shaped cross-section, are often used in the lightweight steel construction industry, especially in structures used for industrial buildings and in the agricultural industry. These structural profiles are also used for housing and commercial structures, which reduce costs in materials such as, for example, labor, by the characteristics of its sections. The U-shaped or C-shaped section also optimizes the strength-weight relationship, which produces an excellent finish for the view elements.

Spanish utility model application ES 1003449U refers to automatic equipment for packing profiles, especially those of aluminum. This equipment does not include duplex packaging and, therefore, does not reduce packaging space. Spanish utility model application ES 1037868U refers to a positioning wrapper for linear profiles. It also does not include duplex packaging of U- or C-shaped profiles or molds. As a result, the packages occupy more space. Spanish utility model application ES 2005394U refers to an automatic machine for packing profiles, especially those of aluminum. This equipment does not include duplex packaging of U- or C-shaped profiles or molds and, therefore, also does not provide the packaging space reduction.

The publication of Spanish Patent ES 2232256 refers to a stacker machine of profiles of the kind that is established during the manufacturing and packaging of automated profiles, its carriage and grouping. It does not contemplate the packaging of duplexes of U- or C-shaped and, therefore, it does not reduce packaging space.

The publication of Spanish Patent Application ES 8400982A1 refers to a job procedure to form packages of profiled bars embedded, or not one to each other and devices for the implementation of the procedure. However, this procedure is relative slow and expensive for the final product.

BRIEF DESCRIPTION OF THE DRAWINGS

FIG. 3 shows the example first profile in mid-rotation.

FIG. 14 also illustrates an enlarged view of the rotor of FIG. 8A with the example vertical and horizontal magnets.

FIG. 15 also illustrates an enlarged view of an example magnetic stopper that an example second profile is to engage.

FIG. 21 also illustrates an enlarged view of an example moving stopper and an example length feeder.

FIG. 25 also illustrates an enlarged view of one of the example arm plug holders with an example hand.

Figure 1:
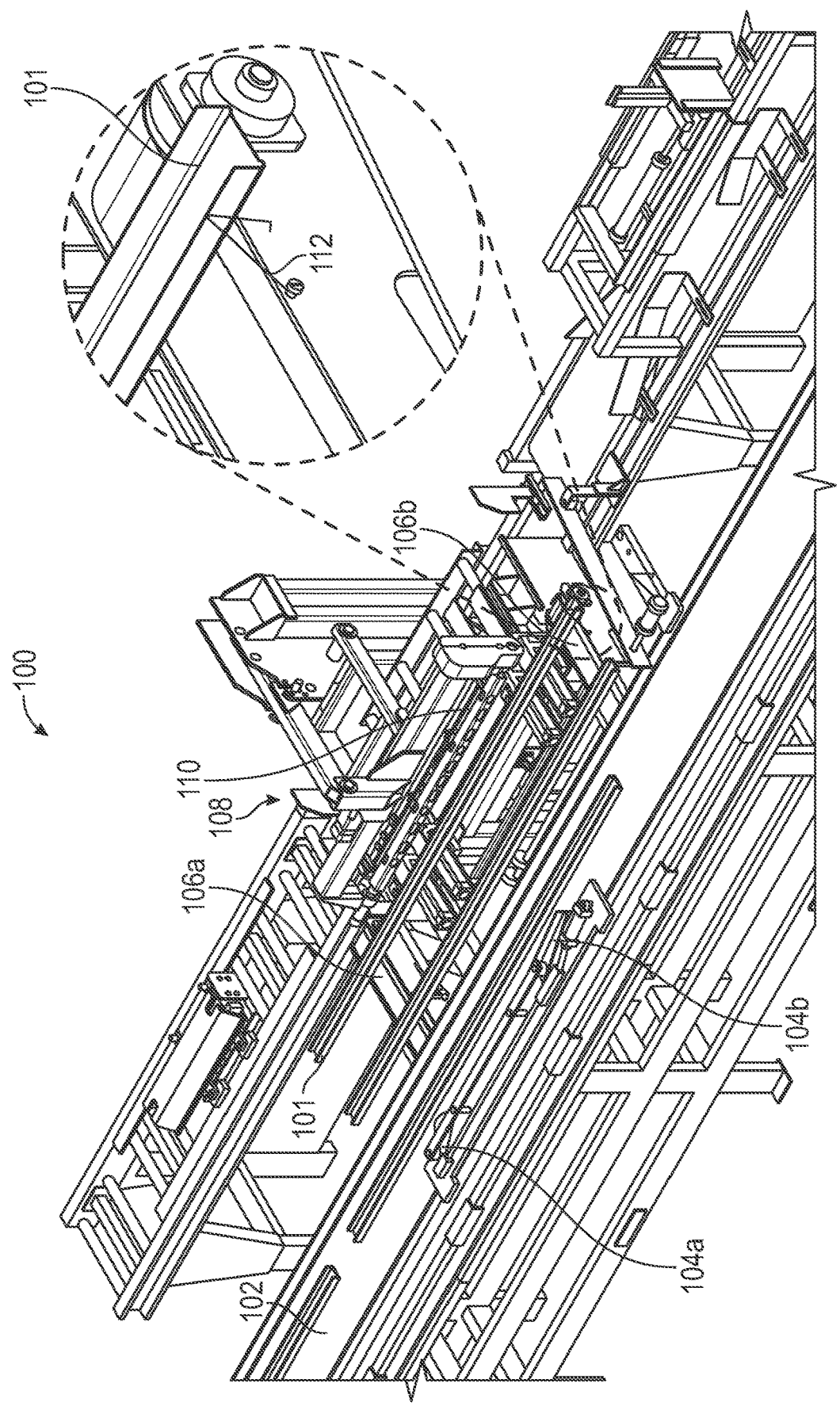
FIG. 1 illustrates a perspective view of an example automatic packaging line to pack profiles and an example rotor in accordance with the teachings of this disclosure.

Certain examples will be better understood when read in conjunction with the provided drawings, which illustrate examples. It should be understood, however, that the examples are not limited to the arrangements and instrumentality shown in the attached drawings. Wherever possible, the same reference numbers will be used throughout the drawing(s) and accompanying written description to refer to the same or like parts. The figures are not to scale.

DETAILED DESCRIPTION

Disclosed herein is an example automatic packaging line to pack profiles or molds such as, for example, galvanized steel profiles, having a U-shaped or C-shaped section (e.g., cross-section). In general, a U-shaped or C-shaped profile has a convex side (e.g., an external side, part, surface, section, form, curve) and a hollow or concave side (opposite the convex side). In some examples, a U-shaped or C-shaped profile is defined by two side walls (e.g., wings, flaps, surfaces, etc.) and a base wall between the two side walls. The example automatic packaging line includes a rotor. The example automatic packaging line is to pick up profiles from an outlet of a cutter of a profiling making machine. A profile making machine utilizes plastic straining of a flat plane (e.g., a sheet) and several rollers to transform the flat plane into a profile. The example automatic packaging line arranges the profiles in rows of duplexes or double profiles that form a smaller packaging unit or mini-pack (e.g., a mini-bundle). The smaller packaging units are strapped and transferred in a lowering table to create a pack of a certain amount of rows and columns of mini-packs, which are then strapped and palletized.

Disclosed herein are example automatic packaging lines to pack profiles having a U-shaped or a C-shaped section, which have a convex side and a concave side between two lateral sides. An example automatic packaging line includes a first conveyor belt located at an exit of a profiler or forming machine cutter to transport profiles with their concave sides facing upwards, two pivoting kickers to transport the profiles in a direction that is perpendicular to the first conveyor belt and second and third conveyor belts oriented perpendicular to the first conveyor belt. The second and third conveyor belts receive the profiles transported by the two pivoting kickers and transport the profiles in a direction that is perpendicular to the first conveyor belt.

The example automatic packaging line includes a moving head block with upward and downward movement including a rotor to perform a 180 degree (°) movement. The rotor is to connect to a first profile transported by the second and third conveyor belts and positioned with its concave side facing upwards and turn the first profile to position the first profile with its concave side facing downwards over a second profile with its concave side facing upwards that is transported by the second and third conveyor belts under the moving head block to form a duplex. The duplex is formed when one of the sides of the first profile is inserted in the concave side of the second profile and one of the sides of the second profile is inserted in the concave side of the first profile.

The example automatic packaging line includes two magnetic stoppers located at respective ends of the second and third conveyor belts and at respective front sections of two transfer plates. The two magnetic stoppers move up and down below a level of the two transfer plates to allow the second profile transported under the moving head block by the second and third conveyor belts to contact the two magnetic stoppers over the front sections of the two transfer plates to prevent the second profile from moving forward until the first profile in the rotor is inserted in the second profile to form the duplex. The example automatic packaging line includes two pneumatic actuators with respective transfer triggers of one direction. The two pneumatic actuators transport the duplex from where it is held by the two magnetic stoppers in the front sections of the two transfer plates when the two magnetic stoppers move down below the level of the two transfer plates. The duplex is free to move when the two magnetic stoppers are below the level of the two transfer plates. The transfer plates include sheet edges located adjacent the second and third conveyor belts where duplexes move.

The example automatic packaging line includes a first lowering table having an actuator and racks to provide vertical upward and downward movement and four blades to provide transversal movement. The four blades include two vertical movement blades and two horizontal movement blades actuated by pneumatic cylinders. The blades move to accommodate duplexes in rows that are overlapped to form a mini-pack. The example automatic packaging line includes a first bed of rollers to support the mini-pack when the two vertical blades move down below the level of the first bed of rollers and a fourth conveyor belt with a moving stopper to transport the mini-pack formed in the first bed of rollers. The moving stopper includes a plate to descend from a position higher than the fourth conveyor belt to a level of the fourth conveyor belt to align the profiles of the mini-pack.

The example automatic packaging line includes a pneumatic actuator to actuate a pressure plate with a sensor that accompanies the transfer of the mini-pack from the first bed of rollers to the fourth conveyor belt, a longitudinal mini-pack feeder that is adjustable to the length of the profiles to be aligned against the moving stopper and first and second automatic strappers separated by a second bed of rollers and located at an outlet of the longitudinal mini-pack feeder. The first and second automatic strappers strap each mini-pack in two or more locations.

The example automatic packaging line includes a third bed of rollers located at an outlet of the second automatic strapper over which the strapped mini-pack moves. The third bed of rollers has a fixed stopper at an end where the strapped mini-pack is held. The example automatic packaging line includes a mini-pack extractor having a bracket coupled to a chain to transport the strapped mini-pack held on the third bed of rollers in a direction that is perpendicular to the third bed of rollers, a second lowering table with a fourth bed of rollers to move vertically downward to place each strapped mini-pack transported by the mini-pack extractor in rows and columns to form a pack and a third strapper to receive the pack from the second lowering table, the second lowering table to raise the pack up to a working plane. Each pack is transported through the fourth bed of rollers to be strapped in two or more locations.

The example automatic packaging line includes a palletizer located at the end of the third strapper. In some examples, the palletizer includes an arc and a powered bed of rollers mounted in front of the arc that moves up and down via a screw. The screw is driven from above by an actuator and the powered bed of rollers is driven by a geared motor located at one end. The powered bed of rollers is fixed by mobile pins set on one side of the powered bed of rollers. A receiving position of the pack coincides with the working plane of the third strapper. The palletizer includes an ejector mounted on a frame supporting the powered bed of rollers. The ejector is driven by a geared motor and linear guides.

Also, in some examples, the palletizer includes dowel-holding arms mounted over the frame supporting the powered bed of rollers. The dowel-holding arms rotate via respective pneumatic drives and actuate respective hands via respective pneumatic actuators. The dowel-holding arms extend respective arms via respective pneumatic actuators. The palletizer includes dowel loaders having respective tubular structures and horizontal guillotines that are to be actuated by respective pneumatic engines. The horizontal guillotines provide dowels to the hands of the respective dowel-holding arms. The dowel loaders have respective dowel cavities that are adjustable to different dowel lengths via respective handles. The palletizer includes a bed of chains having a tubular frame to support driving and driven pinion shafts. The bed of chains includes a chain driven by a geared motor located at one end on the links and crossbars to support the pack. The crossbars are spaced to allow the placing of lower dowels during strapping, which accommodates packs separated by the dowels to form a pallet for shipment.

In some example automatic packaging lines, when the sensor of the pressure plate detects the mini-pack in the first bed of rollers, the sensor simultaneously activates the fourth conveyor belt and the first bed of rollers to transfer the mini-pack against the moving stopper to leave a space to assemble another mini-pack.

In some examples, the rotor of the example automatic packaging includes a tubular body with a hollow section at each end forming respective internal lungs. The internal lungs operate as pneumatic lungs for six pneumatic actuators coupled to the rotor. The example rotor includes a pneumatic rotary joint coupled to one end of the rotor to communicate a first one of the internal lungs with the pneumatic actuators. The pneumatic rotary joint receives compressed air to provide the pneumatic actuators. The example rotor, in some examples, also includes an electric rotary joint coupled to the other end of the rotor. The electric rotary joint to supplies power to solenoids to activate the pneumatic actuators and to profile detection sensors. The profile detection sensors detect profiles coupled to the rotor and the performance of a rotation cycle.

In some examples, the rotor includes movable vertical permanent magnets and horizontal permanent magnets to couple a profile to the rotor. The vertical permanent magnets are arranged in two rows that are in respective compartments parallel to a longitudinal axis of the rotor and which are located 180° from each other. The compartments include openings in vertical sheets of the compartments where a profile is associated. Movement of the vertical permanent magnets exposes attractive faces of the vertical permanent magnets though the openings on the vertical sheets to attract a profile and hold the profile by one of its sides. The horizontal permanent magnets are arranged perpendicular to the longitudinal axis of the rotor and arranged at the ends of the rotor. The horizontal permanent magnets are arranged in respective compartments including horizontal sheets with openings arranged perpendicular to the longitudinal axis of the rotor through which the profile is held from its convex side. Movement of the horizontal permanent magnets exposes attractive faces of the horizontal permanent magnets through the openings in the horizontal sheets to attract the profile.

In some examples, the example vertical permanent magnets are coupled to each other by connecting rods that are to rotate the vertical permanent magnets 90° perpendicular to the longitudinal axis of the rotor. In some examples, the example vertical permanent magnets are to be rotated 90° via pneumatic actuators acting on the connecting rods.

In some examples, the example horizontal permanent magnets are coupled to each other via pneumatic actuators that are to rotate the horizontal permanent magnets 90° parallel to the longitudinal axis of the rotor. In some such examples, the horizontal permanent magnets are to be rotated 90° via direct action of the pneumatic actuators.

In some examples, the example automatic packaging line is characterized by an operation of designating the amount of duplexes to be included in the rows to form a mini-pack using a touch screen of the automatic packaging line. In some such examples, the operation being scheduled by programmable logic controller of the automatic packaging line. In some examples, the programmable logic controller is to control components of the automatic packaging line to pack the profiles.

In some examples, the electric rotary joint of the rotor communicates data to the solenoids and the profile detection sensors during a rotation, which allows the rotor to be rotated without losing connection between a control system and the solenoids and the sensors of the rotor.

Another example packaging line disclosed herein is to pack profiles having a U-shaped or a C-shaped cross-section formed by a first side wall, a second side walls and a base wall between the first and second side walls. The example packaging line includes a first conveyor and a second conveyor to transfer profiles. The first conveyor and the second conveyor are spaced from and parallel to each other. The example packaging line also includes a head block to move upward and downward. The first conveyor and the second conveyor are to transfer profiles to an area beneath the head block. The example packaging line further includes a rotor, carried by the head block, to couple to a first profile transferred by the first and second conveyors with a concave side of the first profile facing upwards. The rotor is to rotate the first profile such that the concave side of the first profile is facing downwards over a second profile with a concave side of the second profile facing upward. The rotor is to release the first profile to insert the first profile into the second profile to form a duplex.

In some examples, the rotor includes a body, a first set of magnets arranged in a first row along a longitudinal axis of the body and a second set of magnets disposed outward from the body in a direction that is perpendicular to the longitudinal axis of the body. The first set of magnets is to engage a side wall of the first profile and the second set of magnets to engage a base wall of the first profile. In some examples, the magnets of the first set of magnets and the second set of magnets are pivotable about their respective axes. In some examples, the rotor comprises a first actuator to pivot the magnets of the first set of magnets about their respective axes. The first actuator is to pivot the magnets of the first set of magnets to face perpendicularly to the longitudinal axis of the body to engage the side wall of the first profile and pivot the magnets of the first set of magnets to face parallel to the longitudinal axis of the body to release the first profile. In some examples, the rotor includes a connecting rod coupled between the magnets of the first set of magnets. The connecting rod is to simultaneously pivot the magnets of the first set of magnets. In some examples, the rotor includes a second actuator and a third actuator to move the magnets of the second set of magnets. In some such examples, the body of the rotor includes a first inner cavity and a second inner cavity to form internal lungs to operate the first, second and third actuators. In some examples, the rotor comprises a pneumatic rotary joint at one end of the body to supply compressed fluid to the first and second inner cavities of the body. The compressed fluid is to operate the first, second and third actuators. In some examples, the rotor includes an electric rotary joint at an opposite end of the body than the pneumatic rotary joint. The electric rotary joint is to supply power to solenoids to activate the actuators.

In some examples, the rotor includes a third set of magnets arranged in a second row along the longitudinal axis of the body. The third set of magnets is disposed on an opposite side of the body than the first set of magnets. In such an example, the rotor also includes a fourth set of magnets disposed outwardly from the body in a direction that is opposite to the second set of magnets. The third set of magnets is to engage a side wall of third profile and the fourth set of magnets to engage a base wall of the third profile.

An example method disclosed herein includes transferring a first profile to a movable head carrying a rotor. In the example method, the first profile has a U-shaped or C-shaped cross-section formed by a first side wall, a second sidewall and a base wall between the first and second side walls. The example method includes coupling the first profile to the rotor with a concave section of the first profile facing upwards, rotating, via the rotor, the first profile such that the concave section of the first profile is facing downwards, transferring a second profile to the movable head with a concave section of the second profile facing upwards and releasing the first profile over the second profile to insert one of the side walls of the first profile into the concave section of the second profile and one of the side walls of the second profile into the concave section of the first profile.

In some examples, coupling the first profile to the rotor includes coupling the first sidewall and the base of the first profile to the rotor. In some such examples, coupling the first profile to the rotor includes actuating a first set of magnets carried by the rotor to face the first side wall of the first profile. In such an example, the first set of magnets is arranged in a row along a longitudinal axis of the rotor. In some examples, actuating the first set of magnets includes pivoting the magnets to face a direction that that is perpendicular to the first wall of the first profile. In some examples, coupling the first profile includes actuating a second set of magnets carried by the rotor to face the base wall of the first profile. In such an example, the second set of magnets is disposed outward from the rotor in a direction that is perpendicular to the longitudinal axis of the rotor. In some examples, releasing the first profile includes actuating the first set of magnets to face a direction that is not perpendicular to the first side wall of the first profile and actuating the second set of magnets to face a direction that is not perpendicular to the base wall of the first profile.

In some examples, rotating the first profile comprises rotating the rotor 180° about a longitudinal axis of the rotor.

In some examples, the first profile is coupled to the rotor along a first side of the rotor, and the method further includes coupling a third profile to the rotor along a second side of the rotor opposite the first side of the rotor.

In some examples, the method further includes supplying compressed fluid to the rotor through a pneumatic rotary joint disposed on one end of the rotor. In some such examples, the method further includes actuating magnets carried by the rotor with the compressed fluid to couple the first profile to the rotor and release the profile from the rotor.

Referring now to the figures, an example automatic packaging line 100 is illustrated in FIG. 1. The example line 100 includes a conveyor belt 102 (e.g., a main conveyor belt) that is mounted at an outlet (e.g., an exit) of a cutting machine and/or a profile making machine. Profiles having U-shaped or C-shaped sections leave the cutting machine and are transferred by the conveyor belt 102 with their concave sides facing upwards. The profiles are transferred via first and second pivoting kickers 104a, 104b. In the illustrated example, the pivoting kickers 104a, 104b are pneumatically driven. The pivoting kickers 104a, 104b move the profiles in a direction that is perpendicular to their direction along the conveyor belt 102. In the illustrated example, the pivoting kickers 104a, 104b move the profiles from the conveyor belt 102 and place the profiles onto conveyor belts 106a, 106b, which are positioned perpendicular to the conveyor belt 102. In this manner, the pivoting kickers 104a, 104b move the profiles perpendicularly from the conveyor belt 102 toward the conveyor belts 106a, 106b.

Figure 2:
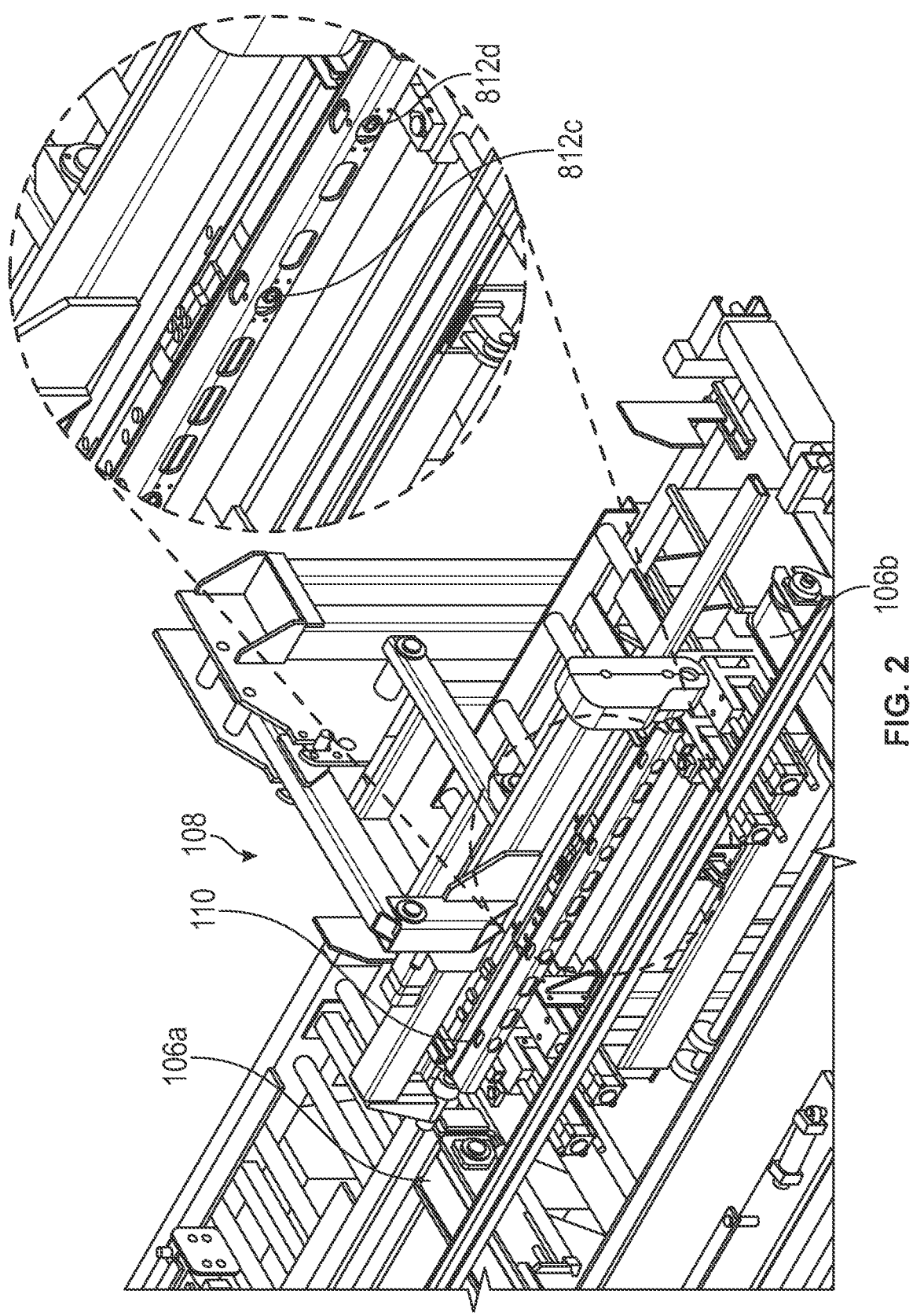
FIG. 2 illustrates a perspective view of an example head carrying the example rotor of FIG. 1.

As illustrated in FIGS. 1 and 2, the conveyor belts 106a, 106b move the profiles to a head 108 (e.g., a head block) that carries a rotor 110. The example head 108 is moveable up and down. For example, a first profile 101 with its concave side facing upwards exits the cutting machine and is carried by the conveyor belt 102 until an area (e.g., in front of the pivoting kickers 104a, 104b) where it is displaced perpendicularly by the pivoting kickers 104a, 104b, which are located on or adjacent the conveyor belt 102. After being displaced by the pivoting kickers 104a, 104b, the first profile 101 is carried on the conveyor belts 106a, 106b until it is stopped by a row of magnets (e.g., the vertical magnets 812*a-h* and/or the horizontal magnets 816*a-d* illustrated in FIG. 8 and disclosed in further detail herein) located on the rotor 110, which is coupled to the head 108. To prevent the first profile 101 from rebounding or bouncing back off of the magnets of the rotor 110, one or more stoppers are employed. As illustrated in the example of FIG. 1, a wire stopper 112 is coupled to a side of the conveyor 106*b*. The wire stopper 112 may be adjustable, depending on the shape or profile of the wire stopper 112. In some examples, a similar wire stopper is also coupled to the conveyor belt 106*a*.

Figure 3:
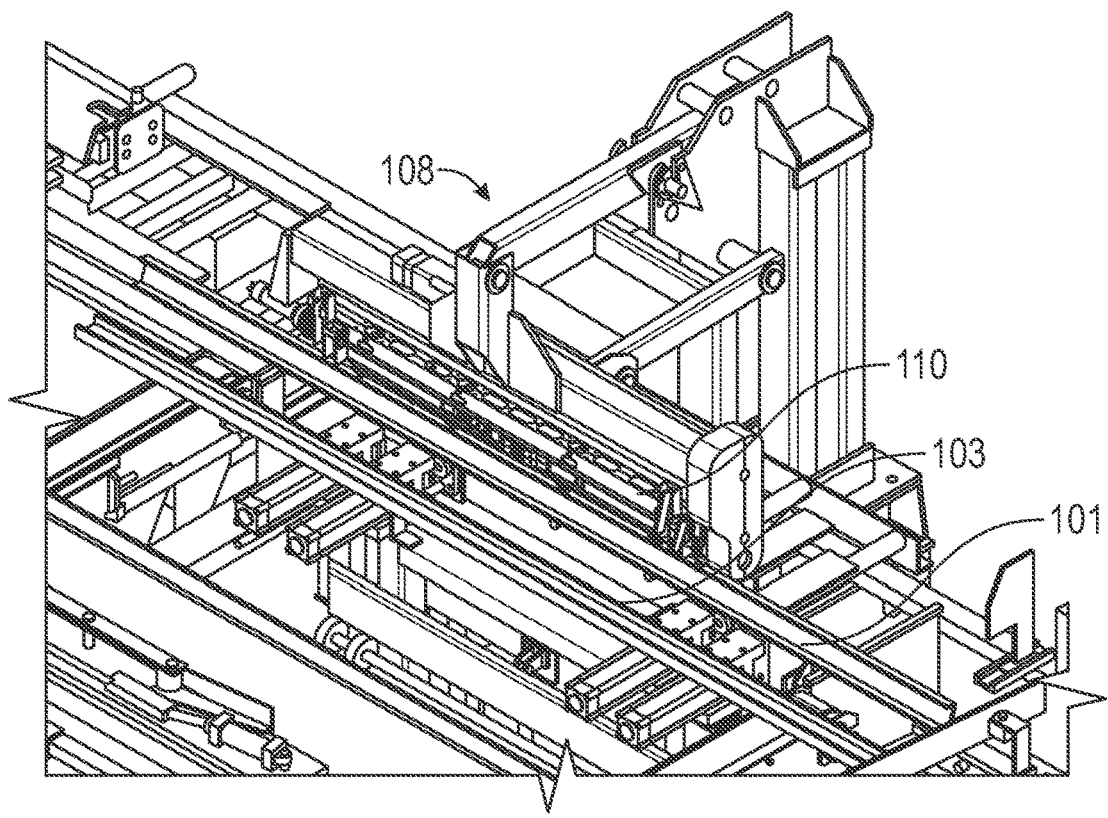
FIG. 3 illustrates a perspective view of the example rotor of FIG. 1 moving an example first profile by rotating and translating the first profile up and down while a second example profile is positioned below.
Figure 4:
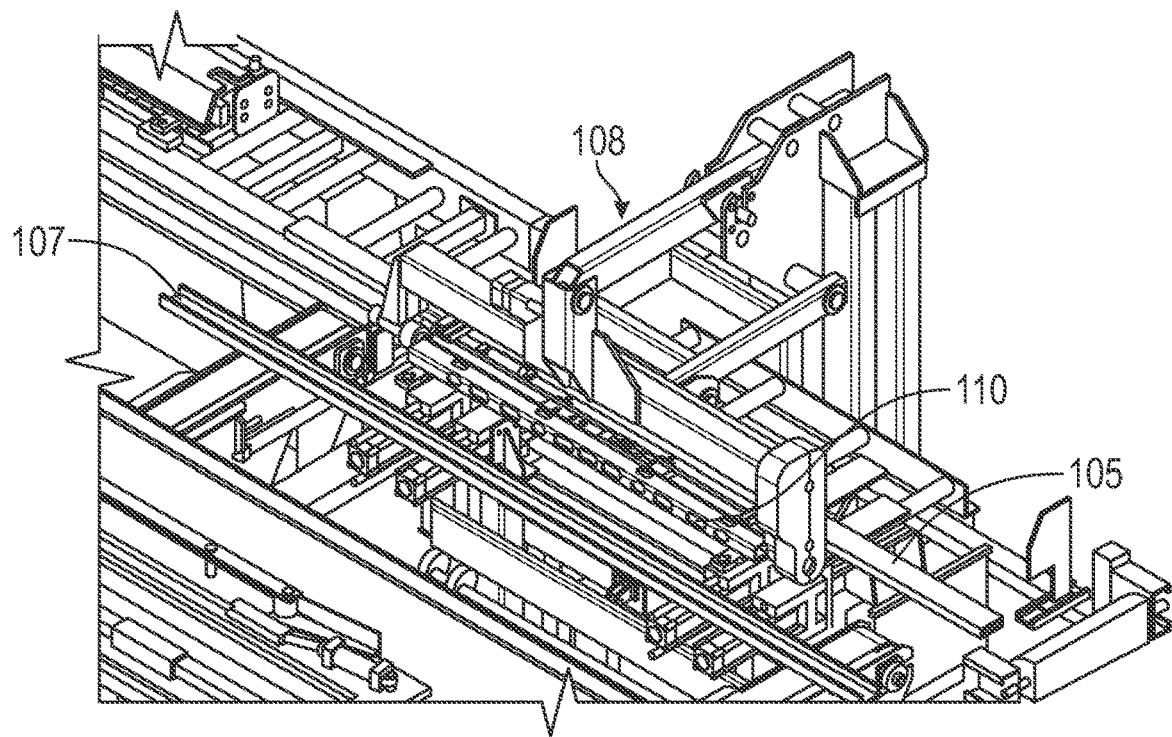
FIG. 4 illustrates a perspective view of the example rotor of FIG. 1 and an example duplex formed by the example first profile and the example second profile of FIG. 3.

As illustrated in the examples of FIGS. 3 and 4, the rotor 110 moves or transfers the profiles to form duplexes or double profiles. A duplex is formed, for example, when one side of a first profile is inserted into a concave side of a second profile, so that one side of the second profile is also inserted into a concave side of the first profile. In other words, an external face (e.g., surface) of one side of the first profile is linked (e.g., coupled, placed next to, engaged with) to an internal face (e.g., surface) of one side of the second profile, and an internal face of the other side of the first profile is linked to an external face of the other side of the second profile.

Figure 5:
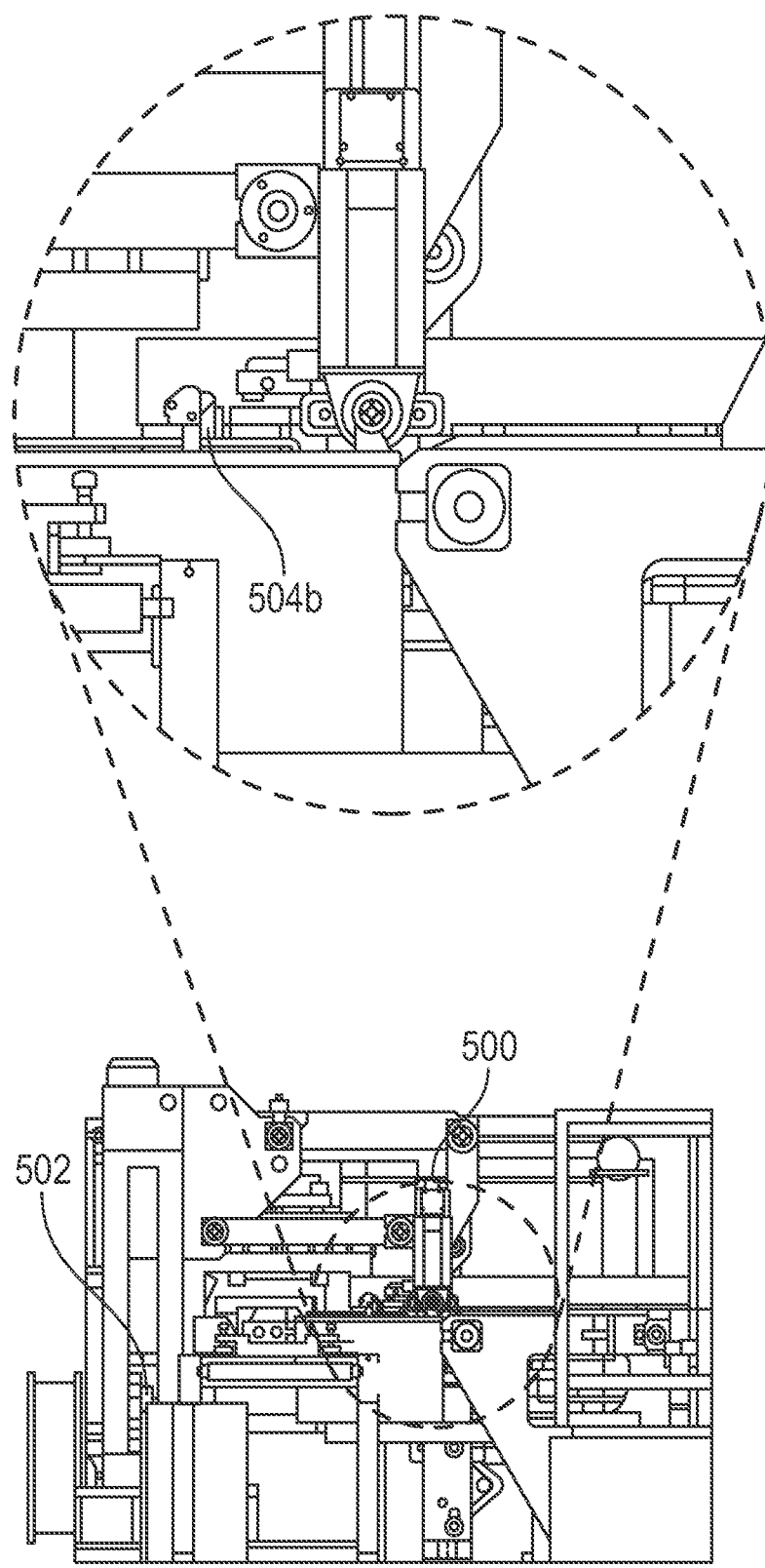
FIG. 5 illustrates a side view of the example head of FIG. 2 having an example servomotor to generate movement of the example head and an example magnetic stopper.

To make a duplex, for example, the first profile 101 is placed on the magnets (FIG. 2) of the rotor 110 and the rotor 110 makes two simultaneous or sequential movements: a rotation and a vertical translation (e.g., an up or down movement). FIG. 3 illustrates the first profile 101 and a second profile 103 that are used to make a duplex. The first profile 101, which is coupled (e.g., attached) to the rotor 110, is rotated and translated via the rotor 110. An example of a duplex 105 formed by the first and second profiles 101, 103 is illustrated in FIG. 4. The rotary and vertical movements are generated by servomotors 500, 502, respectively, for example, as illustrated in FIG. 5. In some examples, the movements are programmed to function simultaneously.

Figure 6:
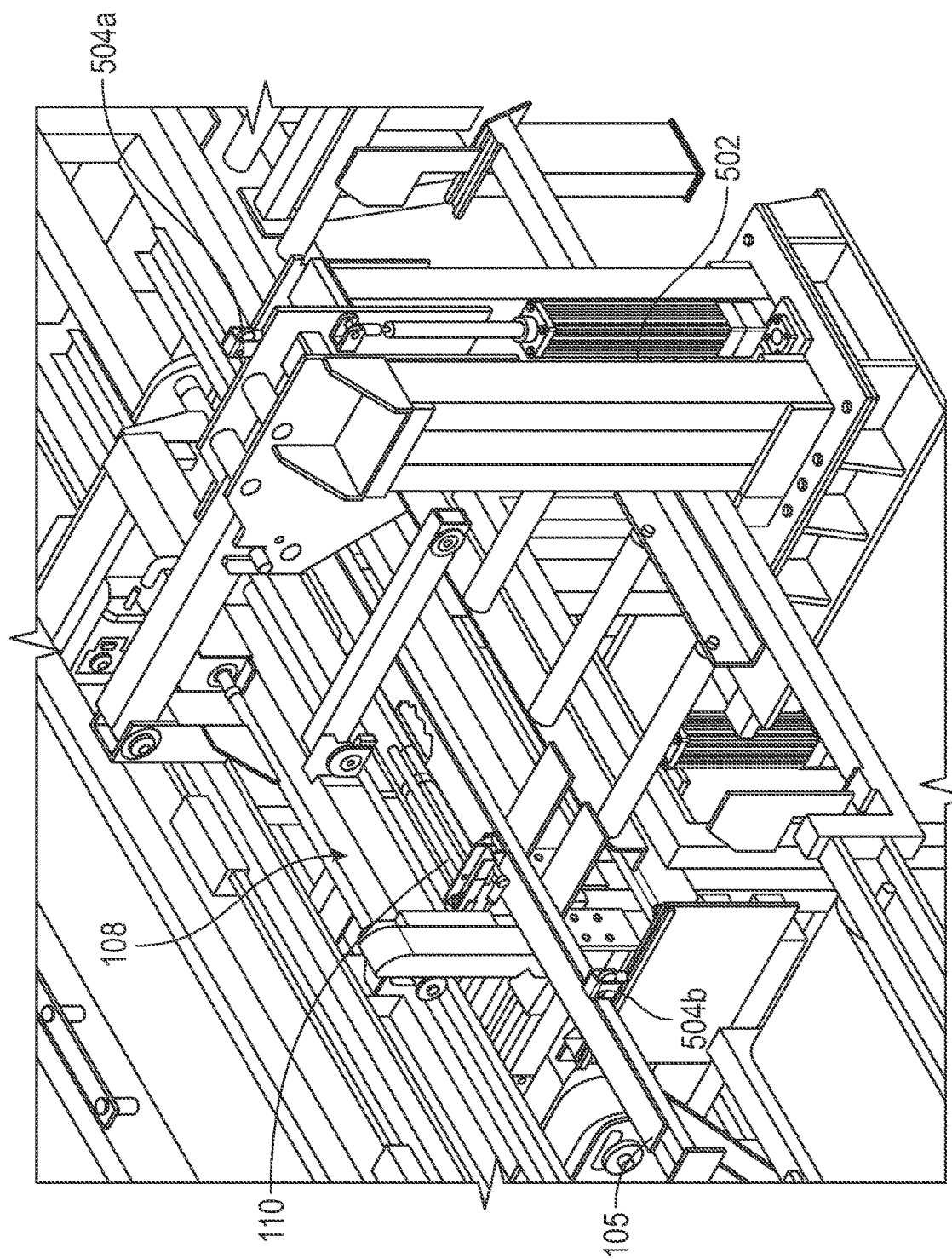
FIG. 6 illustrates a rear perspective view of the example head and the example duplex of FIG. 4.

To make the duplex 105, the rotor 110 rotates the first profile 101 180 degrees (e.g., about an axis of the rotor 110) when the second profile 105 of the duplex is positioned below the head 108 and the rotor 110. Specifically, the second profile 105 is moved until the second profile arrives at magnetic blocks or stoppers 504*a*, 504*b* (FIGS. 5 and 6). As illustrated in the example of FIGS. 5 and 6, the two magnetic stoppers 504*a*, 504*b* are located in both sides of the head 108, beyond the distance where the rotor 110 is driven. The magnetic stoppers 504*a*, 504*b* are located near a first (e.g., front) part of two transfer plates 700*a*, 700*b* (FIG. 7), respectively. The magnetic stoppers 504*a*, 504*b* translate up and down about the level of the two transfer plates 700*a*, 700*b*. This up movement allows the second profile 103 to be held by one of its sides until the rotor 110 places the first profile 101 on top of the second profile. The down movement of the magnetic stoppers 504*a*, 504*b* releases both profiles to create the duplex 105. The 180 degree turn of the rotor 110 positions the first profile 101 with its concave side facing downward. The second profile 103 with its concave side facing upwards is retained by the two magnetic stoppers 504*a*, 504*b* until the rotor 110 translated down and releases (e.g., via actuation of the magnets of the rotor 110) the first profile 101 with the concave side facing down on the second profile 103, which creates the duplex 105. At the same time as the rotor 110 is creating the duplex 105, another profile is transferred to the rotor 110 by the conveyor belts 106*a*, 106*b*. For example, as illustrated in FIG. 4, a third profile 107 is positioned in front of the rotor 110.

Figure 8A:
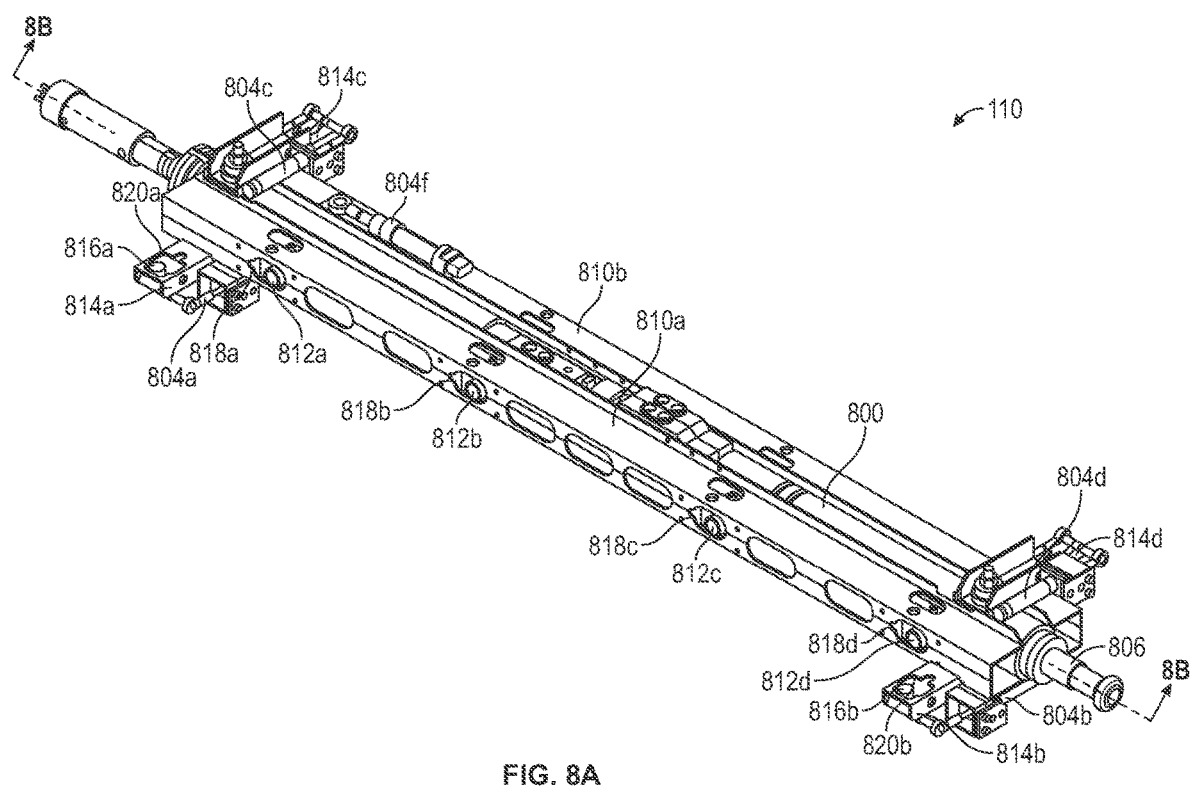
FIG. 8A illustrates a top perspective view of the example rotor of FIG. 1 having example horizontal magnets and example vertical magnets.
Figure 8B:
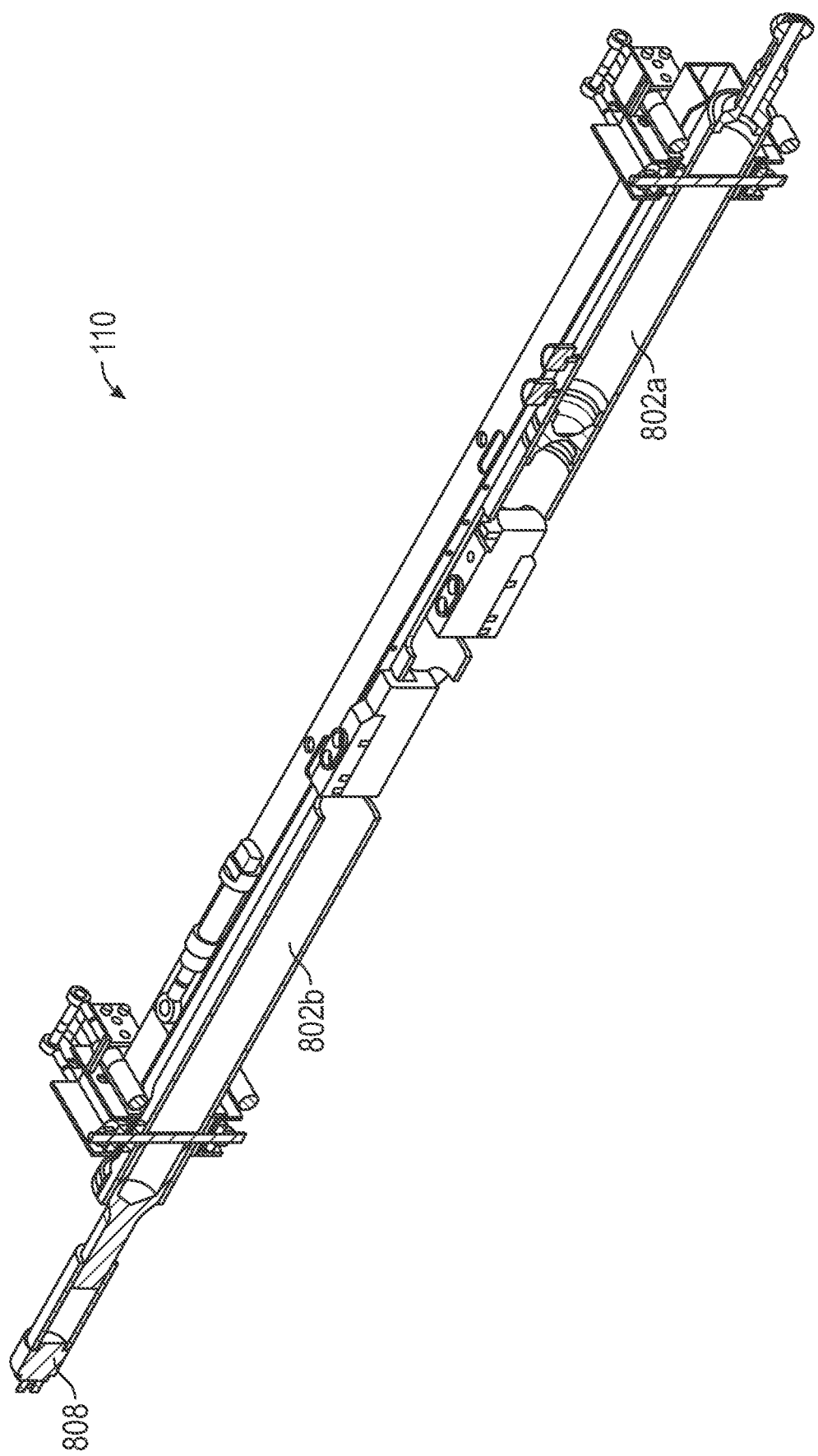
FIG. 8B illustrates a cross-sectional view of the example rotor of FIG. 8A taken along line 8B-8B of FIG. 8A.
Figure 8C:
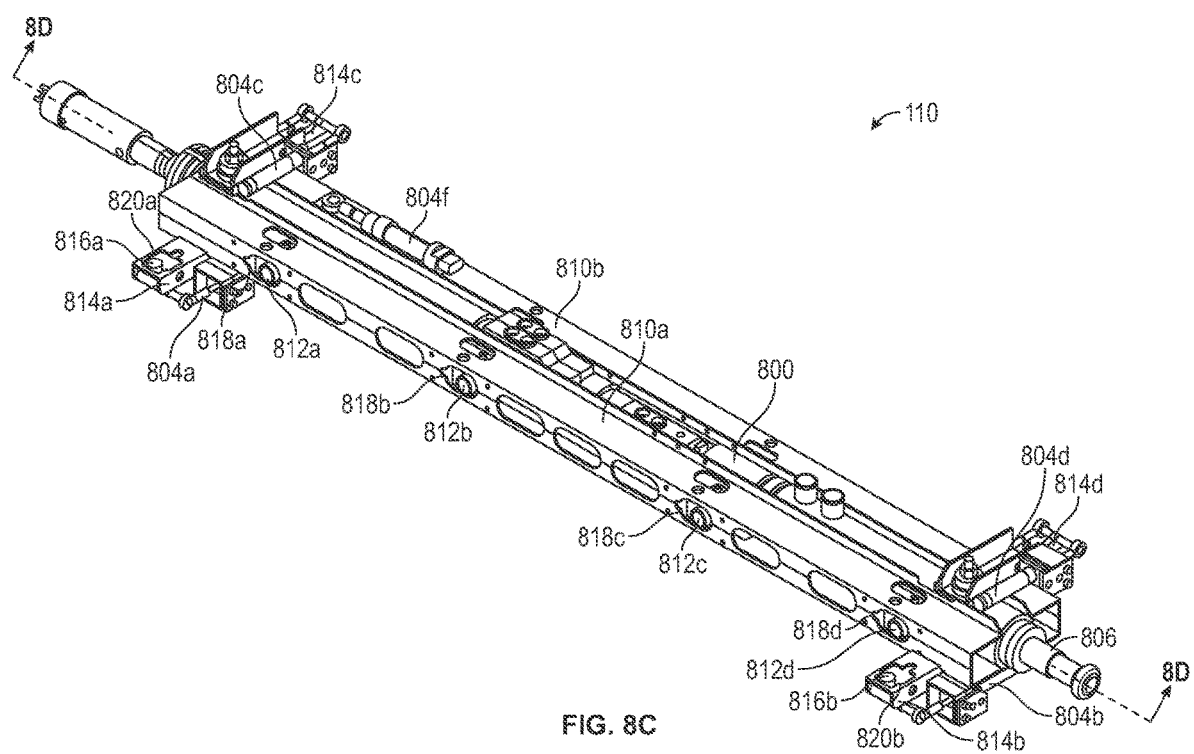
FIG. 8C illustrates another top perspective view of the example rotor of FIG. 8A.
Figure 8D:
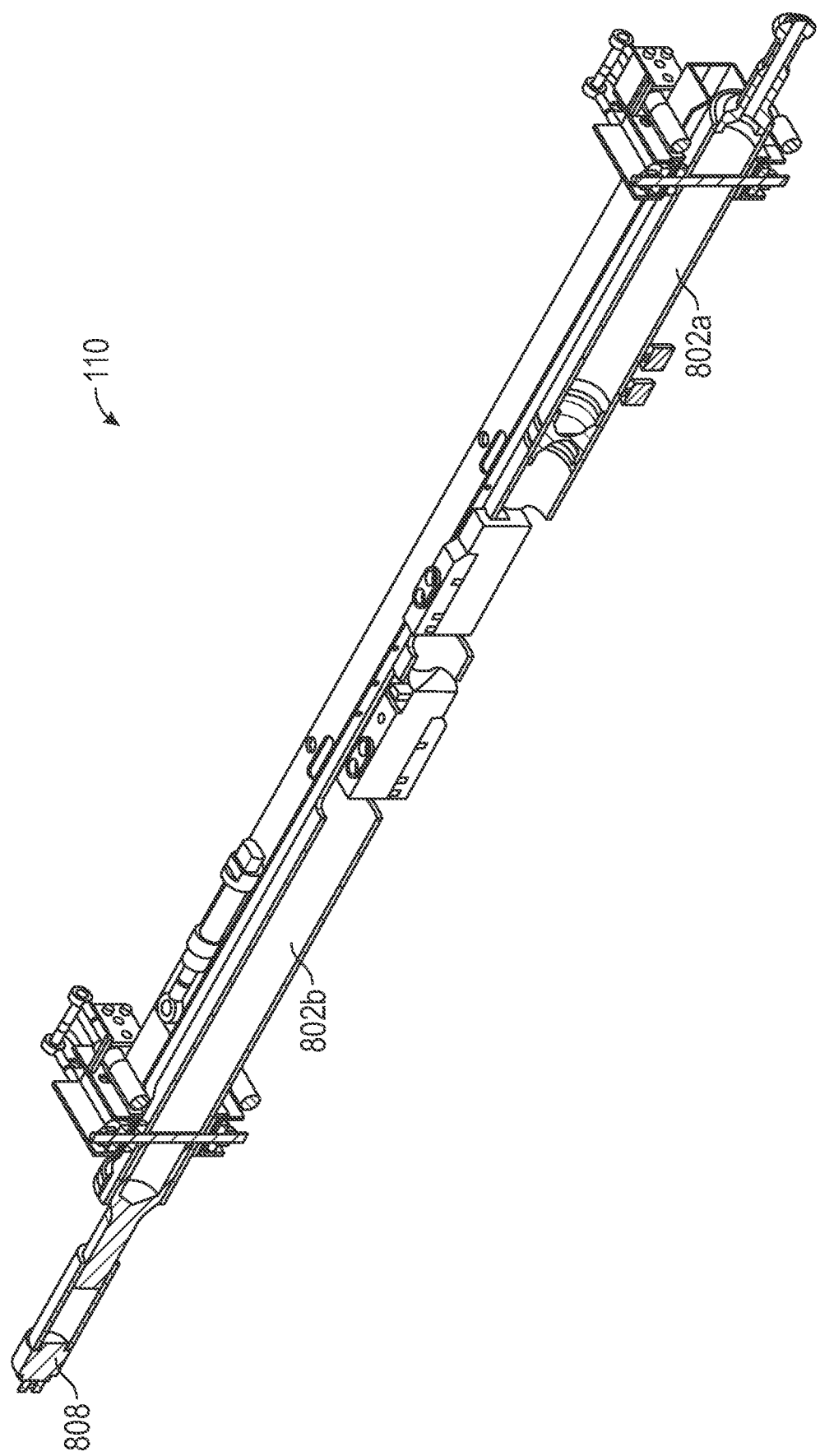
FIG. 8D illustrates a cross-sectional view of the example rotor of FIG. 8C taken along line 8D-8D of FIG. 8C.
Figure 8E:
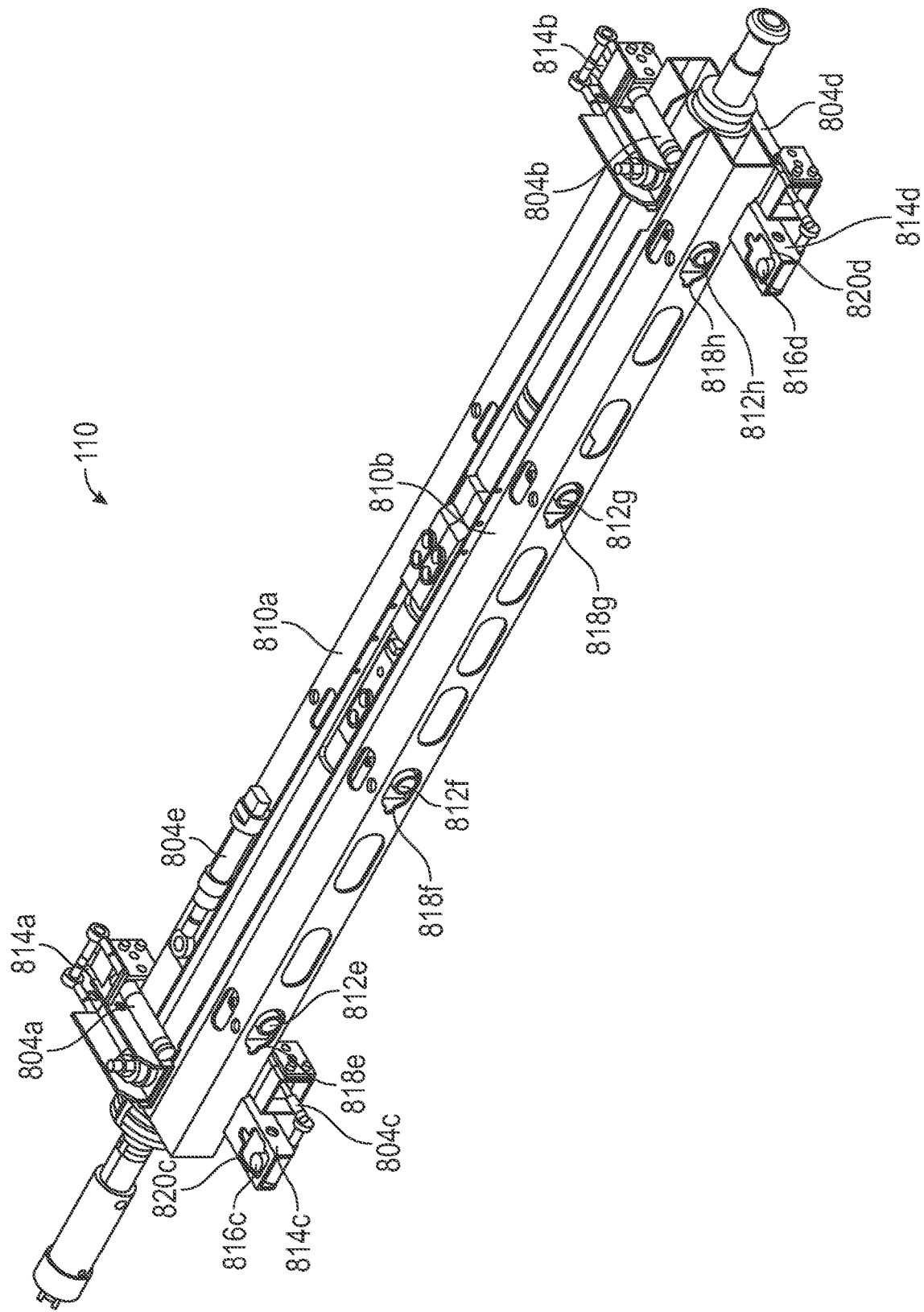
FIG. 8E illustrates a bottom perspective view of the example rotor of FIG. 8C.

A top perspective view of the example rotor 110 is illustrated in FIG. 8A and a cross-sectional view (taken along line 8B-8B of FIG. 8A) of the example rotor 110 is illustrated in FIG. 8B. Additionally, another top perspective view of the example rotor 110 is illustrated in FIG. 8C, a cross-sectional view (taken along line 8D-8D of FIG. 8C) of the example rotor 110 is illustrated in FIG. 8D, and a bottom perspective view of the example rotor 110 is illustrated in FIG. 8E. The rotor 110 may be made of, for example, a metal body, such as duralumin steel or any other metal. In the illustrated example, the rotor 110 includes a body or shaft 800 (e.g., a tube). The shaft 800 has a first inner hollow section 802*a* and a second inner hollow section 802*b* that operate as pneumatic lungs for one or more pneumatic actuators. In the illustrated example, the rotor 110 includes six pneumatic actuators. Specifically, the rotor 110 includes a first pneumatic actuator 804*a*, a second pneumatic actuator 804*b*, a third pneumatic actuator 804*c*, a fourth pneumatic actuator 804*d*, a fifth pneumatic actuator 804*e* and a sixth pneumatic actuator 804*f*.

In the illustrated example, the rotor 110 includes a pneumatic rotary union or joint 806 that extends from one end of the shaft 800 and an electrical rotary union or joint 808 that extends from the other end of the shaft 800. The pneumatic rotary joint 806 couples one of the inner hollow sections 802*a*, 802*b* (FIGS. 8B and 8D) with the actuators 804*a-f*. The pneumatic rotary joint 806 enables compressed air to be fed to the actuators 804*a-f* (e.g., to pneumatic drives of the actuators 804*a-f*). The electrical rotary joint 808 supplies power (e.g., electrical power) to operate solenoids (e.g., valves) of the actuators 804*a-f* and a sensor that detects profiles. The electrical rotary joint 808 sends (e.g., transmits) the information for operating (e.g., opening) the solenoids, as well as the sensor data. The sensors detect when there is a profile attached to the magnets and start the rotation cycle.

Figure 9:
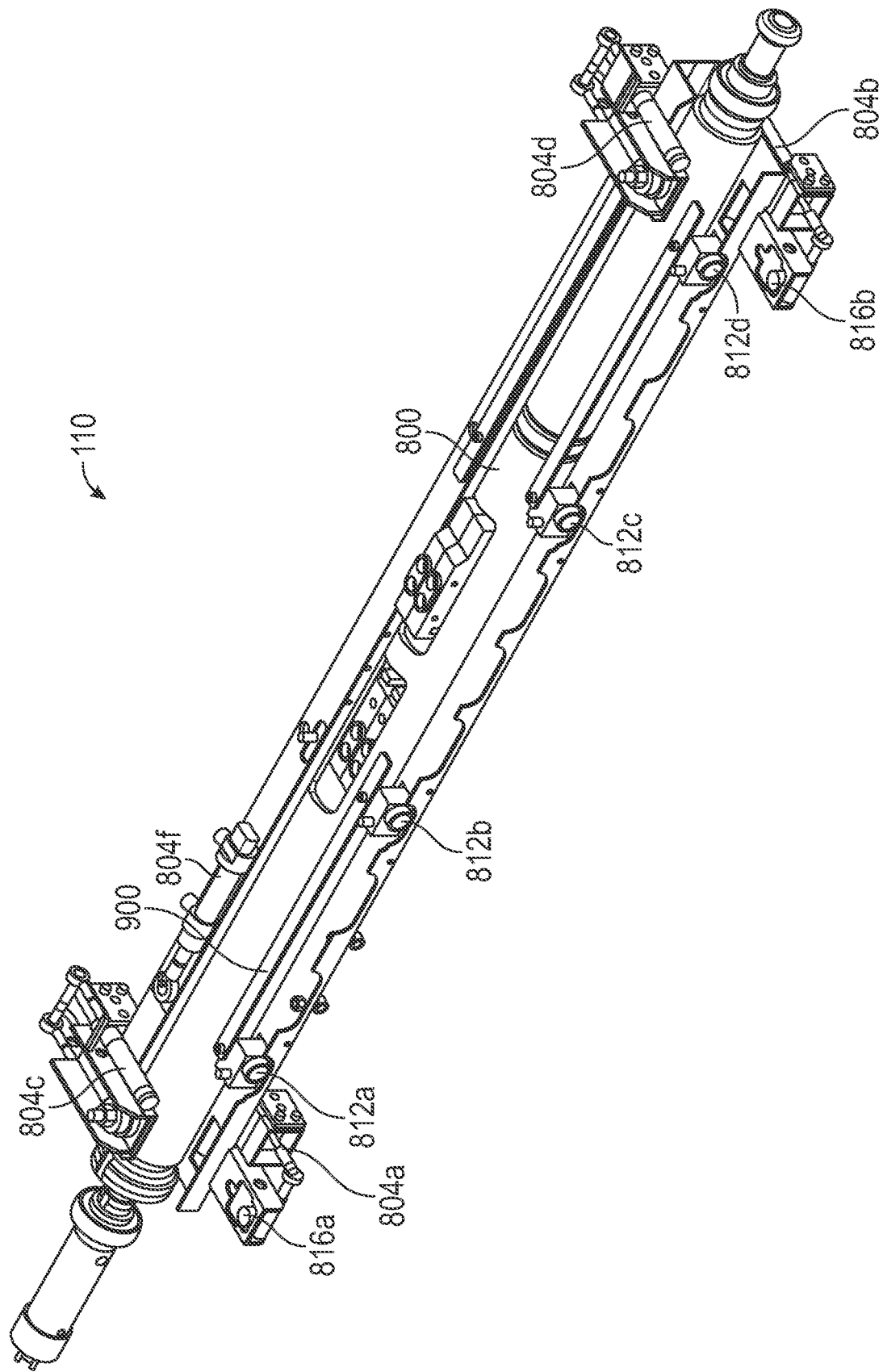
FIG. 9 illustrates the example rotor of FIG. 8A with portions of an example housing removed to expose the example vertical magnets.

As illustrated in FIGS. 8A, 8C and 8E, the rotor 110 includes a first housing 810*a* (e.g., a compartment, an accommodation, a lodge) and a second housing 810*b* that are disposed parallel to and along the shaft 800 (e.g., along a longitudinal axis of the rotor 110). A first row of vertical magnets 812*a*, 812*b*, 812*c*, 812*d* is arranged within the first housing 810*a*, and a second row of vertical magnets 812*e*, 812*f*, 812*g*, 812*h* (on the backside of the rotor 110, similar to but opposite the first row of vertical magnets 812*a-*812*d*, as illustrated in FIG. 8E) is arranged within the second housing 810*b*. The vertical magnets 812*a-*812*h* may be, for example, permanent magnets. The vertical magnets 812*a-*812*h* are arranged in the two parallel rows on opposite sides (e.g., which are 180 degrees of each other) of the shaft 800 of the rotor 110. FIG. 9 illustrates an example of the rotor 110 with a portion of the first housing 810*a* removed to expose the first row of vertical magnets 812*a-*812*d*.

In the illustrated example of FIGS. 8A, 8C, 8E and 9, the rotor 110 includes a first housing 814*a*, a second housing 814*b*, a third housing 814*c* and a fourth housing 814*d* that extend perpendicular to the shaft 800. The first, second, third and fourth housings 814*a-*814*d* contain first, second third and fourth horizontal magnets 816*a*, 816*b*, 816*c*, 816*d*, respectively. The horizontal magnets 816*a-*816*d* may be, for example, permanent magnets. In the illustrated example, the rotor 110 is symmetric, such that it has vertical magnets and horizontal magnets in opposite directions on opposite sides of the rotor 110.

Figure 10:
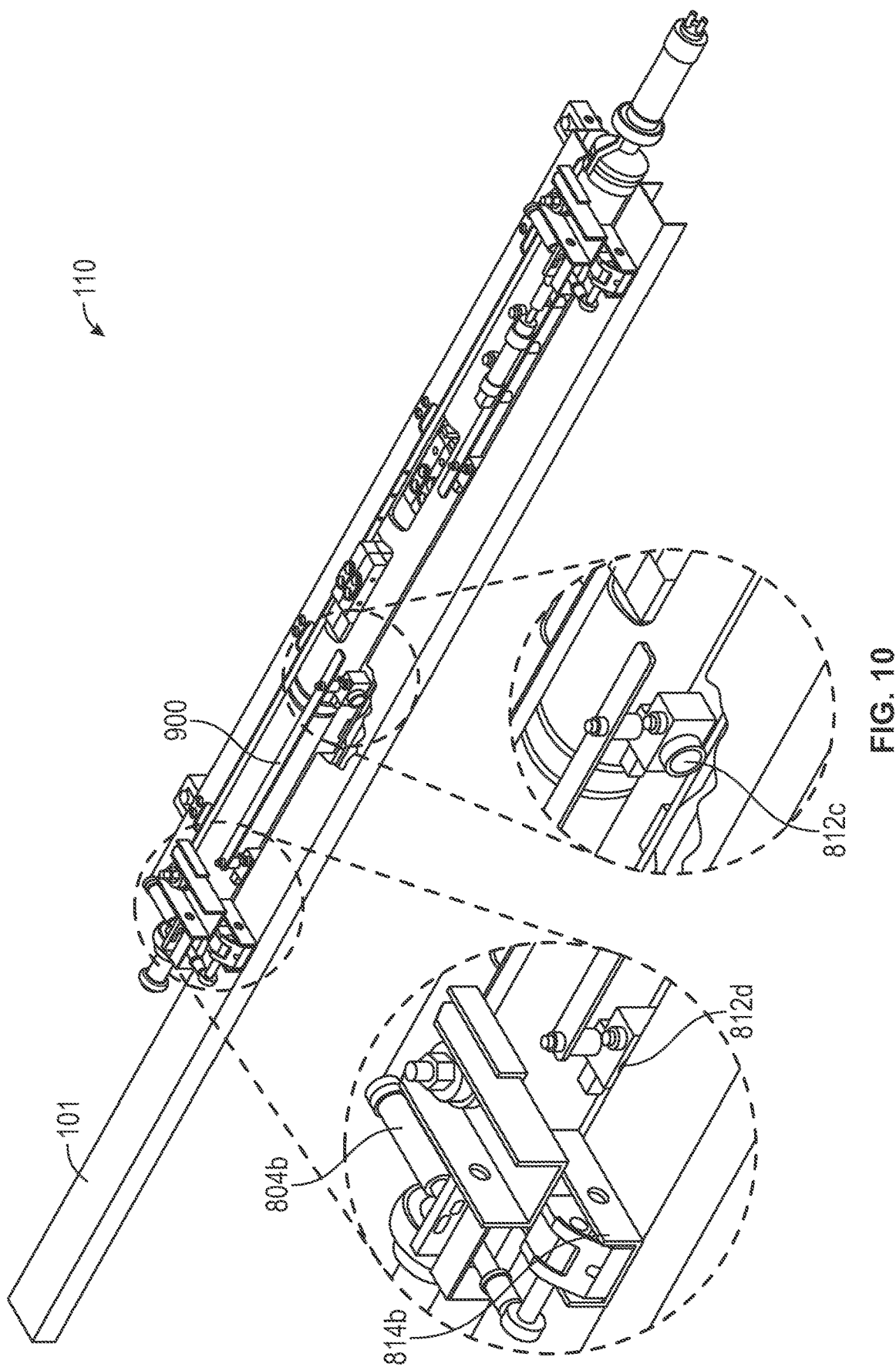
FIG. 10 illustrates an example profile coupled to the example rotor of FIG. 8A with example magnets facing the example profile to hold the example profile.
Figure 11:
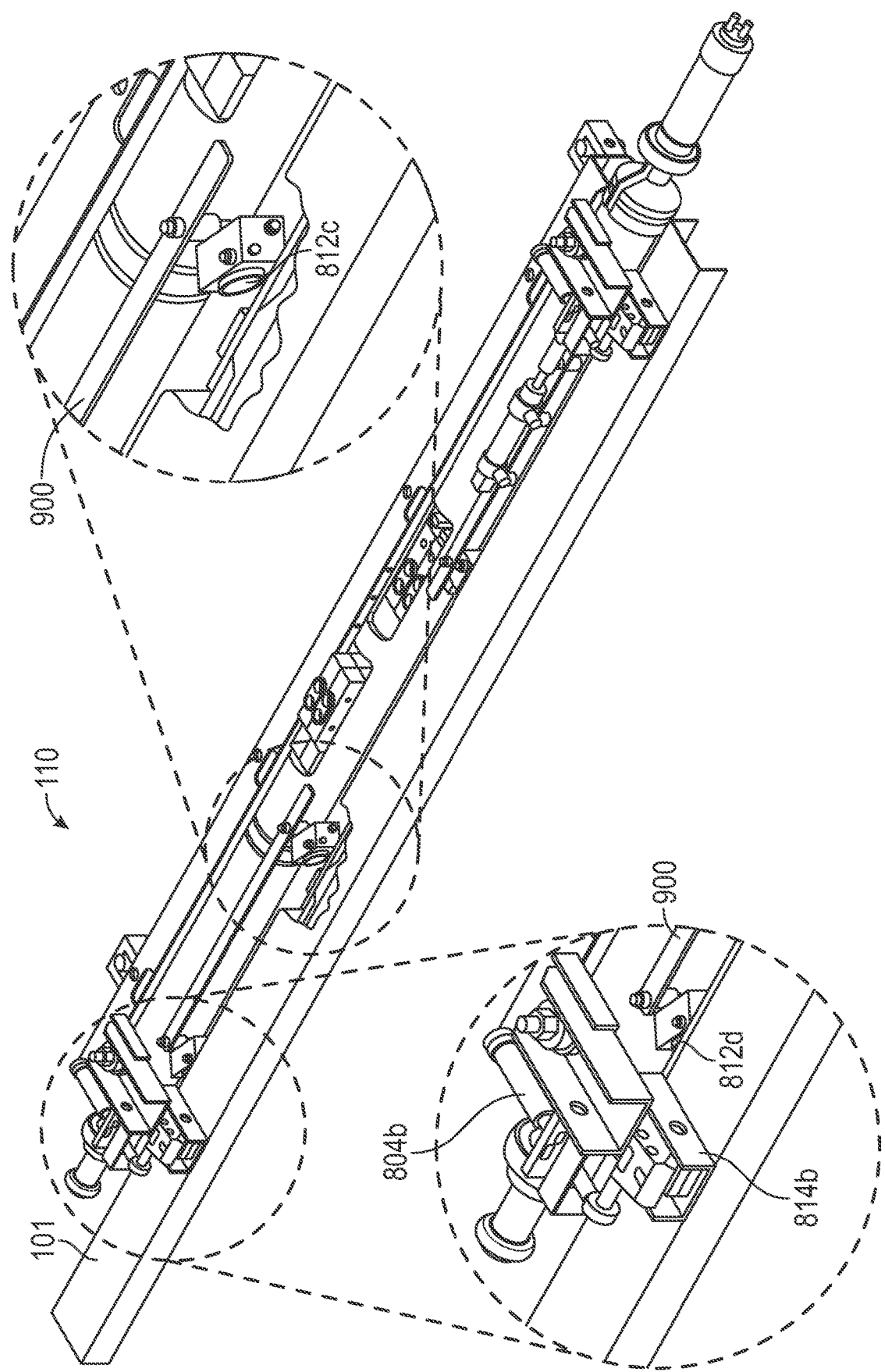
FIG. 11 illustrates the example profile and example rotor of FIG. 10 with the example magnets in a rotated position to release the example profile.

In the illustrated example, the vertical magnets 812*a-*812*h* are to hold profiles by the side walls (e.g., by an outer surface of the profile and/or by a convex side), while the horizontal magnets 816*a-*816*d* are hold profiles by the bases (e.g., on the convex side). FIGS. 10 and 11 illustrate the example rotor 110 holding the first profile 101 on one side of the rotor 110. For example, the first row of vertical magnets 812a-812d (FIGS. 8A and 8C) hold one side wall of the first profile 101 while the first and second horizontal magnets 816a, 816b hold the base of the first profile 101. Once the first profile 101 is taken, the rotor 110 starts its upward movement (e.g., via the head 108) and rotation. The rotor 110 is rotated 180 degrees, so that the first profile 101 is facing downwards. This movement is generated by the servomotors 500, 502 (FIGS. 5 and 6). At the same time, the second profile 103 (FIG. 3) or a following profile is positioned below the rotor 110 and stops at the magnetic stoppers 504a, 504b. Then, the rotor 110 moves downward and the pneumatic actuators 804a-804f operate to actuate (e.g., via rotating) the vertical and horizontal magnets 812a-812d, 816a, 816b to release the first profile 101 onto the second profile 103 that is positioned below. Upon releasing the first profile 101, the vertical and horizontal magnets 812e-812h, 816c, 816d on the other side of the rotor 110 are able to retrieve the next profile for forming another duplex. This side of the rotor 110 operates similar to the first side of the rotor 110. The rotor 110 conforms to the width of the profile that is being manufactured. The magnets (e.g., the vertical and horizontal magnets 812e-812h, 816c, 816d) operate once the profile is detected by the sensors.

As disclosed herein, the vertical magnets 812a-812h are located in parallel rows adjacent the shaft 800 of the rotor 110. The rows are disposed 180° from the other on opposite sides of the shaft 800. The vertical magnets 812a-812h are rotatable (e.g., pivotable), about 90°. As illustrated in the example of FIGS. 9, 10 and 11, the vertical magnets 812a-812h are between (e.g., coupled to each other via) linkage rods or connecting rods 900, and have a rotary movement of 90°. In this manner, the vertical magnets 812a-812h may be rotated about 90°, from facing a direction that is parallel to the shaft 800 (e.g., the longitudinal axis of the rotor 110 or shaft 800) to a direction that is perpendicular to the shaft 800. This determines the exposition of the rows of vertical magnets 812a-812h on each side of the rotor 110 when the movement (e.g., rotation) of 90° is made. The movement of about 90° of the vertical magnets 812a-812h is made by the two pneumatic actuators (e.g., the pneumatic actuators 804e, 804f). Each of the pneumatic actuators operates one of the rows of vertical magnets 812a-812d, 812e-812h linked by the connecting rods 900. The linear movement of one of the pneumatic actuators (e.g., the pneumatic actuator 804e) acts on the first connecting rod of one row (e.g., the first row of vertical magnets 812a-812d), and the movement is transferred to the vertical magnets 812a-812d turning into a rotary movement. Likewise, the same movement occurs by the other pneumatic actuator on the other side.

FIG. 10 illustrates an example of the third and fourth vertical magnets 812c, 812d in a perpendicular position in which their faces are directed outwards to hold the side of the first profile 101. FIG. 11 illustrates an example of when the connecting rod 900 moves to rotate the third and fourth vertical magnets 812c, 812d to the parallel position in which their faces are parallel with the shaft 800 (e.g., the longitudinal axis of the shaft 800) and, thus, are not facing outwards to hold the side of the first profile 101.

Figure 12:
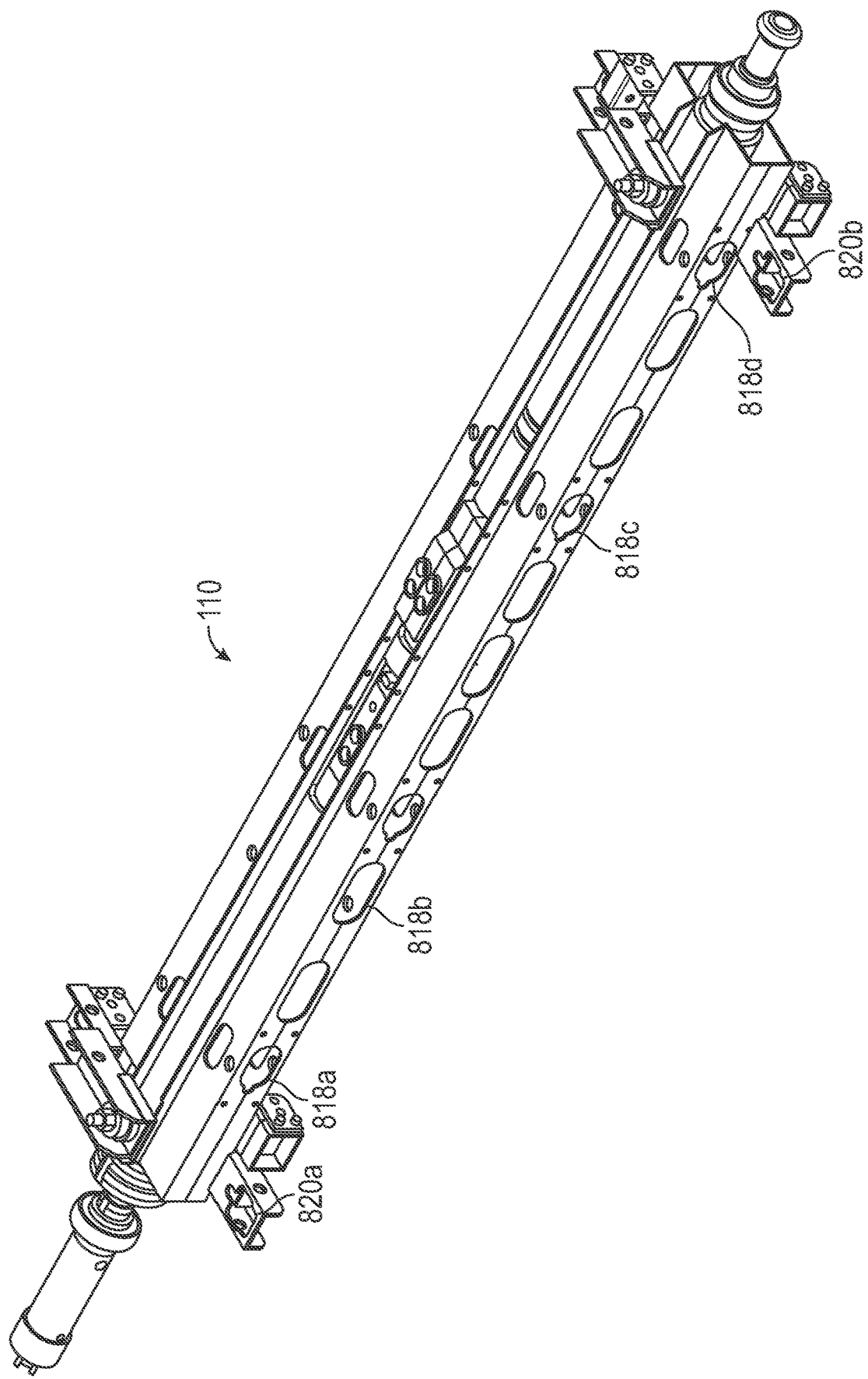
FIG. 12 illustrates a top perspective view of the example rotor of FIG. 8A with the example horizontal and vertical magnets removed to illustrate example openings in the example housing of FIG. 9.

In the illustrated example of FIGS. 8A, 8C and 8E, the first housing 810a includes a plurality of openings 818a, 818b, 818c, 818d (e.g., holes, apertures, etc.) for the respective vertical magnets 812a-812d, and the second housing 810b includes a plurality of openings 818e, 818f, 818g, 818h for the respective vertical magnets 812e-812h. The example rotor 110 is illustrated in FIG. 12 without the vertical magnets 812a-812d to illustrate the openings 818a-818d of the first housing 810a. The movement of the vertical magnets 812a-812h enables the faces of the vertical magnets 812a-812h to be exposed or directed at a profile (e.g., the first profile 101) through the respective openings 818a-h in order to hold the profile by one of its sides.

In the illustrated example of in FIGS. 8A, 8C, 8E and 12, the first, second, third and fourth housings 814a-814d for the respective horizontal magnets 816a-d include respective openings 820a, 820b, 820c, 820d. The horizontal magnets 816a-816d are located at the edges or ends of two rows of vertical magnets 812a-812h (e.g., near the ends of the rotor 110), where the housings 810a, 810b for the vertical magnets 812a-812h are located. In the illustrated example, there are two horizontal magnets 816a-816d per row (e.g., the first and second horizontal magnets 816a, 816b on one side for one row and the third and fourth horizontal magnets 816c, 816d on the other side for the other row). The movement of the horizontal magnets 816a-816d enables the faces of the horizontal magnets 816a-816d to be exposed or directed at a profile (e.g., the first profile 101) through the respective openings 820a-820d. The horizontal magnets 816a-816d have about a 90° movement driven by the pneumatic actuators 804a-804d, which enables the horizontal magnets 816a-816d to stay in contact, or not, with the profile, when desired. Each of the horizontal magnets 816a-816d is located behind each duralumin body of one perforated sheet or housing 814a-814d by showing or not the magnetic face through the openings 820a-820d when making the 90 degree movement. In order to have a better understanding of the horizontal magnets 816a-816d arrangement, it is observed a view of the rotor at both sides of the rows, where the vertical magnets 812a-812h are located. In the row, where the horizontal magnets 816a-816d enter, there is top part of the horizontal magnets 816a, 816b that face down, while at the other row, the horizontal magnets 816c, 816d face upwards.

In the illustrated example, the first and second housings 810a, 810b and the housings 814a-814d form supports or buffers for holding a profile (e.g., the first profile 101). In other words, a side of a profile may be positioned adjacent or along one of the first or second housings 810a, 810b and a base or convex side of the profile may be positioned adjacent or along the respective housings 814a-814d on the same side.

Figure 13A:
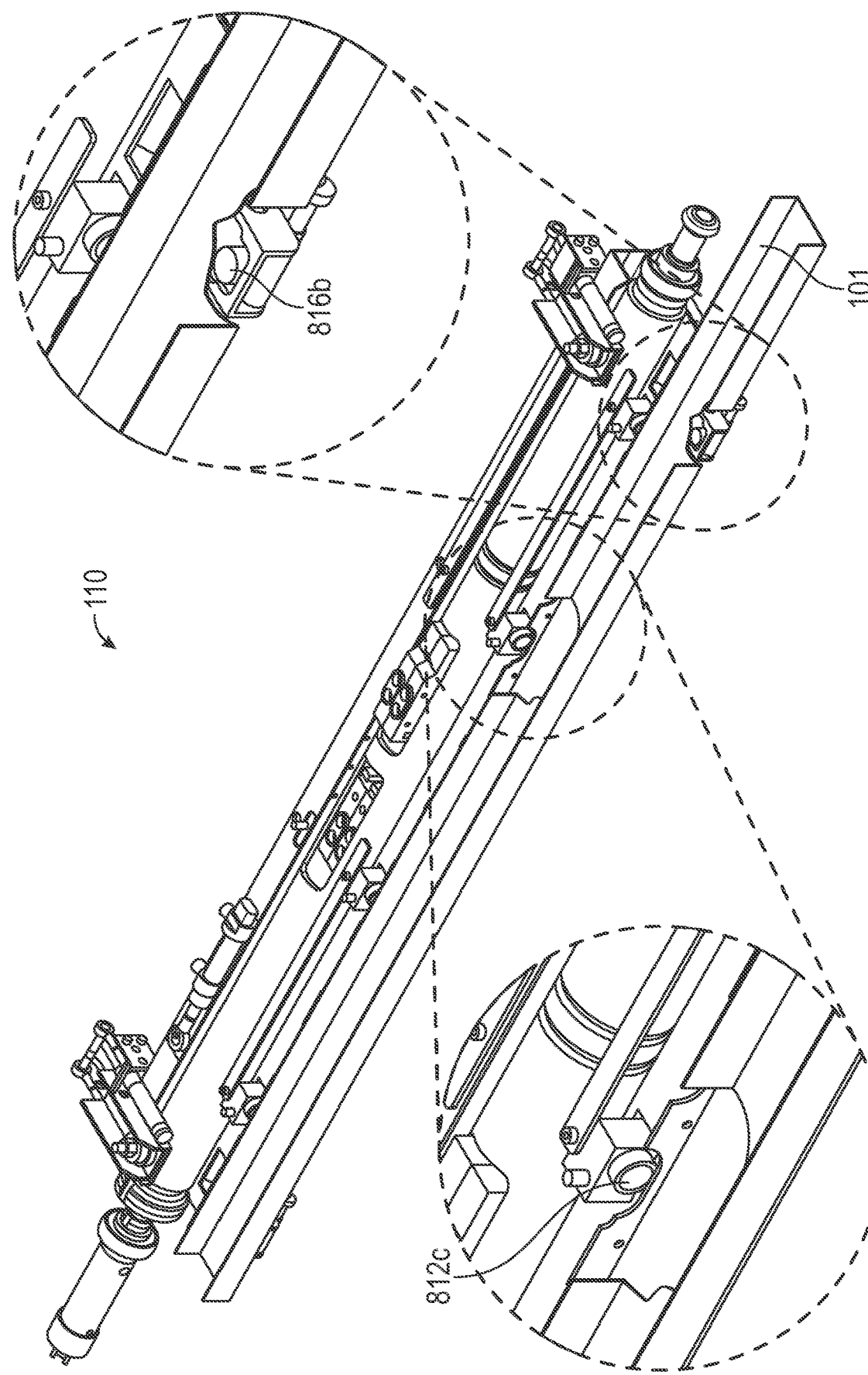
FIGS. 13A, 13B, 13C, 13D and 13E illustrate perspective views of the example rotor of FIG. 1 in sequence during a carrying operation.
Figure 13B:
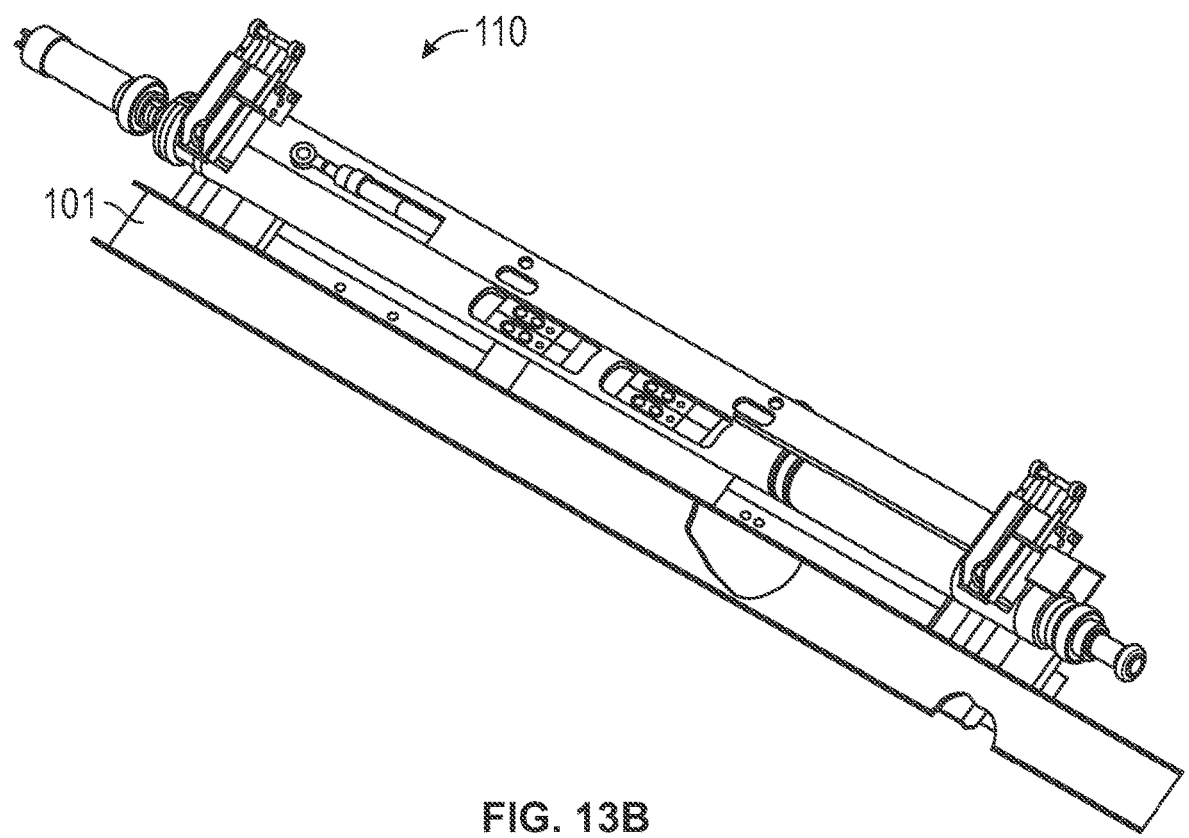
Figure 13C:
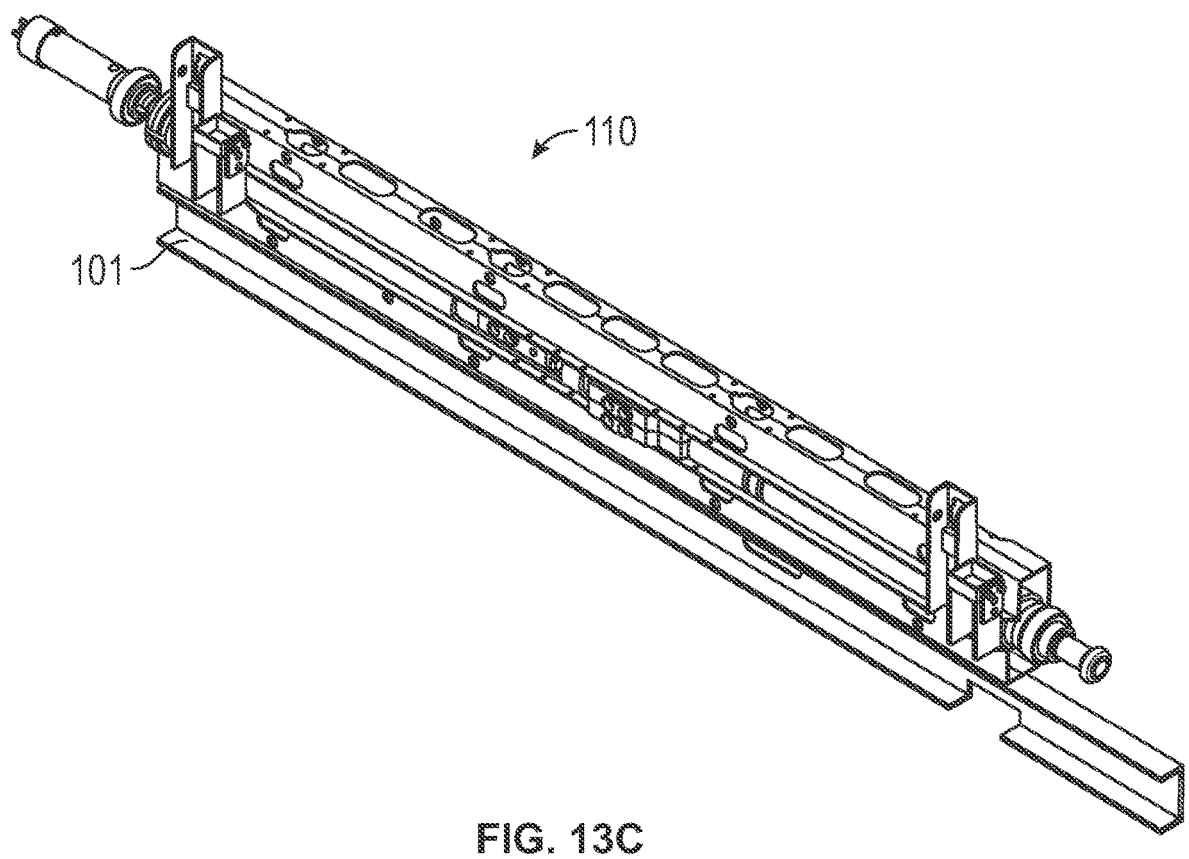
Figure 13D:
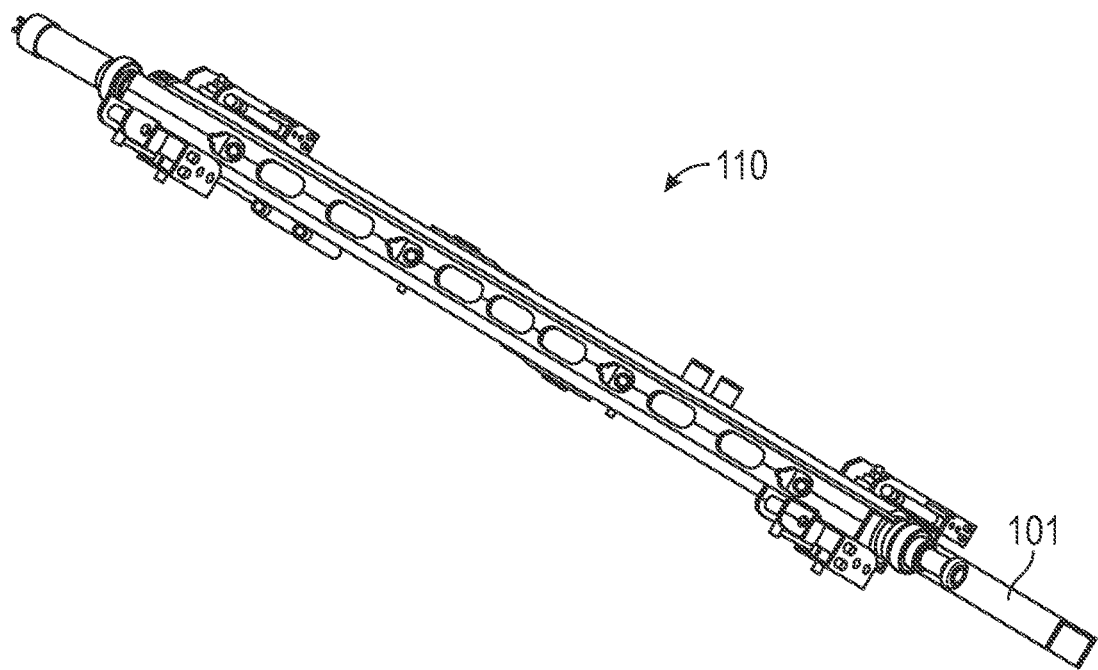
Figure 13E:
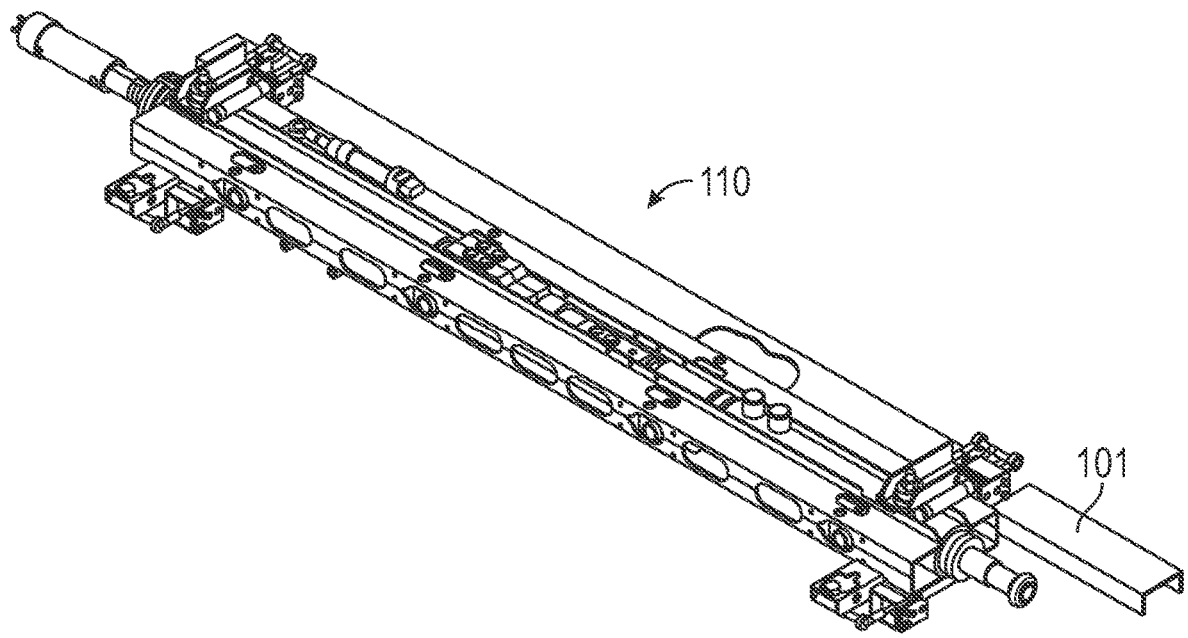
Figure 13F:
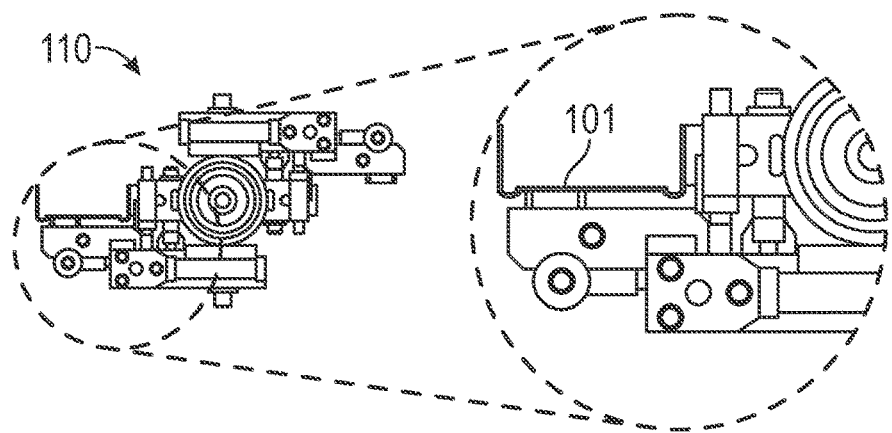
FIGS. 13F, 13G, 13H, 13I and 13J illustrate side views of the example rotor positions of FIGS. 13A, 13B, 13C, 13D and 13E.
Figure 13G:
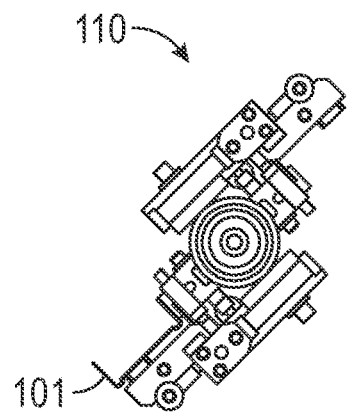
Figure 13H:
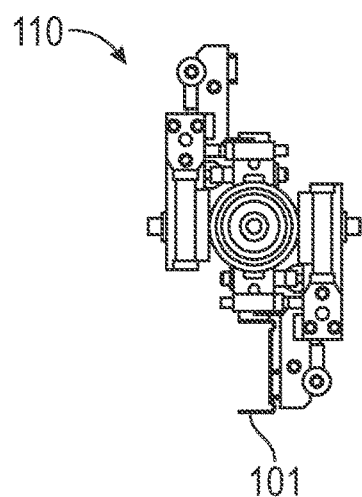
Figure 13I:
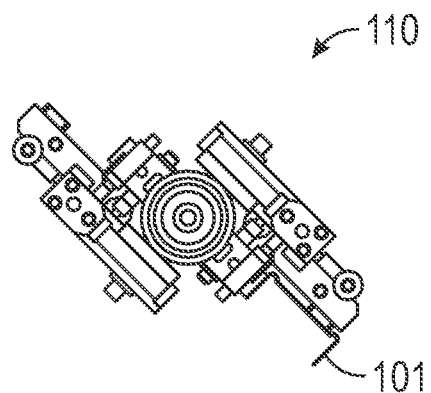
Figure 13J:
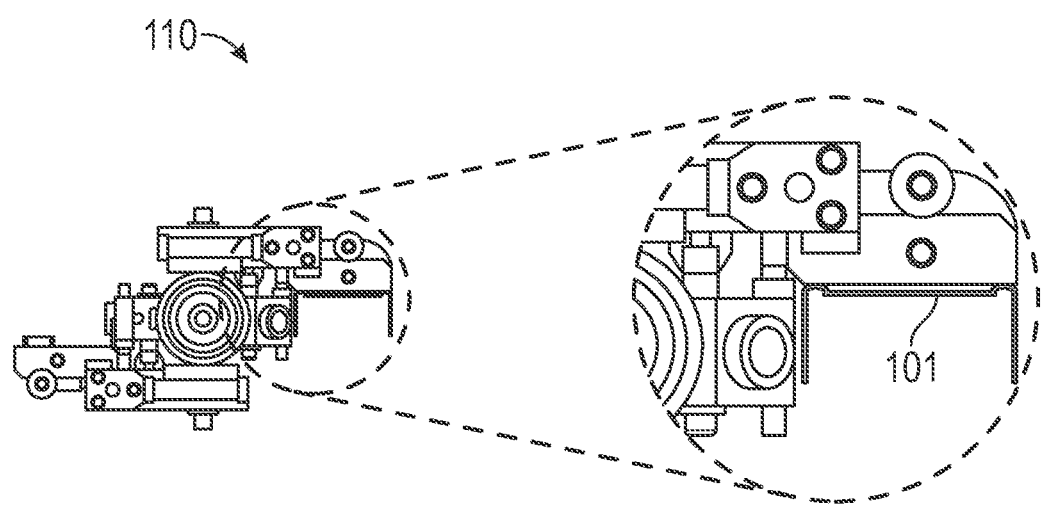

FIGS. 13A-13E illustrate perspective views of the rotor 110 during an example sequence in which the rotor 110 rotates the first profile 101. FIGS. 13F-13J illustrate side views of the rotor 110 in the example positions of FIGS. 13A-13E, respectively. For example, in FIG. 13A and corresponding FIG. 13F, the first row of vertical magnets 812a (see FIGS. 8A and 8C), 812b (see FIGS. 8A and 8C), 812c, 812d (see FIGS. 8A and 8C) and the first and second horizontal magnets 816a (see FIGS. 8A and 8C), 816b face their respective openings 818a-818d (see FIGS. 8A and 8C), 820a(see FIGS. 8A and 8C), 820b (see FIGS. 8A and 8C) to hold the first profile 101 (e.g., via magnetic attraction). In the illustrated example, the first profile 101 is positioned with its concave side upward. The first row of vertical magnets 812a (see FIGS. 8A and 8C), 812b (see FIGS. 8A and 8C), 812c, 812d (see FIGS. 8A and 8C) engage one of the sides of the first profile 101 and the first and second horizontal magnets 816a (see FIGS. 8A and 8C), 816b engage the outer surface of the base or convex side of the first profile 101. As illustrated, the side of the first profile 101 is supported against the first housing 810a (see FIGS. 8A and 8C) and the base is supported against the first and second housings 814a (see FIGS. 8A and 8C), 814b (see FIGS. 8A and 8C) of the horizontal magnets 816a (see FIGS. 8A and 8C), 816b. In FIG. 13B and corresponding FIG. 13G, the rotor 110 rotates about its longitudinal axis. In FIG. 13C and corresponding FIG. 13H, the rotor 100 has rotated the first profile 101 90° (e.g., such that the concave side of the profile is lateral or horizontal). In FIG. 13D and corresponding FIG. 13I, the rotor 110 continues to rotate about its longitudinal axis. In FIG. 13E and corresponding FIG. 13J, the rotor 110 has rotated the first profile 101 180°, and the profile is held upside down, with its concave side facing downward.

Figure 14:
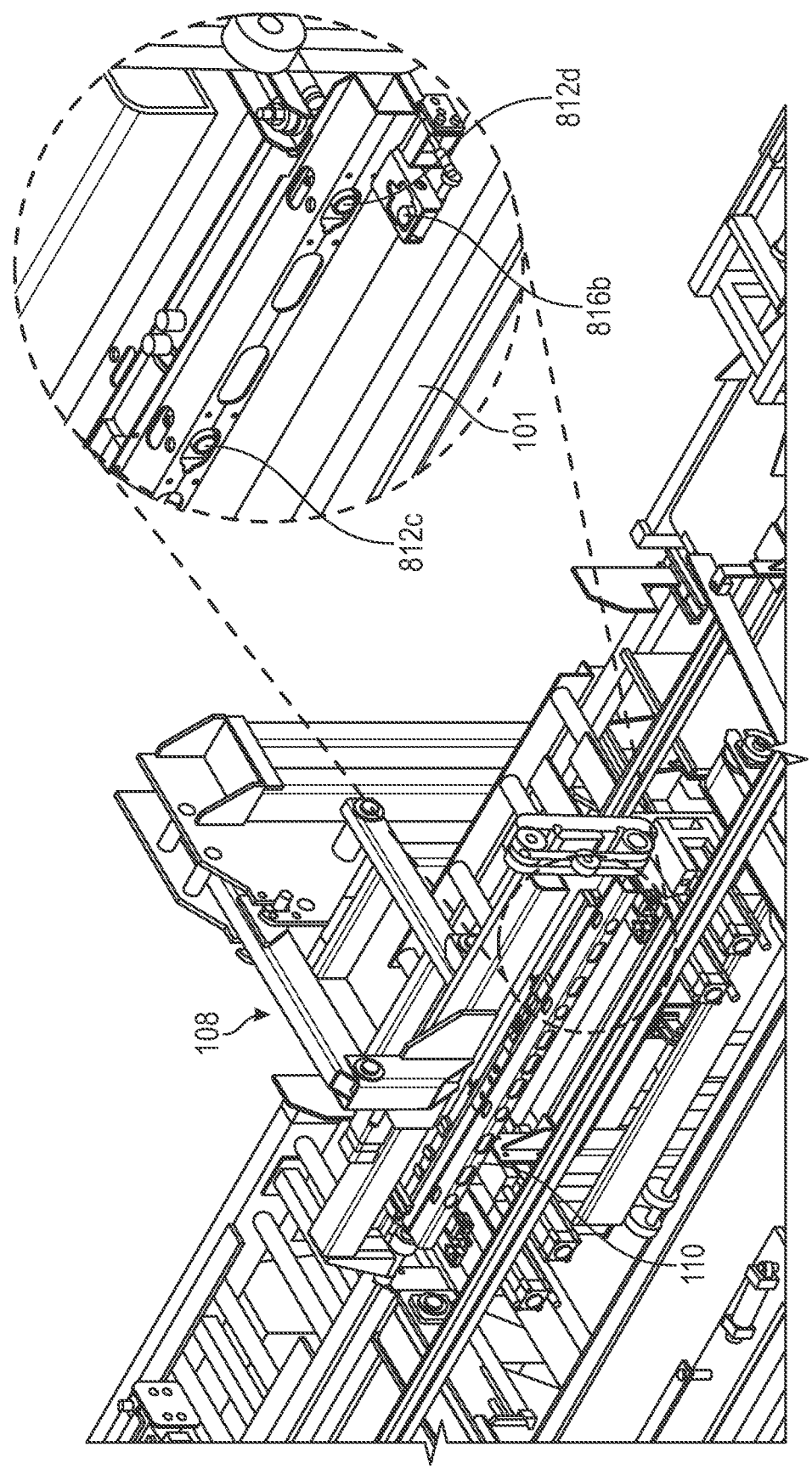
FIG. 14 illustrates a perspective view of the example head and the example rotor of FIG. 2 with portions of the example head and rotor removed to expose a mechanism that enables the movement of the example rotor.
Figure 15:
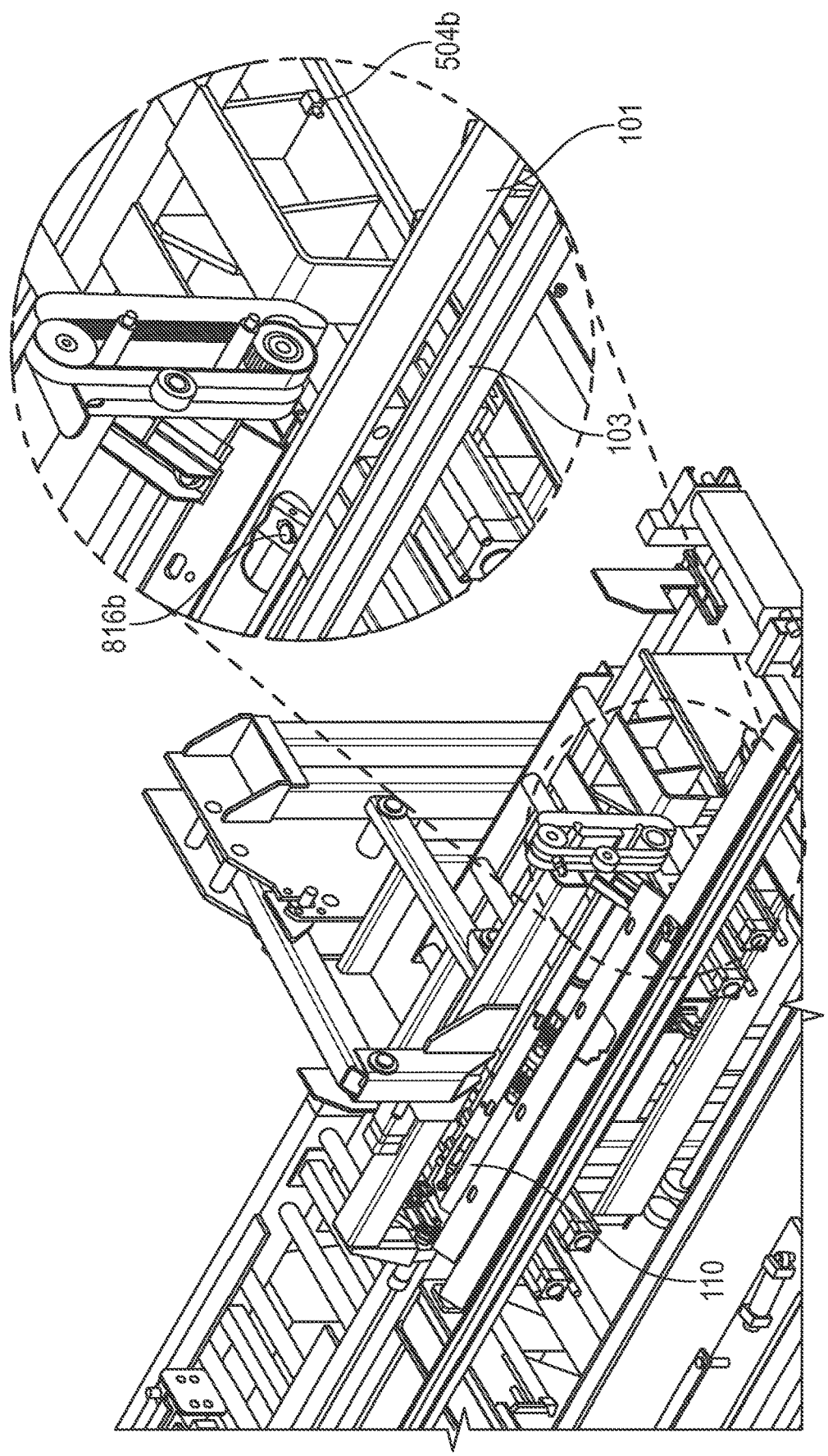
FIG. 15 illustrates a perspective view of the example head and the example rotor of FIG. 14. An example first profile supported by the example horizontal magnets is in rotation by the rotor.
Figure 16:
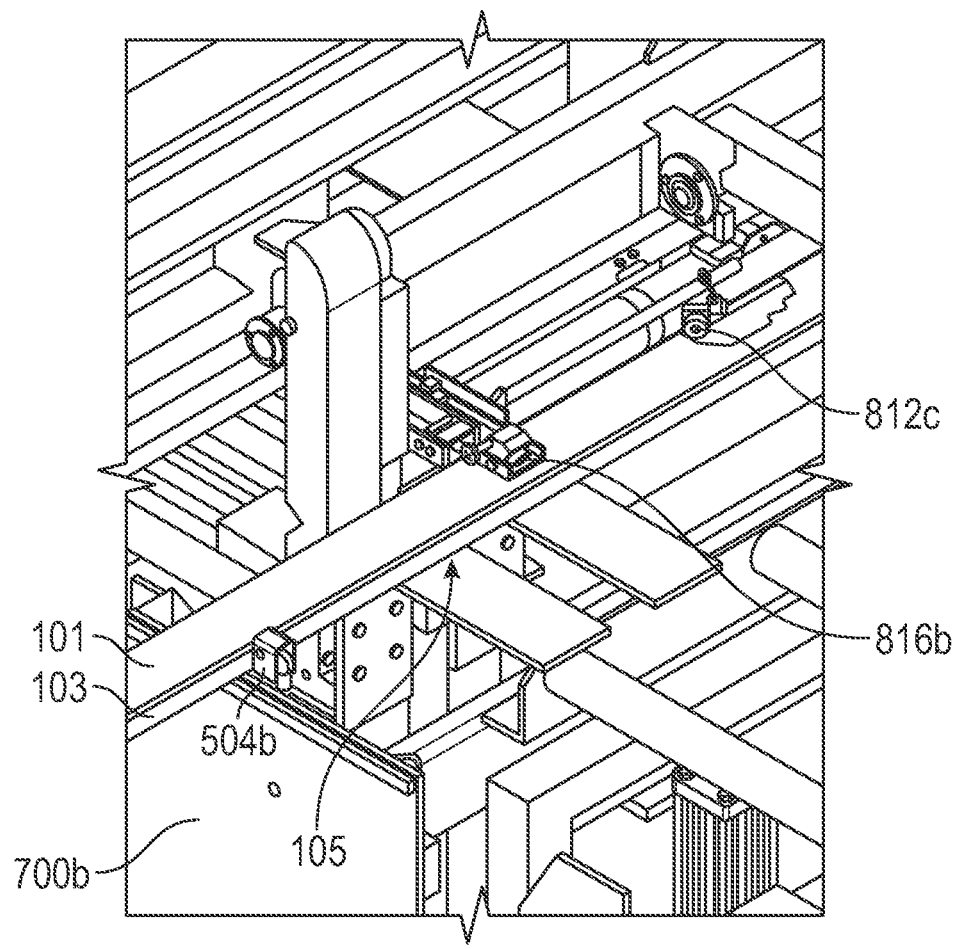
FIG. 16 illustrates a perspective view of the example head and the example rotor of FIGS. 14 and 15 in a fully rotated position where the example first profile is released to form an example duplex.

FIG. 14 illustrates an example of the head 108 and the rotor 110 receiving the first profile 101. In the illustrated example, a portion of the head 108 and/or the rotor 110 have been removed to expose a mechanism that enables up and down movement and rotation of the rotor 110. As illustrated in the enlarged view, the first row of vertical magnets 812a (see FIGS. 8A and 8C), 812b (see FIGS. 8A and 8C), 812c, 812d are closed or in the perpendicular position to receive and hold the first profile 101. The first and horizontal magnets 816a (see FIGS. 8A and 8C), 816b on the first side of the rotor 110 are open or away. FIG. 15 illustrates the rotation of the first profile 101 as it is supported by the first and second horizontal magnets 816a (see FIGS. 8A and 8C), 816b (e.g., and the first row of vertical magnets 812a-812d, which are illustrated in FIGS. 8A and 8C). The magnetic stoppers 504a (see FIG. 6), 504b are driven and wait for the second profile 103. The magnetic stoppers 504a (see FIG. 6), 504b are driven or actuated upwards and wait for the second profile 103 to engage the magnetic stoppers 504a (see FIG. 6), 504b. When the magnetic stoppers 504a (see FIG. 6), 504b are not driven upwards, the magnetic stoppers 504a (see FIG. 6), 504b move down (e.g., the magnetic stoppers 504a (see FIG. 6), 504b are biased in the down positioned) and allow a duplex to pass through (e.g., after the duplex has been formed by placing the first profile 101 on the second profile 103). FIG. 16 illustrates an enlarged view of the duplex 105. In the illustrated example, the vertical magnets 812a (see FIGS. 8A and 8C), 812b (see FIGS. 8A and 8C), 812c, 812d (see FIGS. 8A and 8C) and the first and second horizontal magnets 816a (see FIGS. 8A and 8C), 816b open (e.g., rotate) to release the first profile 101 on top of the second profile 103 to make the duplex 105.

Figure 7:
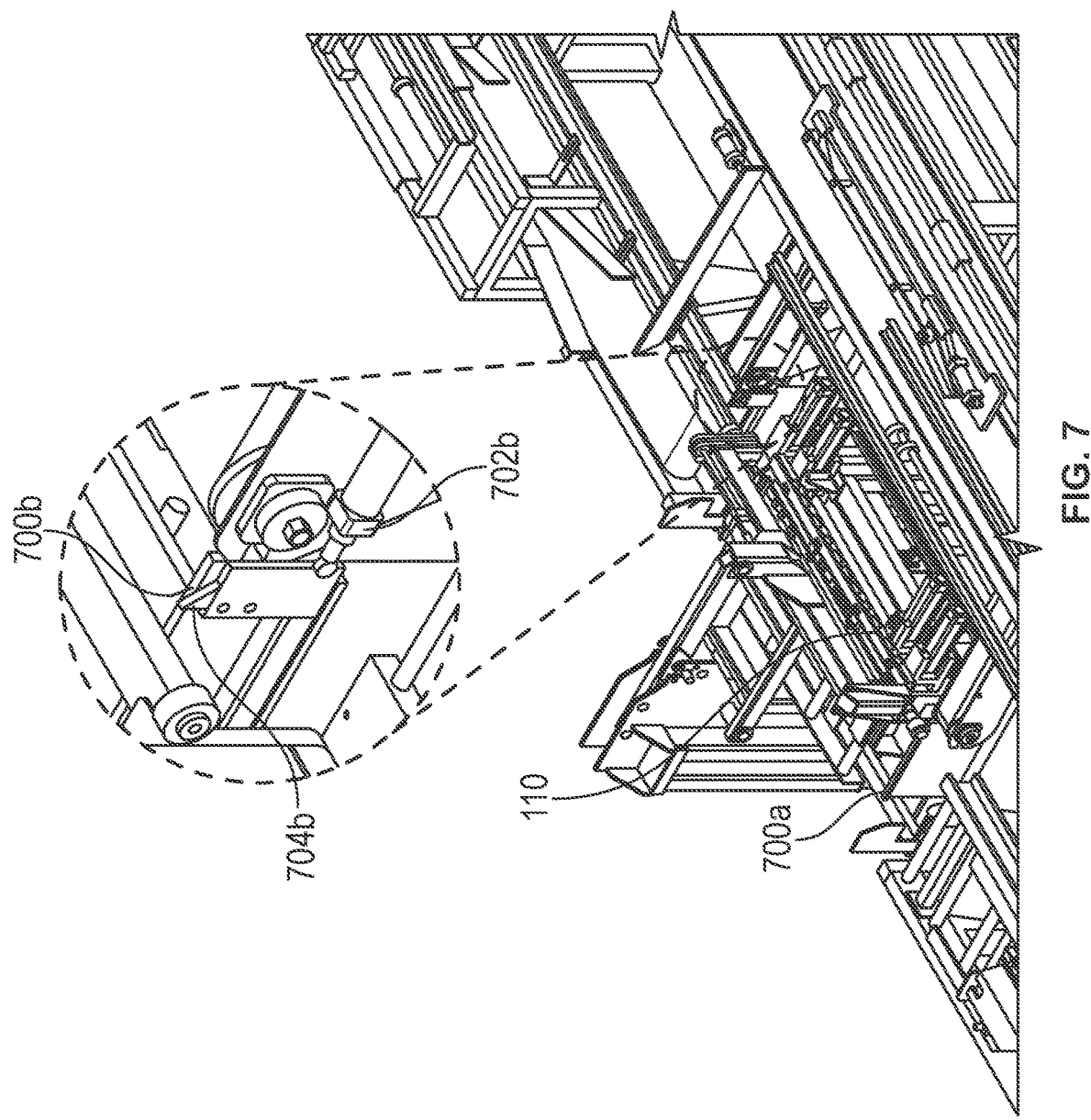
FIG. 7 illustrates a perspective view of the example automatic packaging line of FIG. 1 with an example lowering table, example pneumatic drives, example triggers and example transfer plates.
Figure 17:
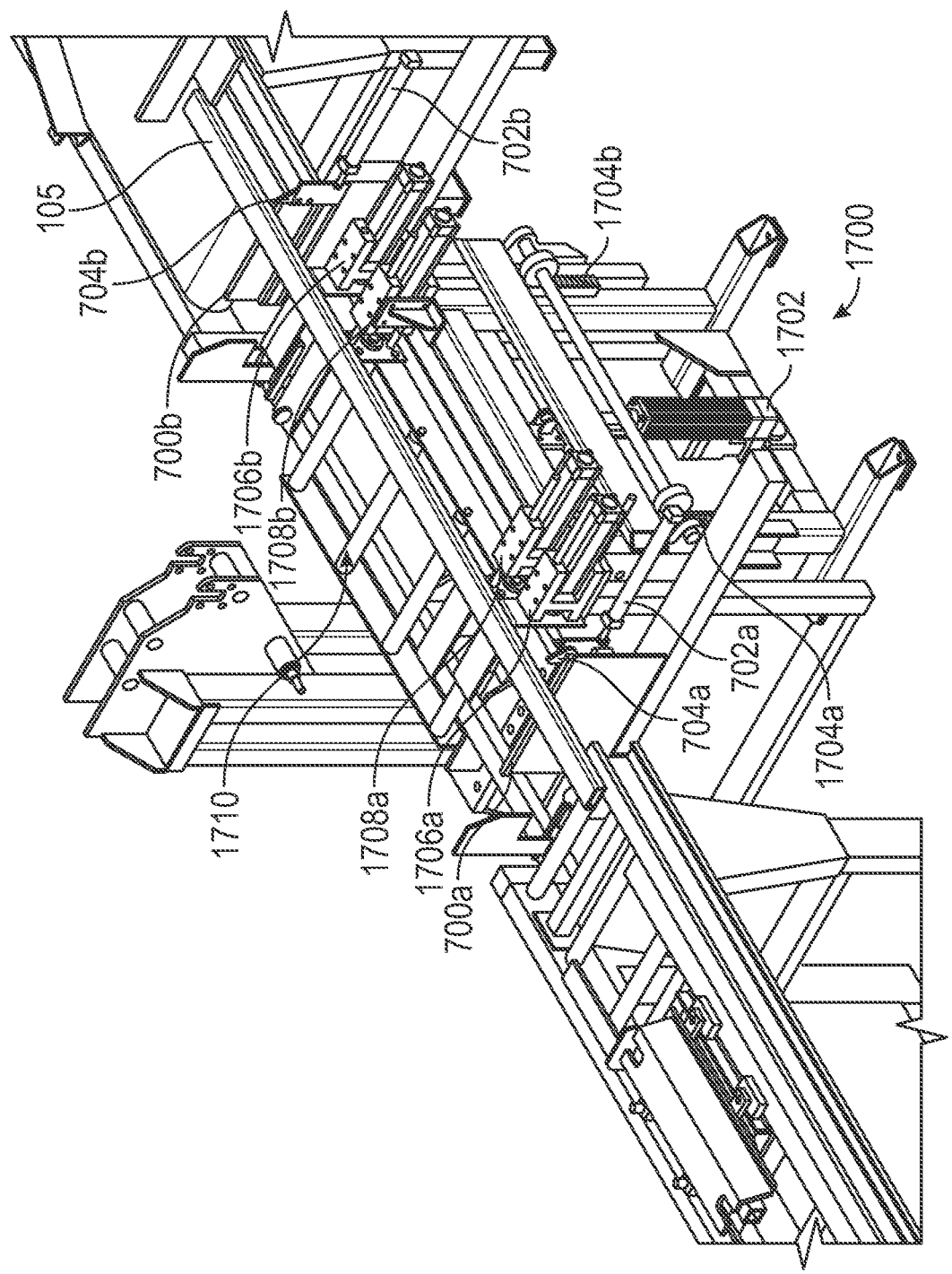
FIG. 17 illustrates a perspective view of the example automatic packaging line of FIG. 7 with the example head and example rotor removed to expose the example lowering table.

As illustrated in FIGS. 7 and 17, once the duplex 105 is made, the two magnetic stoppers 504a (see FIG. 6), 504b (see FIG. 16) move down below the level of the two transfer plates 700a, 700b to allow the displacement to the end of the transfer plates 700a, 700b (e.g., a rear section or area of the transfer plates 700a, 700b) by a pair of pneumatic drives 702a, 702b, which have mounted a set of triggers 704a, 704b, respectively. The triggers 704a, 704b retract to allow the duplex 105 to pass through, and then the triggers 704a, 704b move up to prevent the duplex 105 from rebounding or moving back. The triggers 704a, 704b are located on sides of the transfer plates 700a, 700b, respectively. This mechanism moves the duplex 105 along the transfer plates 700a, 700b.

In the illustrated example, the pneumatic drives 702a, 702b enable the triggers 704a, 704b to push the duplex 105 from the start of the transfer plates 700a, 700b when the two magnetic stoppers 504a (see FIG. 6), 504b (see FIG. 16) move down below the two transfer plates 700a, 700b. This operation repeats according the amount of duplexes in a row to form a mini-pack or smaller packaging unit. In some examples, this operation is controlled and/or adjusted by a touch screen (e.g., a user interface) of the equipment.

Figure 19:
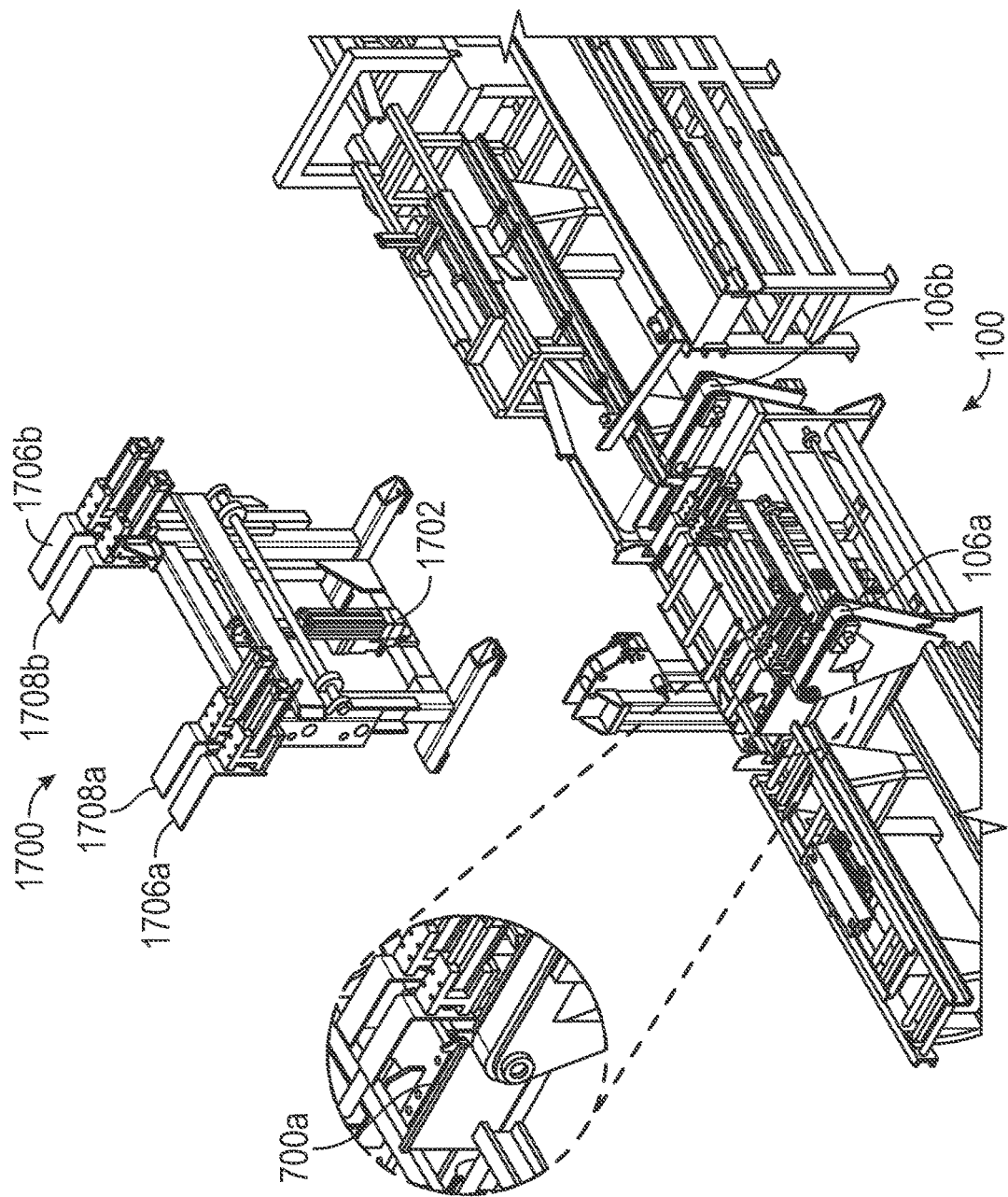
FIG. 19 illustrates a perspective view of the example automatic packaging line of FIG. 17, without the example head and rotor, and enlarged views of the example lowering table and an example transfer plate.

Once a row of duplexes is completed (e.g., a row of three duplexes), the row of duplexes moves down to a specified height via a lowering table 1700, as illustrated in FIG. 17. An enlarged view of the example lowering table 1700 is illustrated in FIG. 19. The lowering table 1700 combines a vertical up/down movement transmitted by a servomotor 1702 and racks 1704a, 1704b, and a cross movement of a plurality of blades (e.g., four blades) driven by pneumatic drives. In the illustrated example, the lowering table 1700 includes two vertical blades 1706a, 1706b (e.g., movable blades) and two horizontal blades 1708a, 1708b (e.g., fixed blades).

In the illustrated example of FIGS. 17 and 19, the transfer plates 700a, 700b are implemented as metal edges that are located adjacent the conveyor belts 106a, 106b. When the rotor 110 (FIG. 7) releases a duplex, the rotor 110 places the duplex between the transfer plates 700a, 700b. Then, the triggers 704a, 704b move the duplex up to the blades 1706a, 1706b, 1708a, 1708b. This operation may be performed repeatedly. Once the last duplex is created, the triggers 704a, 704b move the last duplex, so the all the duplexes are placed on the blades 1706a, 1706b, 1708a, 1708b. The triggers 704a, 704b are coupled to and actuated by the pneumatic drives 702a, 702b, respectively. The triggers 704a, 704b move the duplex to the vertical blades 1706a, 1706b (which operate to move in a vertical displacement) and the horizontal blades 1708a, 1708b (which operate to move in a horizontal displacement).

When the last duplex is moved on the blades 1706a, 1706b, 1708a, 1708b, the horizontal blades 1708a, 1708b (e.g., fixed blades) retract to allow that the vertical blades 1706a, 1706b (e.g., moving blades) to move down to a specific height. While the horizontal blades 1708a, 1708b retract, the triggers 704a, 704b retain the duplex row, as disclosed herein. After the vertical blades 1706a, 1706b move down to a given height, the horizontal blades 1708a, 1708b are moved out, before the next duplex is made. This operation is repeated as many times as the rows of duplexes take a mini-pack or smallest unit of packaging. This operation is programmed into the main Programmable Logic Controller (PLC) of the automatic packaging line 100. In some examples, the automatic packaging line 100 includes a screen (e.g., a user interface) that allows adjusting the amount of rows and columns that makes a mini-pack. The adjustment of the amount of rows and columns re-programs the PLC.

Figure 18A:
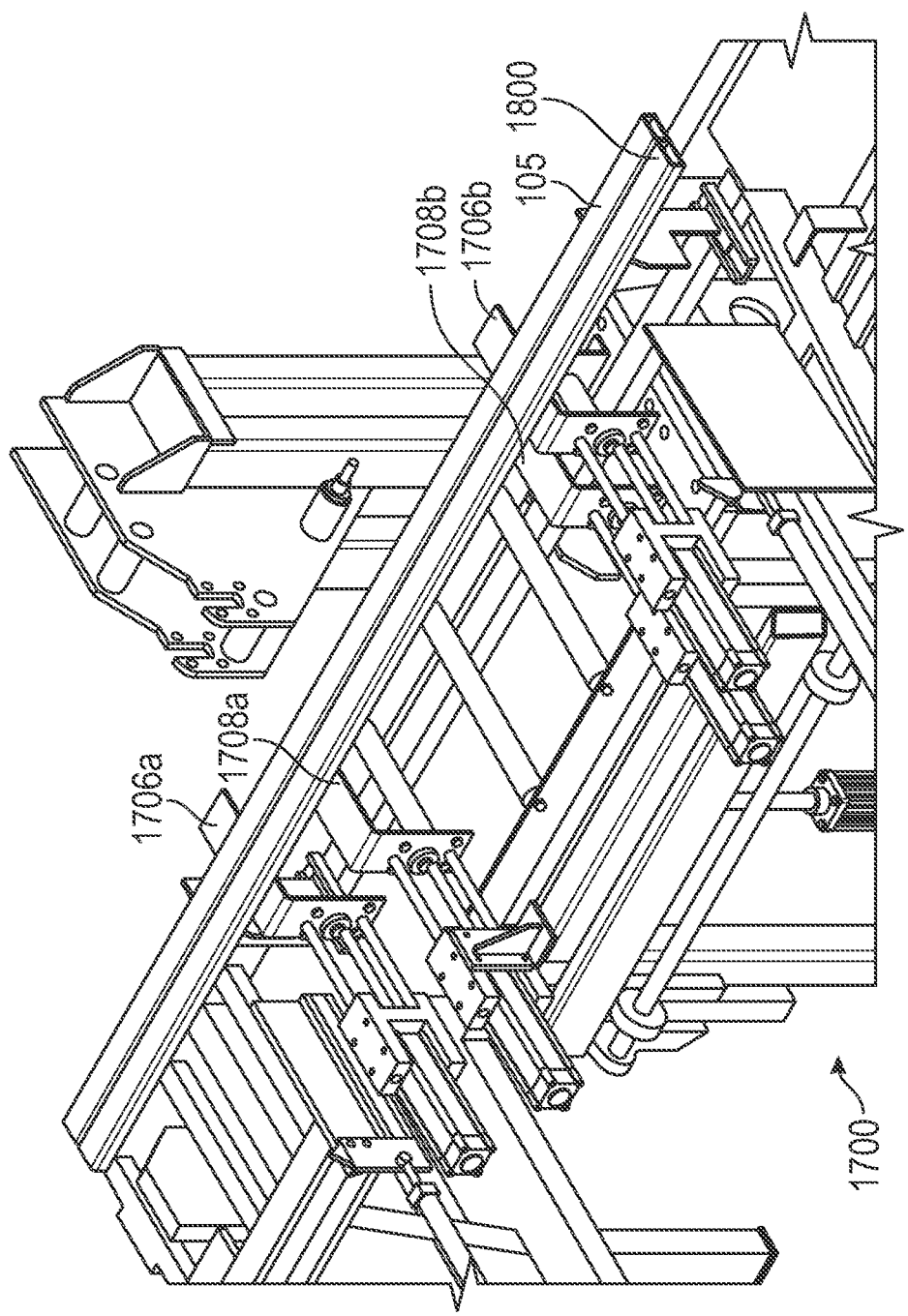
FIGS. 18A, 18B, 18C, 18D, 18E and 18F illustrate an example sequence of movements of example blades of the example lowering table of FIG. 17. The example head and example rotor have been removed for clarity.
Figure 18B:
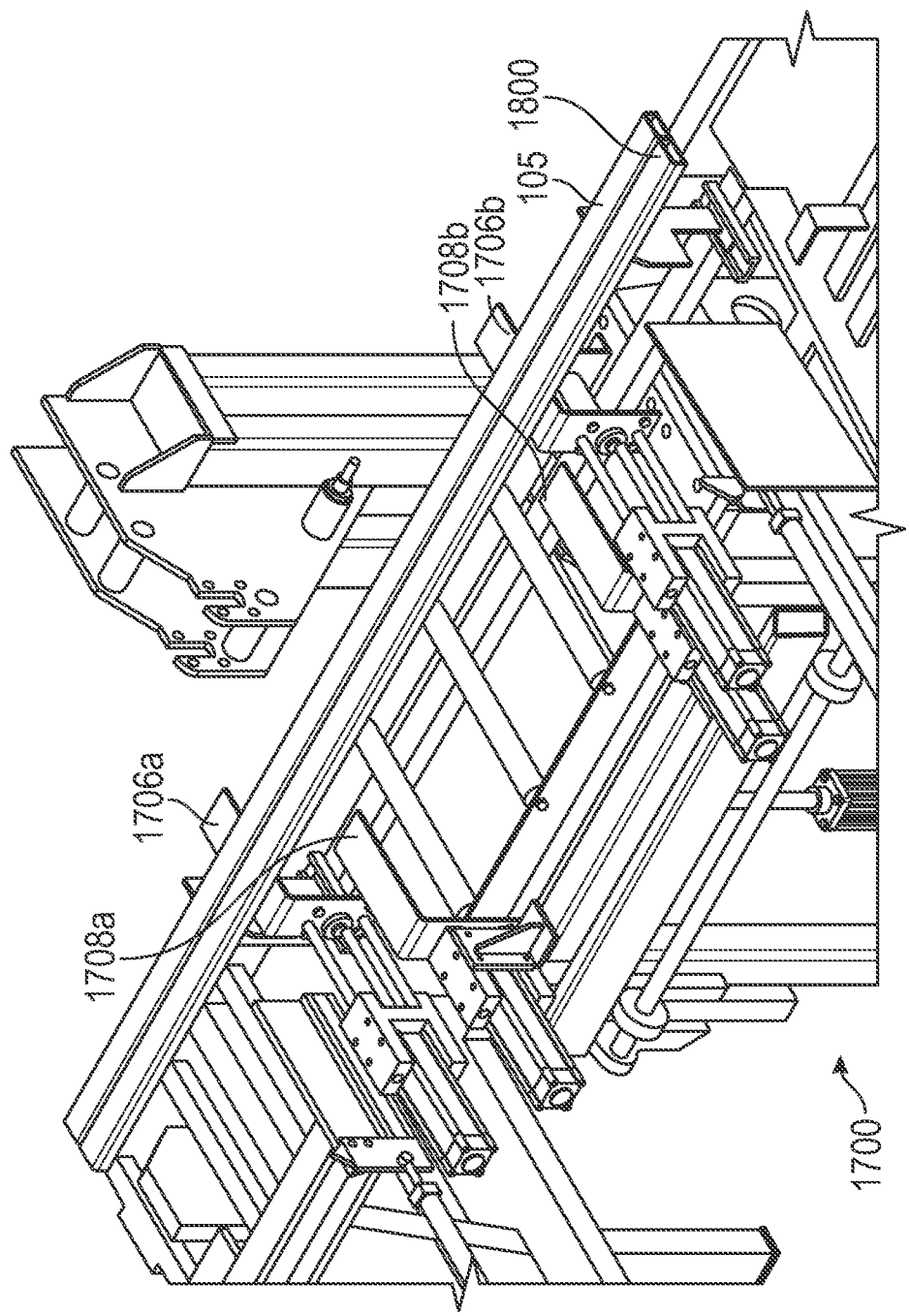
Figure 18C:
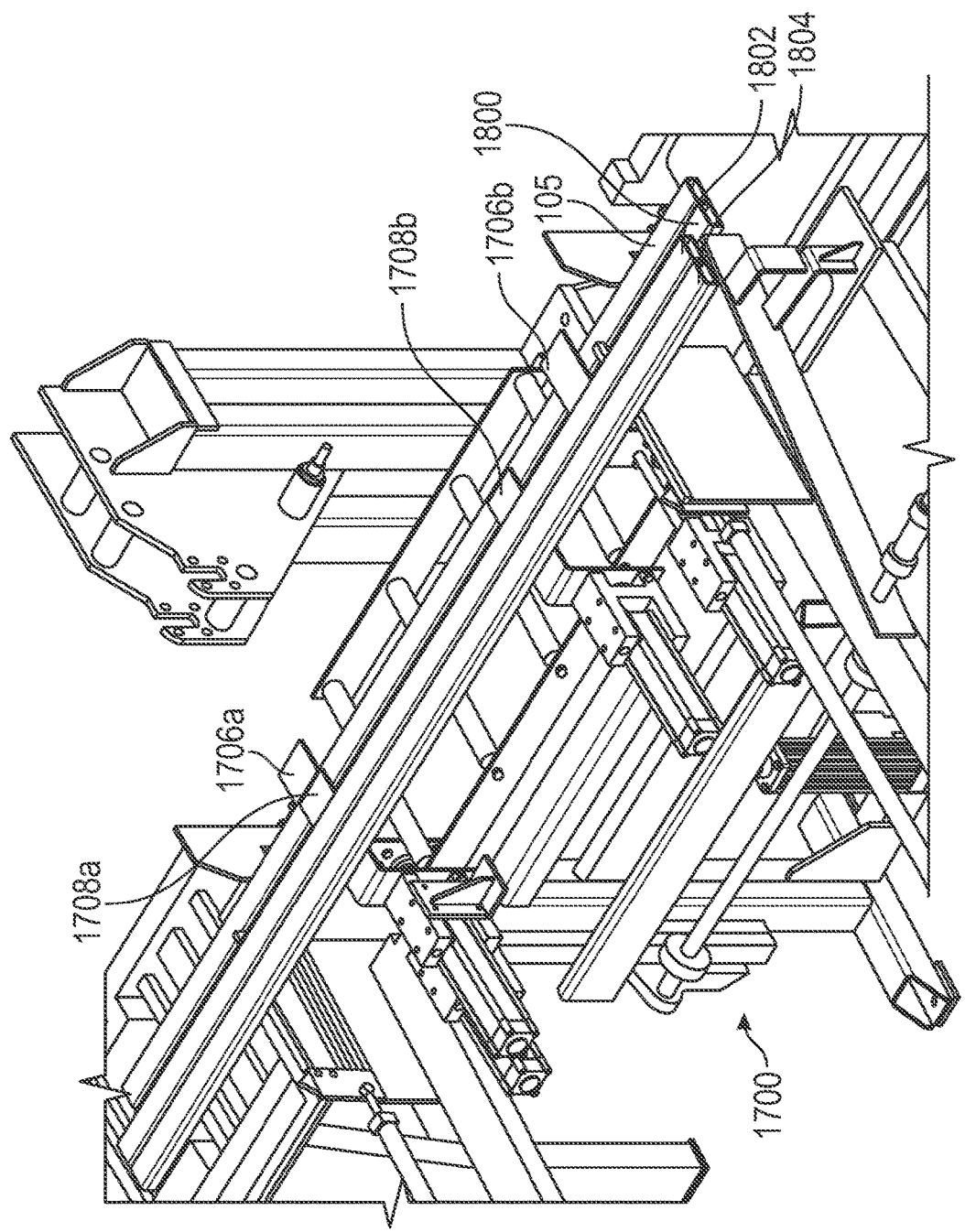
Figure 18D:
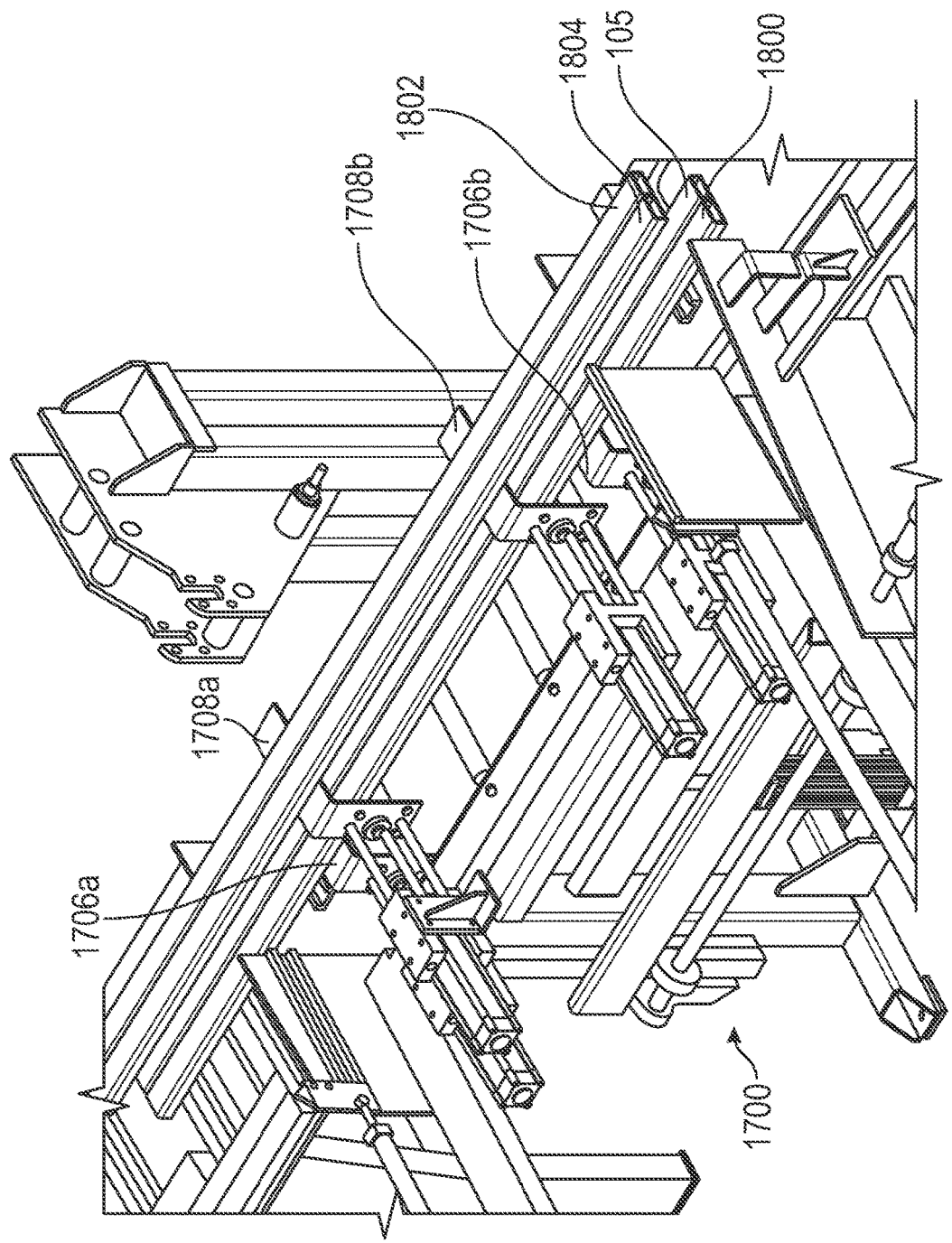
Figure 18E:
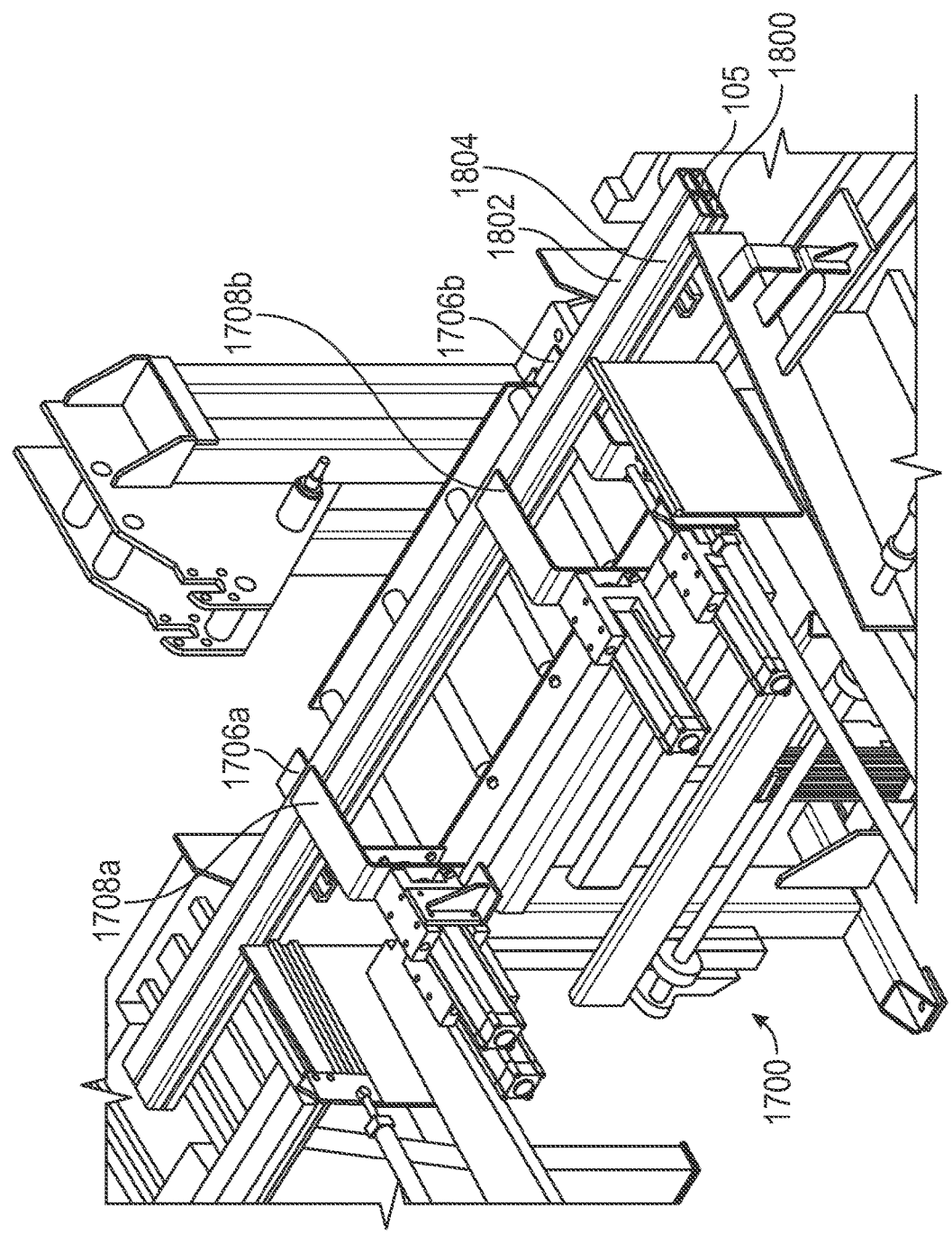
Figure 18F:
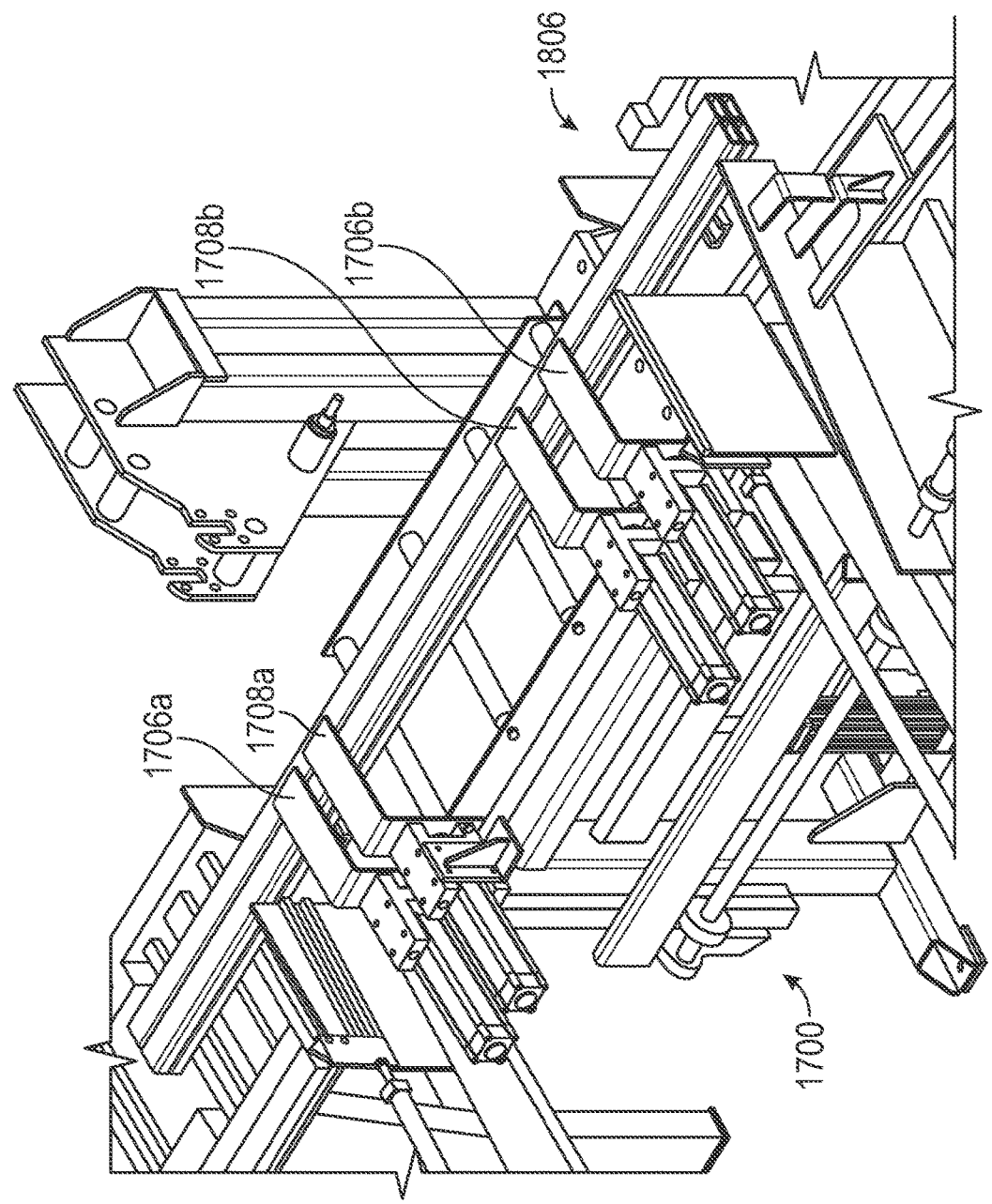

FIGS. 18A-18F illustrate an example operation by the lowering table 1700. In the illustrated example of FIG. 18A, the duplex 105 and a second duplex 1800 are placed on the transfer plates 700a (FIG. 17), 700b (FIG. 17) and the triggers 704a (FIG. 17), 704b (FIG. 17) are moved by the pneumatic drives 702a (FIG. 17), 702b (FIG. 17), which carries the duplexes 105, 1800 up to the blades 1706a, 1706b, 1708a, 1708b of the lowering table 1700. Once the last duplex (e.g., of the row) is moved, the blades 1706a, 1706b, 1708a, 1708b move back to wait for the next row, as illustrated in FIG. 18B, while the triggers 704a, 704b (FIG. 17) hold the row of duplexes 105, 1800. With the row of duplexes 105, 1800 on the vertical blades 1706a, 1706b, the lowering table 1700 moves down, as illustrated in FIG. 18C. When a following row of duplexes, and third duplex 1802 and a fourth duplex 1804, is completed, the horizontal blades 1708a, 1708b move, as illustrated in FIG. 18D. The triggers 704a, 704b (FIG. 17) are driven against the new row of duplexes 1802, 1804 and the horizontal blades 1708a, 1708b retract and the duplexes 1802, 1804 are placed on the previous row of duplexes 105, 1800, as illustrated in FIG. 18E that are held by the two vertical blades 1706a, 1706b. When the amount of rows is completed, the blades 1706a,

1706b, 1708a, 1708b retract to leave a mini-pack 1806 on the bed of rollers, as illustrated in FIG. 18F.

Figure 20:
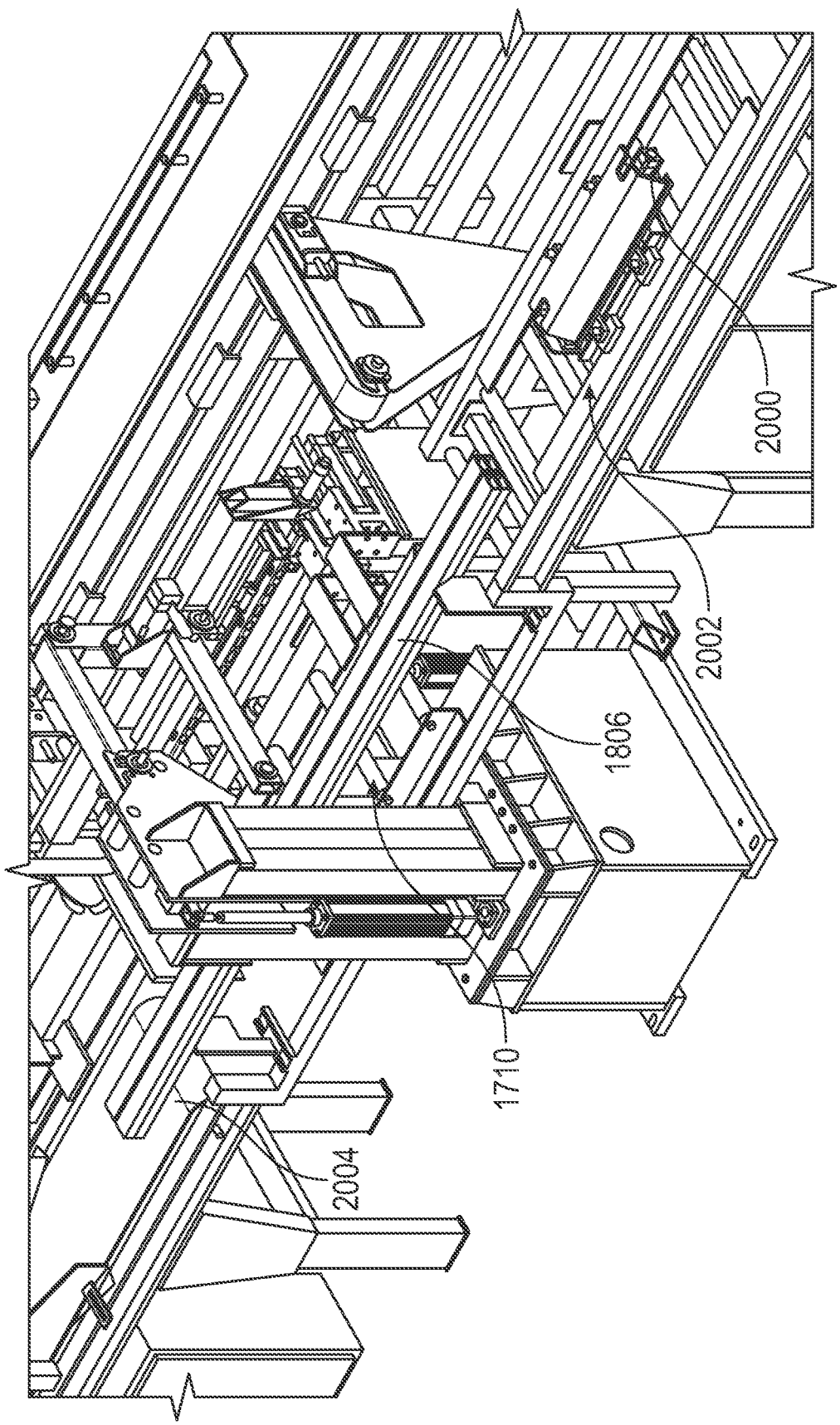
FIG. 20 illustrates a rear perspective view of the example automatic packaging line of FIG. 1 with an example mini-pack on an example bed of rollers that is to be transferred to a conveyor belt.

Once the necessary amount of duplexes to create the mini-pack 1806 is completed, the vertical blades 1706a, 1706b move down below a first bed of rollers 1710 (e.g., a roller bed) (FIG. 17), so that the mini-pack 1806 is placed on the first bed of rollers 1710. As illustrated in the example of FIG. 20, when the mini-pack 1806 (e.g., having four duplexes) is placed on the bed of rollers 1710, a pneumatic drive 2000 (e.g., a pneumatic actuator) is activated to drive a pressure plate 2002 (e.g., a push lever) to move the mini-pack 1806 to a conveyor belt 2004. A sensor is located on the plate 2002 to detect when the mini-pack 1806 rests in the first bed of rollers 1710. When the sensor detects this, the sensor activates, simultaneously, the conveyor belt 2004 and the first bed of rollers 1710 to carry the mini-pack 1806 against a moving stopper (e.g., the moving stopper 2100 of FIG. 21) and releasing the space to go back and assemble another mini-pack.

Figure 21:
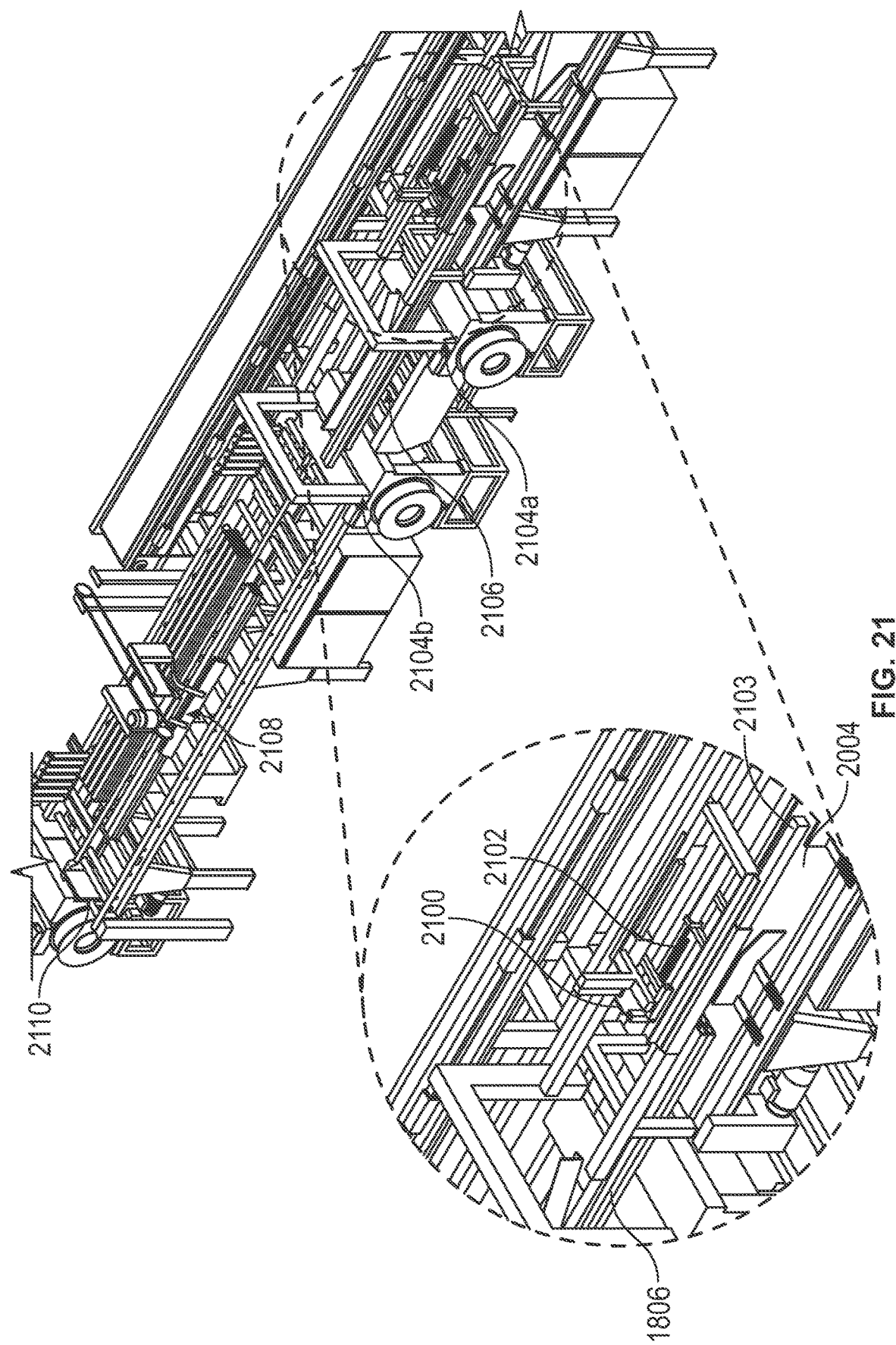
FIG. 21 illustrates a rear perspective view of the example automatic packaging line of FIG. 1 with an example strap area.

As illustrated in FIG. 21, the mini-pack 1806 stops against a moving stopper 2100. The moving stopper 2100 is located on the conveyor belt 2004. When a longitudinal feeder 2102 (e.g., a mini-pack feeder, a length feeder) is activated, which is adjustable according to the length of the profile(s) that are being manufactured and allow to align the profiles against the moving stopper 2100. The moving stopper 2100 moves over a guide 2103 (e.g., a gateway) located on the conveyor belt 2004. This movement allows adjusting the position of the moving stopper 2100 according the length of the mini-pack 1806. Once this operation is made, two automatic strappers 2104a, 2104b (e.g., strapping machines, strapping tools) are activated. The strap process includes tightening, via a high strength plastic strap, the ends and/or the center section (e.g., area, location, position) of the mini-pack 1806. Depending on the length of the profiles, the mini-pack 1806 may need additional straps (e.g., two straps, four straps, etc.). Once the mini-pack 1806 is tight, the equipment (e.g., the strappers 2104a, 2104b) tightens the strap(s), and then both ends of the straps are heated to melt and stick together. Once the strap is fastened (e.g., glued, secured, etc.), this operation is repeated and the mini-pack 1806 is strapped.

At the end of this operation, the moving stopper 2100 moves up, and a second bed of rollers 2106 and a third bed of rollers 2108 are driven. The strapped mini-pack 1806 is moved until a fixed stopper 2110 mounted on the third bed of rollers 2108. In this position, the mini-pack is detected and is stopped on the third bed of rollers 2108.

Figure 22:
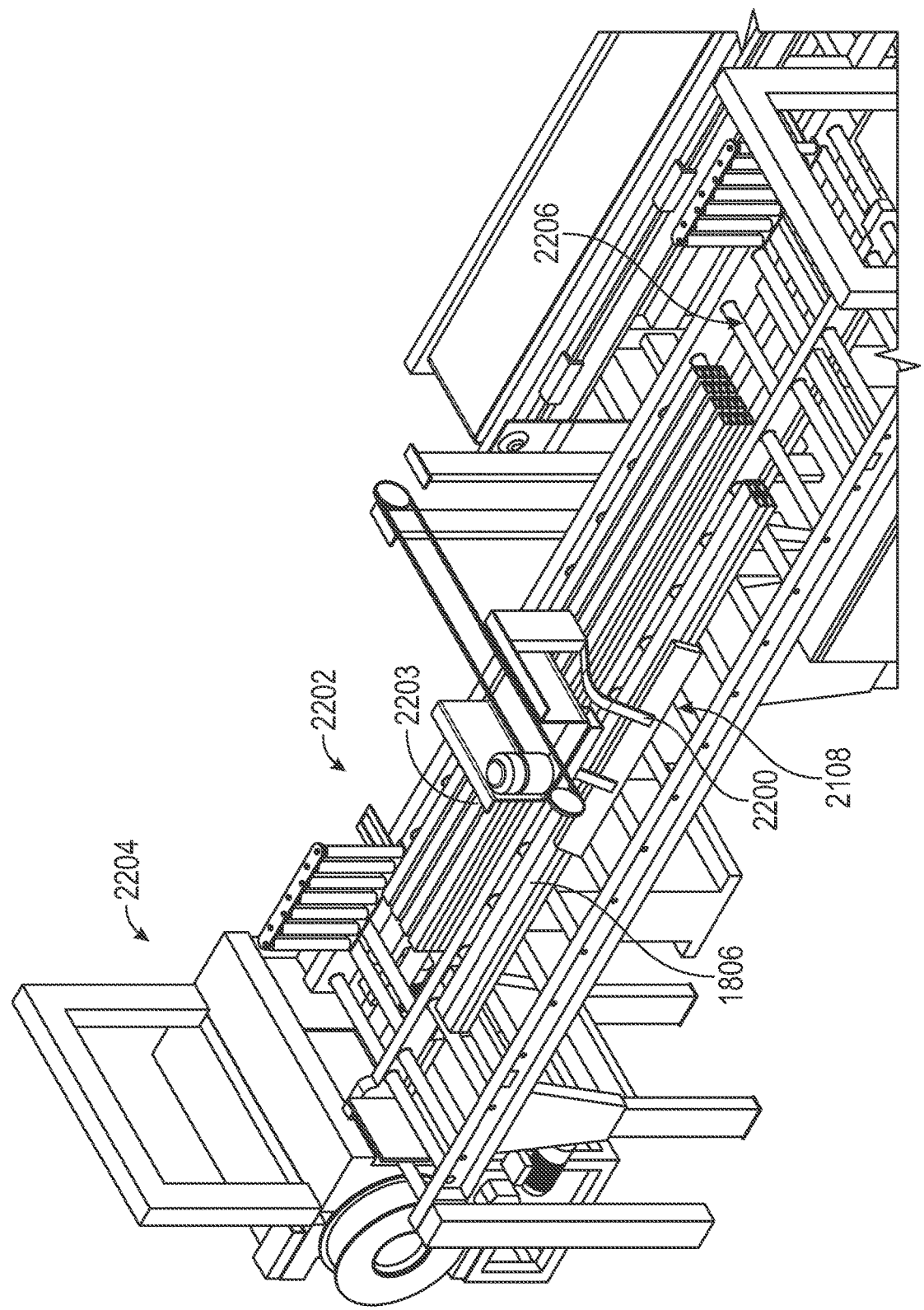
FIG. 22 illustrates a perspective view of the example strap area of FIG. 21 with example mini-packs in an example pack.

As illustrated in FIG. 22, the strapped mini-pack 1806 moves perpendicular to its longitudinal axis via a mini-pack ejector 2200 from the third bed of rollers 2108 to a second lowering table 2202 where a pack is made. In some examples, the second lowering table 2202 is larger (e.g., more robust) than the first lowering table 1700, which has a structure made up by profiles UPN (U steel profiles of bent sides). The second lowering table 2202 is supported by linear guides that keep the table parallel to the packaging line. Movement of the second lowering table 2202 up and down is achieved by a servo gear, which rotates a drive shaft with two gears at its ends. The two gears are engaged to two fixed racks to the UPN structure, and the gears/racks transmit up and down movement to the second lowering table 2202.

In the illustrated example, the mini-pack ejector 2200 is assembled above the third bed of rollers 2108, and the second lowering table 2202 includes on one support attached to a chain. When pulling the chain, the support pushes the mini-pack 1806 towards the second lowering table 2202. Depending on the number (e.g., the amount) of rows and columns, the second lowering table 2202 moves down until the configuration is completed.

After reaching the desired amount of mini-packs to form a pack 2203, the second lowering table 2202 rises to a level of an automatic strapper 2204 (e.g., a strapping machine, a strapping tool) to strap the pack 2203. In the illustrated example, the second lowering table 2202 includes a fourth bed of rollers 2206. The fourth bed of rollers 2206 are activated to transfer the pack 2203 to a first position. Once the pack 2203 is detected (e.g., automatically), a first strap, strapping process having a tie of high strength plastic strip at the ends of each pack, in the same way as described for the first line of strap. The number of straps depends on the length of a pack. For example, a pack may be strapped in more than two positions or locations. Once the pack 2203 is secured (e.g., tightly strapped), the equipment (e.g., the automatic strapper 2204) tightens the strap(s), and then is heated both ends to melt and stick. Once the strap is glued, this operation is repeated, and the pack 2203 is strapped. The fourth bed of rollers 2206 are driven again to transfer the pack 2203 to a palletizer 2300 (e.g., palletizing equipment, a palletizing machine) illustrated in FIG. 23.

Figure 23:
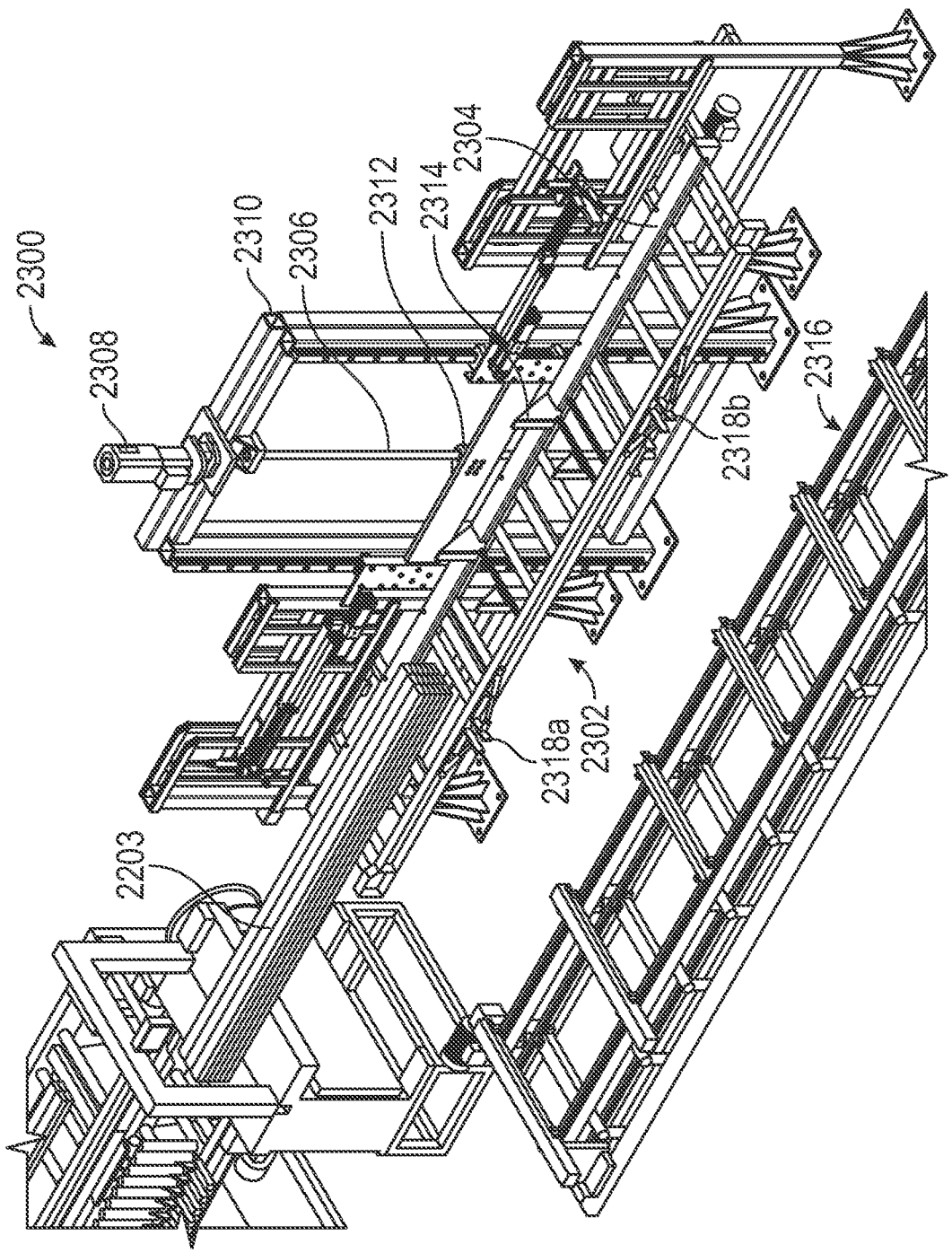
FIG. 23 illustrates a perspective view of an example outlet area of the example strap area of FIG. 22 and an example palletizer of the example automatic packaging line of FIG. 1.

In the illustrated example of FIG. 23, the pack 2203 is received by a fifth bed of rollers 2302 (e.g., a powered bed of rollers) of a table 2304. The table 2304 is controlled by a sensor that detects the positioning of the pack 2203 on the fifth bed of rollers 2302. Positioning the pack 2203, the fifth bed of rollers 2302 moves (e.g., ascends or descends) to a position (e.g., "0") that is the same as the height of the second lowering table 2202 and the automatic strapper 2204. When the strapped pack 2203 leaves the automatic strapper 2204, the strapped pack 2203 is deposited on the fifth bed of rollers 2302. The descent of the table 2304 is made by a ball screw 2306, which is driven by a servomotor 2308 (e.g., an actuator) disposed on a top of an arc 2310 (e.g., a bow). The ball screw 2306 is coupled to the servomotor 2308 which operates to rotate the ball screw 2306. In the illustrated example, a nut flange 2312 is carried on ball screw 2306, which is coupled to the fifth bed of rollers 2302. The rotation of the ball screw 2306 causes the fifth bed of rollers 2302, via the nut flange 2312, to ascend or descend (e.g., depending the direction of rotation). The servomotor 2308 is utilized for better control of the number of turns that, depending on the pitch of the ball screw 2306, adjust or control the height of the fifth bed of rollers 2302.

Figure 27:
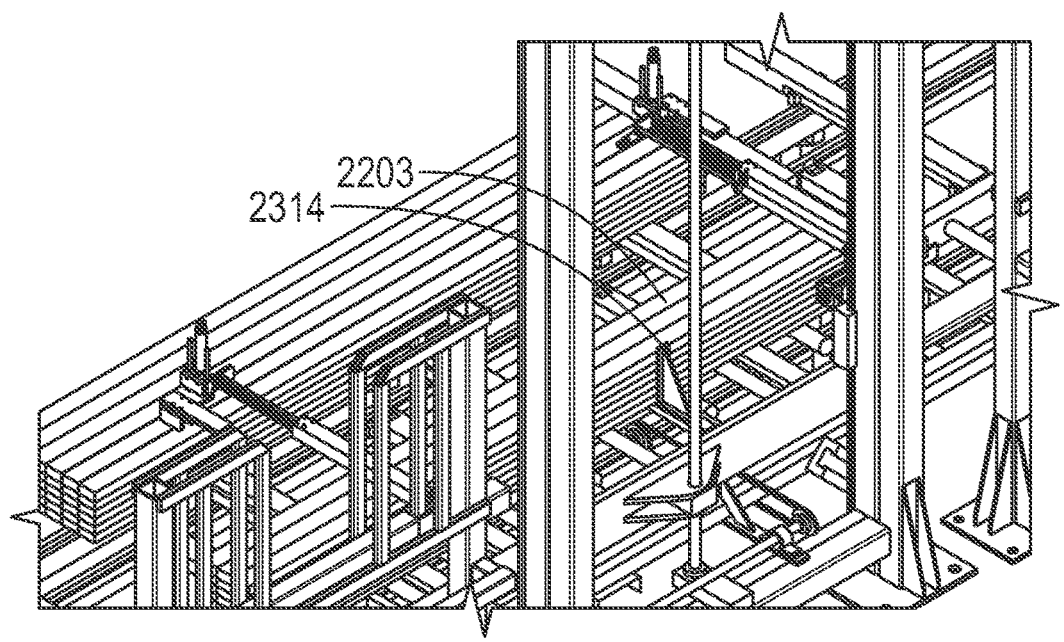
FIG. 27 illustrates a rear perspective view of the example palletizer of FIG. 23 with an example ejector to eject a pack onto a bed of chains.
Figure 28:
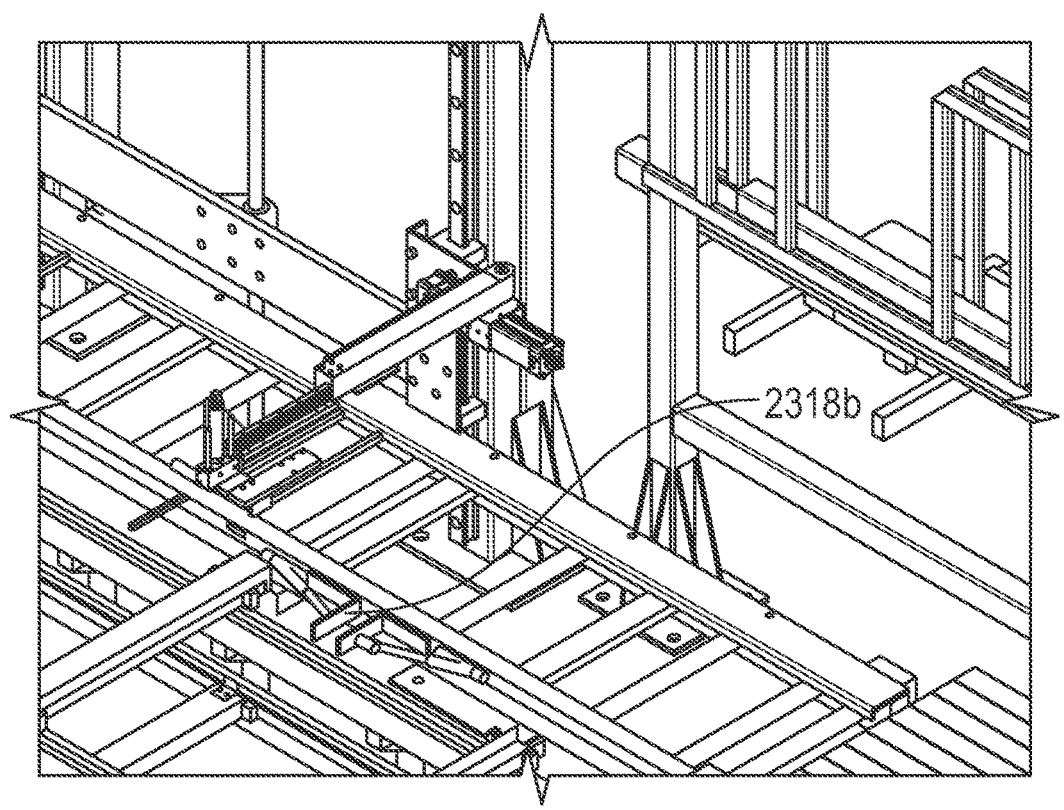
FIG. 28 illustrates an enlarged view of the example palletizer of FIG. 23 with example dampers.

When reaching the "0" position, an ejector 2314 pushes the pack 2203 (FIGS. 23 and 27). The ejector 2314 is a support with an L-shape attached to a chain. By operating the chain by a gear motor, the support pushes the pack 2203 forward from the fifth bed of rollers 2302 to a bed of chains 2316 (e.g., chain cradle), transferring from the fifth bed of rollers 2302 to the bed of chains 2316. In order to improve the transfer between the fifth bed of rollers 2302 and the bed of chains 2316, the fifth bed of rollers 2302 has on its side moving dampers 2318a, 2318b (FIGS. 23 and 28) (e.g., mobile fixing pins). The moving dampers 2318a, 2318b are metal hinges that can be opened or closed by pneumatic drives. The dampers 2318a, 2318b make a bridge between the bed of rollers 2302 and the bed of chains 2316 for the passage of the pack 2203. This operation of transferring packs may be made as many times as packs are in the pallet.

Figure 24:
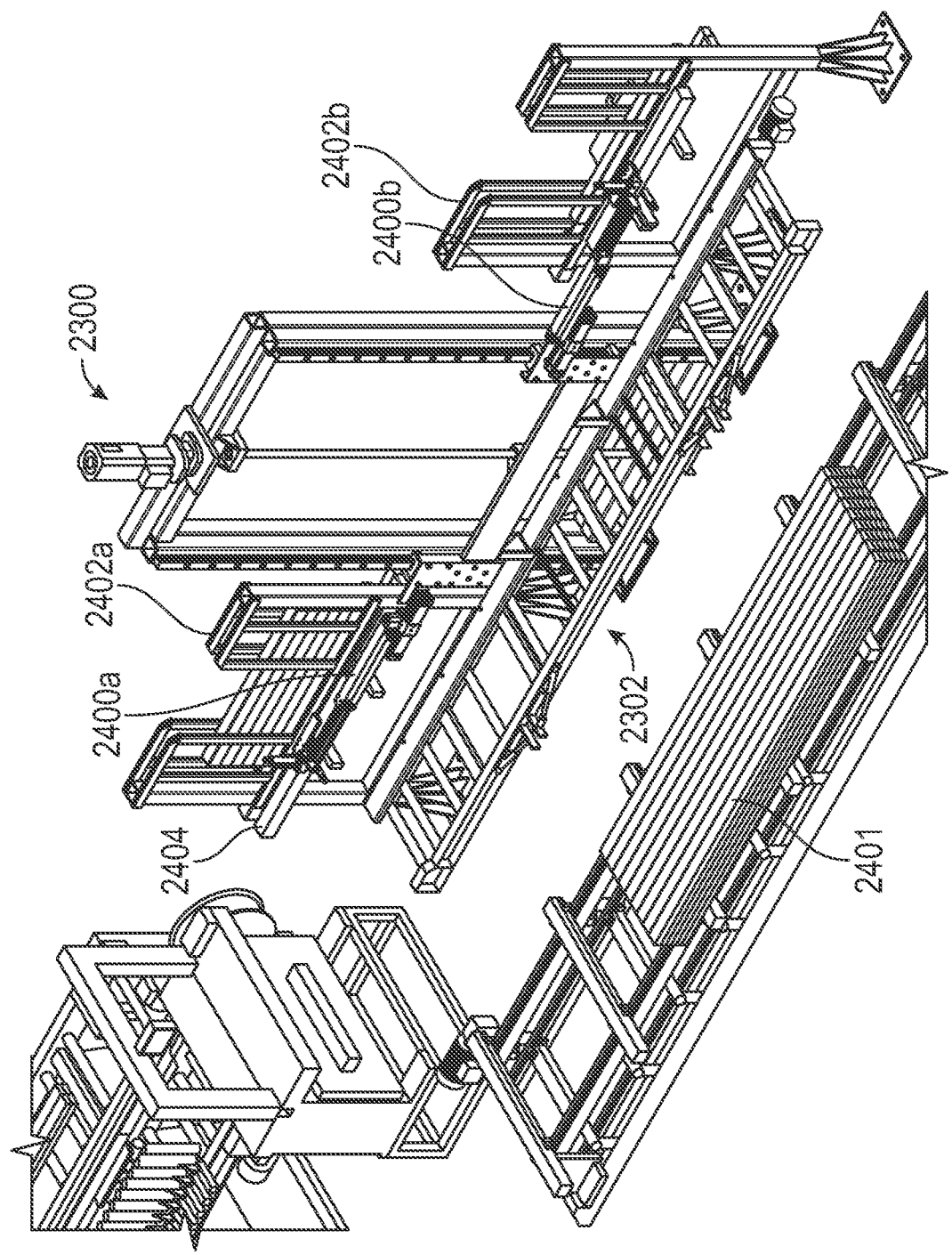
FIG. 24 illustrates a perspective view of the example palletizer of FIG. 23 and example arm plug holders for transferring blocks.

As illustrated in the example of FIG. 24, after the transferring of a first row of packs 2401, prior to receipt of a first pack of a second row (e.g., on top of the first row of packs 2401), arm plug holders 2400a, 2400b assembled on the supporting structure of the fifth bed of rollers 2302 are positioned on the same outlet of the equipment of plug chargers 2402a, 2402b (e.g., dowel loaders) (which, for example, contain a plurality of plugs or blocks).

Figure 25:
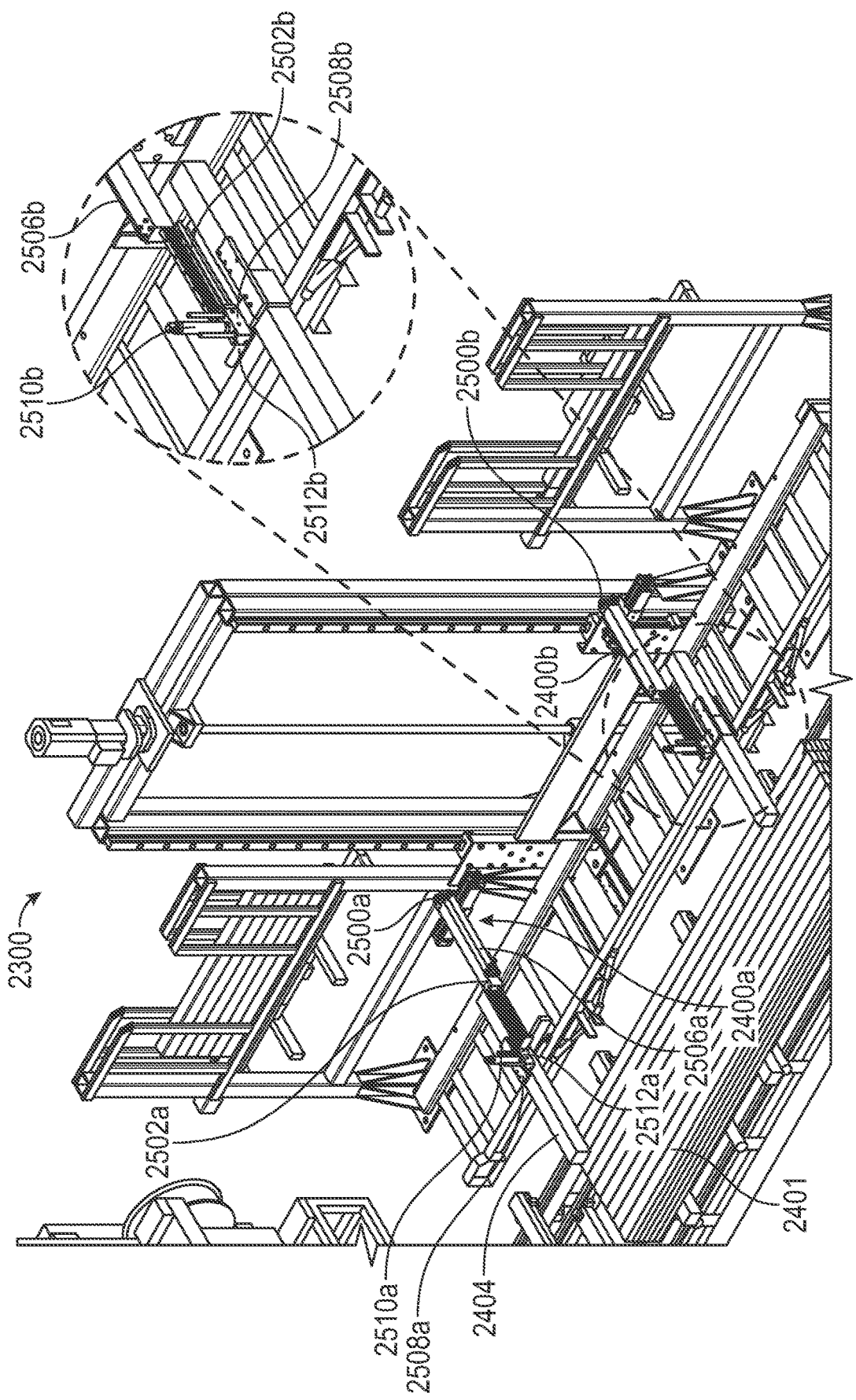
FIG. 25 illustrates a perspective view of the example palletizer of FIGS. 23 and 24 and with the example arm plug holders in a position to place blocks to make an example pallet.

In the illustrated example of FIG. 25, each of the arm plug holders 2400a, 2400b include pneumatic rotary drives 2500a, 2500b, respectively, which move respective arms 2502a, 2502b from respective heel holders to the pack with three pneumatic cylinders. Specifically, the pneumatic rotary drives 2500a, 2500b include respective first pneumatic cylinders 2506a, 2506b to extend respective hands 2508a, 2508b to the pack, respective second pneumatic cylinders 2510a, 2510b to place blocks (e.g., blocks, pallet blocks, studs, plugs, dowels, spacers, etc.) on the pack, and respective third pneumatic cylinders 2512a, 2512b to hold the blocks.

Figure 26:
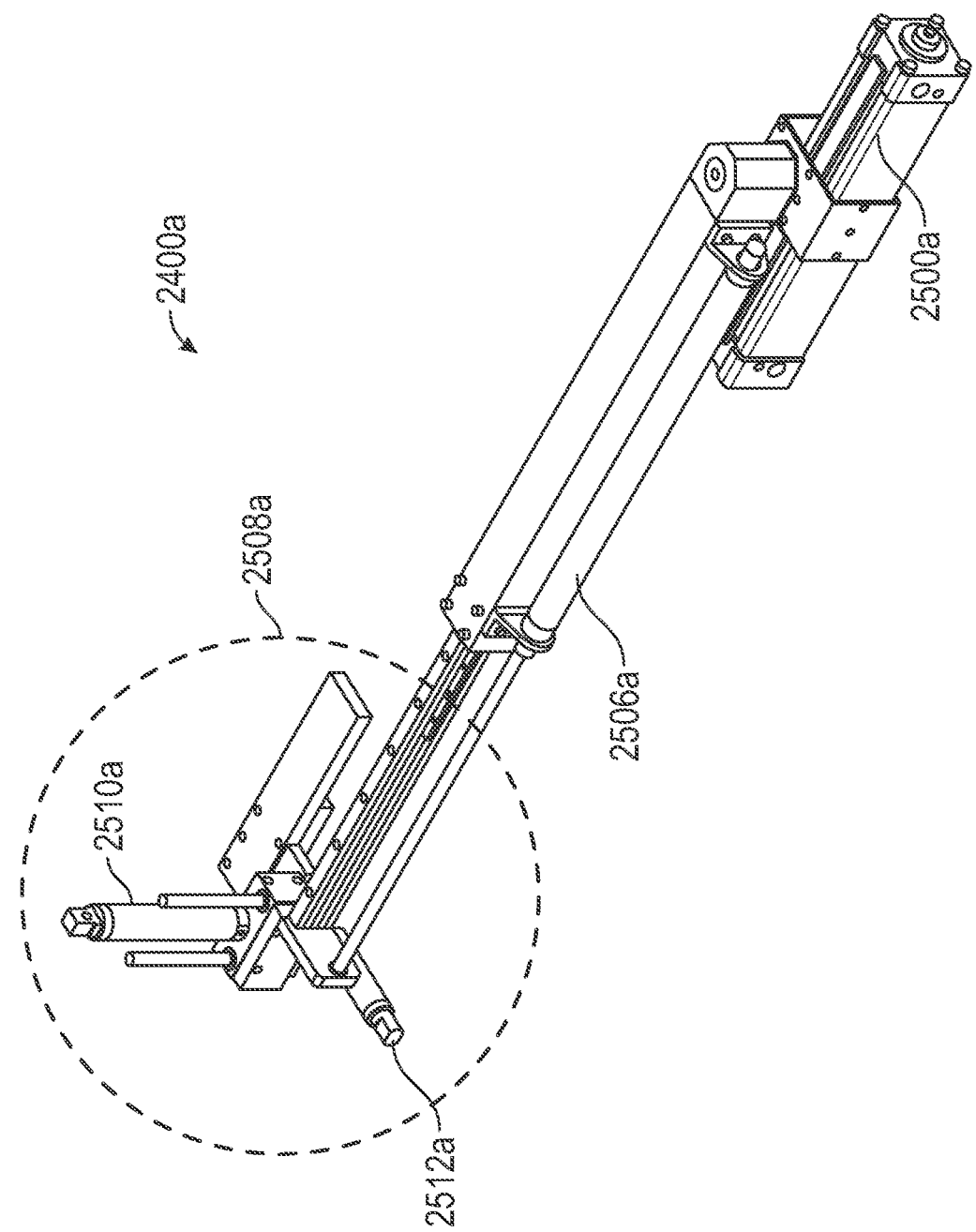
FIG. 26 illustrates a perspective view of one of the example arm plug holders of FIG. 25.

Therefore, each of the arm plug holders 2400a, 2400b include four pneumatic drives. An enlarged view of the first arm plug holder 2400a is illustrated in FIG. 26. For example, a first pneumatic drive (e.g., the pneumatic rotary drives 2500a) rotates to allow the rotation of the arm plug holder 2400a from a parallel position to a perpendicular position at the bed of rollers 2302 (FIG. 24). The second pneumatic drive (e.g., the first pneumatic cylinder 2506a) is for the extension of the hand 2508a and expands the arm plug holder 2400a in order to move the blocks until the pallet area. The third pneumatic drive (e.g., the third pneumatic cylinder 2512a) operates to hold the wooden block in order for the two plates of the hand 2508a to get closer to hold the block. The fourth pneumatic drive (e.g., the second pneumatic cylinder 2510a) is for placing the block on the pack, which enables the block to move down or up in order to place the blocks at different levels on the pallet.

In an example operation of one of the arm plug holders 2400a, the arm 2502a is placed on the charger plug 2402a such as, for example, as illustrated in the position in FIG. 23. Then, the hand 2508a takes one of the blocks 2404 that is held by the third pneumatic cylinder 2512a, as illustrated in FIG. 24. Once the pneumatic rotary drive 2500a is held, the rotary drive 2500a rotates 90 degrees to position the arm 2502a on the packs 2401, as illustrated in FIG. 25. The first pneumatic cylinder 2506a extends the hand 2508a that holds the block 2404 (e.g., a wooden block), while the second pneumatic cylinder 2510a places the block 2404 on the packs 2401. Once the block 2404 is in position, the third pneumatic cylinder 2512a releases the block 2404. Once the block 2404 is on the pack 2401, the second pneumatic cylinder 2510a retracts together with the first pneumatic cylinder 2506a, while the pneumatic rotary drive 2500a rotates to place the arm 2502a again on the plug charger 2402a, so this cycle repeats once more. The second arm plug holder 2400b may operate in a similarly.

In the illustrated example, the arm plug holders 2400a, 2400b have, at their edges, the hands 2508a, 2508b, which are driven pneumatically. The hands 2508a, 2508b retrieve the blocks from the block chargers 2402a, 2402b, and then, place them on the packs.

After taking all the blocks, the fifth bed of rollers 2302 returns to the position of taking blocks and receives the following pack (FIGS. 25 and 27). Once the pack is on the fifth bed of rollers 2302, the table 2304 goes down to specific height. This height is controlled by the turns of the servomotor 2308. The adjustment of the height is made by an optical sensor that detects the row of packs. When reaching the position, the arm plug holders 2400a, 2400b rotate and extend at the same time, so the blocks are perpendicular to the profiles. Once this operation ends, the hands 2508a, 2508b go down and place the blocks on the packs. Once the blocks are on the packs, the moving dampers 2318a, 2318b, with the fifth bed of rollers 2302, tighten the blocks while the ejector 2314 transfers the first pack of the second row of the fifth bed of rollers 2302 at the bed of chains 2316.

Figure 29:
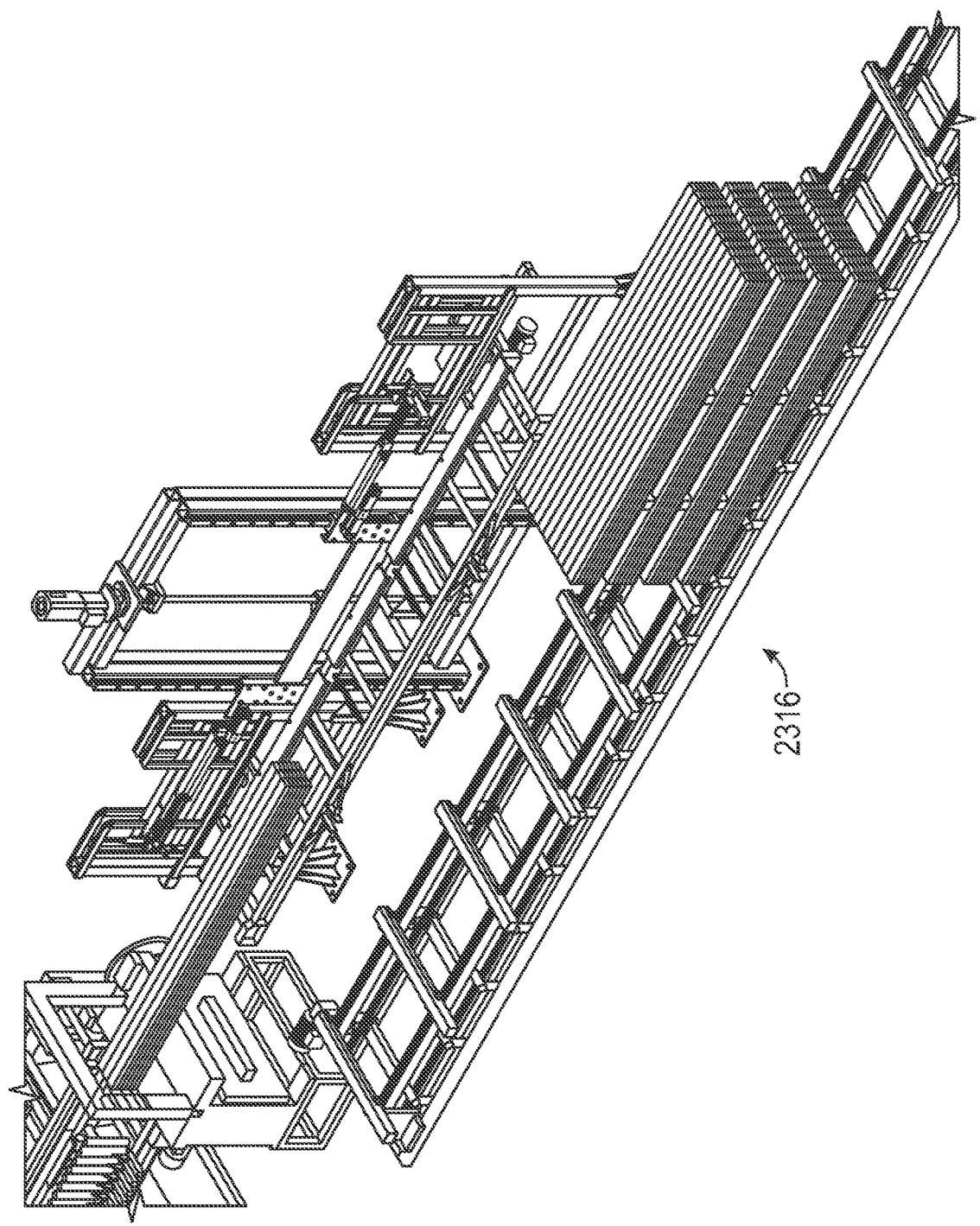
FIG. 29 illustrates a perspective view of the example palletizer of FIG. 23 with an example pallet of profiles in an example bed of chains.

The process of taking and positioning the blocks is performed in a relatively short amount of time, at the time of the outlet of each pack. Transferring a first pack of the second row, the moving dampers 2318a, 2318b open and the fifth bed of rollers 2302 return to the position of block taking. From the second pack, the operation is repeated. For the following rows, the operation is repeated in order to create the second row. Once the assembly of the pallet is finished, the bed of chains 2316 operates and moves the pallet up to a strapped area, as illustrated in FIG. 29.

Figure 30:
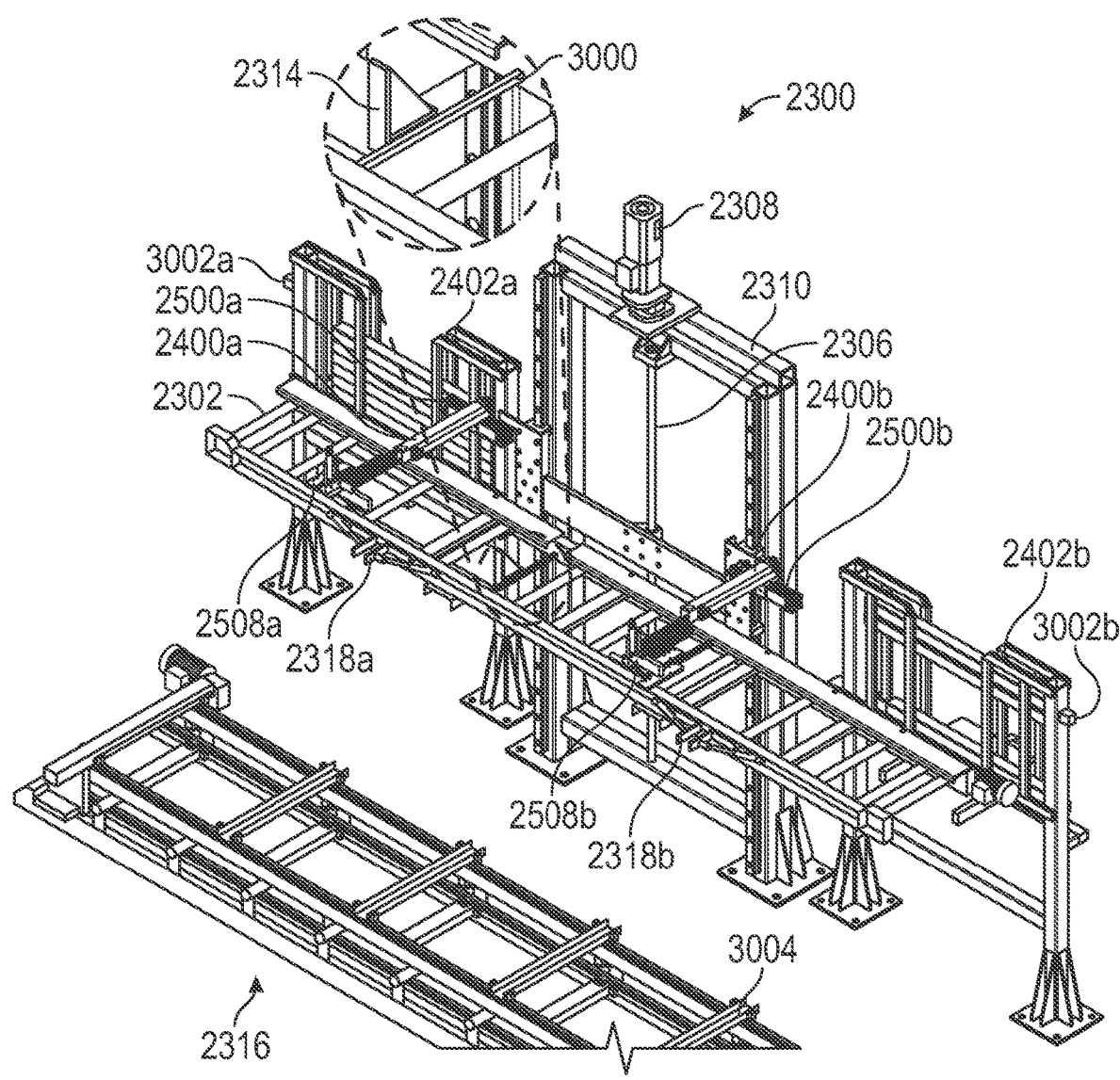
FIG. 30 illustrates a perspective view of the example palletizer of FIG. 23.

The palletizer 2300 is illustrated in FIG. 30. The example palletizer 2300 includes, for example, the arc 2310 and the fifth bed of rollers 2302 assembled to the arc 2310, which moves up and down by the screw 2306, which is driven from the top part by a servomotor 2308. The fifth bed of rollers 2302 is driven by a gear motor located at one of its edges. On the lateral side, the moving dampers 2318a, 2318b are set. The position or location of where the pack is taken is similar with the work of the last strap machine located at the previous stage of the process.

In the illustrated example, the palletizer 2300 includes the ejector 2314, which is assembled on the structure that supports the fifth bed of rollers 2302. The movement of the ejector 2314 is achieved by gear motor and linear guides 3000 (e.g., tracks). The palletizer 2300 includes the arm plug holders 2400a, 2400b (e.g., dowel-holding arms), which are assembled on the structure that supports the fifth bed of rollers 2302. The rotational movement of the arm plug holders 2400a, 2400b is obtained by pneumatic rotary drives 2500a, 2500b, as well as actuating of the hands 2508a, 2508b and extension of the hands 2508a, 2508b (e.g., via the first, second and third pneumatic cylinders 2506a, 2506b, 2510a, 2510b, 2512a, 2512b).

In the illustrated example, the palletizer 2300 includes the plug chargers 2402a, 2402b, which are formed by a tubular structure. A horizontal guillotine, which is driven pneumatically, allows the hands 2508a, 2508b of the arm plug holders 2400a, 2400b, the corresponding block. The housings (e.g., the plug chargers 2402a, 2402b) for the blocks are adjustable for different lengths of blocks via levers 3002a, 3002b (e.g. handles), respectively.

The example palletizer 2300 includes the bed of chains 2316, which is made up of a tubular structure, and which supports trees of driving and driven sprockets. The chain is driven by a gear motor located at one edge. On the links, there are cross-bars 3004, the bar where the pallet is placed. These cross-bars 3004 have a specific space to allow placing the blocks during the strapping process to create separate floors that create the pallet for shipping.

In the example automatic packaging line 100 for packing profiles, all the movements are automated, controlled and overlapped to optimize the times of packaging.

The example automatic packaging line 100 for packing profiles having U-shaped or C-shaped sections, which have a convex part and a concave part between the two sides (e.g., wings, walls, etc.) is relatively safer for the operators involved in the process, reduces the personal staff in the packaging line, has a self-regulating speed and utilizes the advantage of the maximum speed of the line. All these benefits, for example, result in a final product obtained in an appropriate presentation for dispensing that uses less energy compared to the prior art. These benefits are achieved by, for example, using a moving head (e.g., the head 108) with an up/down movement that comprises a rotor (e.g., the rotor 110), which can perform a movement of 180 degrees. The rotor, by use of permanent magnets to accommodate movements, is able to effectively and quickly place a first profile into a second profile to obtain a duplex. Then, duplexes are located next to each other on different floors forming the pallet, which may be sold in a quick and safe manner.

Although this disclosure has been written in connection with its realization and references in the figures, it must be noted that there are several changes and modifications for those who are experts in technical fields. These changes and modifications must be understood as included in this disclosure, as it is defined in the claims.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    transferring a first profile to a movable head carrying a rotor, the first profile having a U-shaped or C-shaped cross-section formed by a first side wall, a second side wall, and a base wall between the first side wall and the second side wall;
    coupling the first profile to the rotor, along the first side wall of the first profile, with a concave section of the first profile facing upwards, the coupling of the first profile to the rotor including actuating a first set of magnets carried by the rotor to face the first side wall of the first profile, the first set of magnets arranged in a row along a longitudinal axis of the rotor;
    rotating, via the rotor, the first profile such that the concave section of the first profile is facing downwards;
    transferring a second profile to the movable head with a concave section of the second profile facing upwards; and
    releasing the first profile over the second profile to insert one of the first side wall or the second side wall of the first profile into the concave section of the second profile and a side wall of the second profile into the concave section of the first profile.

2. The method of claim 1, wherein actuating the first set of magnets includes pivoting the magnets to face a direction that that is perpendicular to the first side wall of the first profile.

3. The method of claim 1, wherein coupling the first profile to the rotor further includes coupling the base wall of the first profile to the rotor by actuating a second set of magnets carried by the rotor to face the base wall of the first profile, the second set of magnets disposed outward from the rotor in a direction that is perpendicular to the longitudinal axis of the rotor.

4. The method of claim 3, wherein releasing the first profile includes:
    actuating the first set of magnets to face a direction that is not perpendicular to the first side wall of the first profile; and
    actuating the second set of magnets to face a direction that is not perpendicular to the base wall of the first profile.

5. The method of claim 3, wherein the magnets of the first set of magnets and the second set of magnets are pivotable about respective axes.

6. The method of claim 5, wherein actuating the magnets includes pivoting the magnets of the first set of magnets and the second set of magnets about the respective axes.

7. The method of claim 6, wherein the rotor includes a connecting rod coupled between the magnets of the first set of magnets to simultaneously pivot the magnets of the first set of magnets.

8. The method of claim 5, wherein the rotor includes a first actuator to pivot the magnets of the first set of magnets.

9. The method of claim 8, wherein the rotor includes a second actuator and a third actuator to pivot the magnets of the second set of magnets.

10. The method of claim 9, wherein actuating the magnets includes activating the first, second, and third actuators to pivot the magnets of the first set of magnets and the second set of magnets.

11. The method of claim 10, further including supplying compressed fluid to a pneumatic rotary joint at one end of the rotor to operate the first, second, and third actuators.

12. The method of claim 11, further including supplying power to an electric rotary joint at an opposite end of the rotor than the pneumatic rotary joint, the electric rotary joint to supply power to solenoids to activate of the first, second, and third actuators.

13. The method of claim 1, wherein rotating the first profile includes rotating the rotor 180 degrees about a longitudinal axis of the rotor.

14. The method of claim 1, further including supplying compressed fluid to the rotor through a pneumatic rotary joint disposed on one end of the rotor.

15. A method comprising:
    transferring a first profile to a movable head carrying a rotor, the first profile having a U-shaped or C-shaped cross-section formed by a first side wall, a second side wall, and a base wall between the first side wall and the second side wall;
    coupling the first profile to the rotor, along the first side wall of the first profile, with a concave section of the first profile facing upwards, the first profile coupled to the rotor along a first side of the rotor;
    rotating, via the rotor, the first profile such that the concave section of the first profile is facing downwards;
    transferring a second profile to the movable head with a concave section of the second profile facing upwards;
    releasing the first profile over the second profile to insert one of the first side wall or the second side wall of the first profile into the concave section of the second profile and a side wall of the second profile into the concave section of the first profile; and
    coupling a third profile to the rotor along a second side of the rotor opposite the first side of the rotor.

16. The method of claim 15, further including:
    rotating, via the rotor, the third profile such that a concave section of the third profile is facing downwards;
    transferring a fourth profile to the movable head with a concave section of the fourth profile facing upwards; and
    releasing the third profile over the fourth profile to insert a side wall of the third profile into the concave section of the fourth profile and insert a side wall of the fourth profile into the concave section of the third profile.

17. The method of claim 15, wherein coupling the first profile to the first side of the rotor includes actuating a first set of magnets carried along the first side of the rotor to face the first side wall of the first profile, and wherein coupling the third profile to the second side of the rotor includes actuating a second set of magnets carried along the second side of the rotor to face the third profile.

18. A method comprising:
transferring a first profile to a movable head carrying a rotor, the first profile having a U-shaped or C-shaped cross-section formed by a first side wall, a second side wall, and a base wall between the first side wall and the second side wall;
supplying compressed fluid to the rotor through a pneumatic rotary joint disposed on one end of the rotor;
coupling the first profile to the rotor, along the first side wall of the first profile, with a concave section of the first profile facing upwards, wherein the coupling of the first profile to the rotor includes actuating magnets carried by the rotor with the compressed fluid;
rotating, via the rotor, the first profile such that the concave section of the first profile is facing downwards;
transferring a second profile to the movable head with a concave section of the second profile facing upwards; and
releasing, by actuating the magnets with the compressed fluid, the first profile over the second profile to insert one of the first side wall or the second side wall of the first profile into the concave section of the second profile and a side wall of the second profile into the concave section of the first profile.

19. A method comprising:
transporting a first profile on a first conveyor and a second conveyor to a movable head carrying a rotor, the first conveyor and the second conveyor spaced apart from and parallel to each other, the movable head being movable to a position between the first conveyor and the second conveyor, the first profile having a U-shaped or C-shaped cross-section formed by a first side wall, a second side wall, and a base wall between the first side wall and the second side wall;
coupling the first profile to the rotor, along the first side wall of the first profile, with a concave section of the first profile facing upwards;
rotating, via the rotor, the first profile such that the concave section of the first profile is facing downwards;
transferring a second profile to the movable head with a concave section of the second profile facing upwards; and
releasing the first profile over the second profile to insert one of the first side wall or the second side wall of the first profile into the concave section of the second profile and a side wall of the second profile into the concave section of the first profile.

* * * * *